(12) United States Patent
Jung et al.

(10) Patent No.: US 12,552,989 B2
(45) Date of Patent: Feb. 17, 2026

(54) QUANTUM DOT, AND INK COMPOSITION, LIGHT-EMITTING DEVICE, OPTICAL MEMBER, AND APPARATUS INCLUDING THE SAME

(71) Applicant: Samsung Display Co., Ltd., Yongin-si (KR)

(72) Inventors: Yunku Jung, Yongin-si (KR); Sooho Lee, Yongin-si (KR); Heunggyu Kim, Yongin-si (KR); Changyeol Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/828,970

(22) Filed: Sep. 9, 2024

(65) Prior Publication Data

US 2025/0092310 A1    Mar. 20, 2025

(30) Foreign Application Priority Data

Sep. 20, 2023   (KR) ........................ 10-2023-0125841

(51) Int. Cl.
| | | |
|---|---|---|
| *C09K 11/88* | (2006.01) | |
| *C09K 11/02* | (2006.01) | |
| *C09K 11/06* | (2006.01) | |
| *C09K 11/62* | (2006.01) | |
| *C09K 11/70* | (2006.01) | |

(52) U.S. Cl.
CPC ........... *C09K 11/883* (2013.01); *C09K 11/02* (2013.01); *C09K 11/06* (2013.01); *C09K 11/623* (2013.01); *C09K 11/703* (2013.01)

(58) Field of Classification Search
CPC .................................................. C09K 11/025
See application file for complete search history.

(56) References Cited

U.S. PATENT DOCUMENTS

| 9,385,194 B2 | 7/2016 | Cho et al. |
| 10,439,155 B2 | 10/2019 | Park et al. |
| 11,254,863 B2 | 2/2022 | Kim et al. |
| (Continued) | | |

FOREIGN PATENT DOCUMENTS

| EP | 3327814 A1 * | 5/2018 | ............. H01L 51/50 |
| KR | 10-2018-0059363 A | 6/2018 | |
| (Continued) | | | |

OTHER PUBLICATIONS

US 10,703,967 B2, 07/2020, Ahn et al. (withdrawn)
(Continued)

*Primary Examiner* — Khanh T Nguyen
(74) *Attorney, Agent, or Firm* — Womble Bond Dickinson (US) LLP

(57) ABSTRACT

A quantum dot, and an ink composition, a light-emitting device, an optical member, and an apparatus, each including the quantum dot are provided. The quantum dot includes a nanoparticle and a first ligand and a second ligand which are disposed on the surface of the nanoparticle, wherein the first ligand is represented by Formula 1, and the second ligand includes at least one selected from among an amine group, a phosphine group, an imidazole group, and a pyridine group, wherein each of the first ligand and the second ligand does not include a thiol group.

20 Claims, 6 Drawing Sheets

(56) References Cited

U.S. PATENT DOCUMENTS

| | | | |
|---|---|---|---|
| 11,476,433 | B2 | 10/2022 | Choi et al. |
| 11,895,856 | B2 | 2/2024 | Jung et al. |
| 2023/0045448 | A1* | 2/2023 | Ko ........................ C09K 11/885 |
| 2023/0111888 | A1 | 4/2023 | Choi et al. |
| 2023/0193129 | A1 | 6/2023 | Chang et al. |

FOREIGN PATENT DOCUMENTS

| | | |
|---|---|---|
| KR | 10-1874413 B1 | 7/2018 |
| KR | 10-2019-0029193 A | 3/2019 |
| KR | 10-2020-0100011 A | 8/2020 |
| KR | 10-2021-0027604 A | 3/2021 |
| KR | 10-2021-0031027 A | 3/2021 |
| KR | 10-2021-0080923 A | 7/2021 |
| KR | 10-2354900 B1 | 1/2022 |
| KR | 10-2023-0092099 A | 6/2023 |

OTHER PUBLICATIONS

Zhang, S. et al., Ligand-assisted structure tailoring of highly luminescent Cu—In—Zn—S/ZnS//ZnS quantum dots for bright and stable light-emitting diodes, Frontiers in Chemistry, Dec. 13, 2022, 1102514, 8 pages.

International Search Report issued in corresponding PCT Application No. PCT/KR2024/013651, dated Dec. 17, 2024, 3 pages.

* cited by examiner

QUANTUM DOT, AND INK COMPOSITION, LIGHT-EMITTING DEVICE, OPTICAL MEMBER, AND APPARATUS INCLUDING THE SAME

CROSS-REFERENCE TO RELATED APPLICATION

The present application claims priority to and the benefit of Korean Patent Application Nos. 10-2023-0125841 and 10-2024-0083968, respectively filed on Sep. 20, 2023 and Jun. 26, 2024, in the Korean Intellectual Property Office, the entire content of each of which is incorporated herein by reference.

BACKGROUND

1. Field

One or more embodiments relate to a quantum dot, an ink composition including the quantum dot, a light-emitting device including the quantum dot, an optical member including the quantum dot, and/or an apparatus including the optical member including the quantum dot.

2. Description of the Related Art

Quantum dots are nanocrystals of semiconductor materials and exhibit a quantum confinement effect. When quantum dots reach an excited energy state by receiving light from an excitation source, they emit energy according to a corresponding energy band gap by themselves. That is, quantum dots may emit light with a certain wavelength range according to their energy band gap after receiving light (e.g., light energy) from an excitation source. In this regard, even in substantially the same material, the wavelength varies depending on the particle size, and accordingly, by adjusting the size of quantum dots, light having the desired or suitable wavelength range may be obtained, and excellent or suitable color purity and high luminescence efficiency may be obtained. Thus, quantum dots are applicable to (e.g., can be used in) one or more suitable devices.

In addition, quantum dots can be used as a material that performs one or more suitable optical functions (for example, a photo-conversion function) in optical members. Quantum dots, as nano-sized semiconductor nanocrystals, may have different energy band gaps by adjusting the size and composition of the nanocrystals, and thus may be to emit light of one or more suitable emission wavelengths.

An optical member including such quantum dots may have the form of a thin film, for example, a thin film patterned for each subpixel. Such an optical member may be used as a color conversion member of an apparatus including one or more suitable light sources.

SUMMARY

Aspects according to one or more embodiments are directed toward a novel quantum dot, an ink composition including the quantum dot, a light-emitting device including the quantum dot, an optical member including the quantum dot, and/or an apparatus including the optical member including the quantum dot.

Additional aspects will be set forth in part in the description which follows and, in part, will be apparent from the description, or may be learned by practice of the presented embodiments of the disclosure.

According to one or more embodiments, a quantum dot includes:
a nanoparticle, and
a first ligand and a second ligand that are arranged on the surface of the nanoparticle, wherein:
the first ligand is represented by Formula 1,
the second ligand includes at least one selected from among an amine group, a phosphine group, an imidazole group, and a pyridine group, and
each of the first ligand and the second ligand does not include a thiol group:

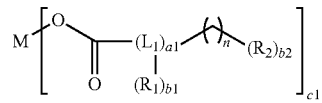

wherein, in Formula 1,
M may be Li, Na, K, Rb, Cs, Fr, Mg, Ca, Sr, Ba, Ra, Zn, In, Ga, Ge, Sn, Ti, and/or a (e.g., any suitable) combination thereof,
$L_1$ may be a single bond, a $C_1$-$C_{60}$ alkyl group that is unsubstituted or substituted with at least one $R_{10a}$, a $C_3$-$C_{60}$ carbocyclic group that is unsubstituted or substituted with at least one $R_{10a}$, or a $C_1$-$C_{60}$ heterocyclic group that is unsubstituted or substituted with at least one $R_{10a}$,
a1 may be an integer from 1 to 10,
$R_1$ and $R_2$ may each independently be hydrogen, deuterium, —F, —Cl, —Br, —I, a hydroxyl group, a cyano group, a nitro group, a $C_1$-$C_{60}$ alkyl group unsubstituted or substituted with at least one $R_{10a}$, a $C_2$-$C_{60}$ alkenyl group unsubstituted or substituted with at least one $R_{10a}$, a $C_2$-$C_{60}$ alkynyl group unsubstituted or substituted with at least one $R_{10a}$, a $C_1$-$C_{60}$ alkoxy group unsubstituted or substituted with at least one $R_{10a}$, a $C_3$-$C_{60}$ carbocyclic group unsubstituted or substituted with at least one $R_{10a}$, or a $C_1$-$C_{60}$ heterocyclic group unsubstituted or substituted with at least one $R_{10a}$,
b1 and b2 may each independently be an integer from 0 to 5,
n may be an integer from 1 to 15, and c1 may be an integer from 1 to 10, wherein
$R_{10a}$ may be:
deuterium, —F, —Cl, —Br, —I, a hydroxyl group, a cyano group, or a nitro group,
a $C_1$-$C_{60}$ alkyl group, a $C_2$-$C_{60}$ alkenyl group, a $C_2$-$C_{60}$ alkynyl group, or a $C_1$-$C_{60}$ alkoxy group, each unsubstituted or substituted with deuterium, —F, —Cl, —Br, —I, a hydroxyl group, a cyano group, a nitro group, a $C_3$-$C_{60}$ carbocyclic group, a $C_1$-$C_{60}$ heterocyclic group, a $C_6$-$C_{60}$ aryloxy group, a $C_6$-$C_{60}$ arylthio group, —Si$(Q_{11})(Q_{12})(Q_{13})$, —N$(Q_{11})(Q_{12})$, —B$(Q_{11})(Q_{12})$, —C(=O)$(Q_{11})$, —S(=O)$_2(Q_{11})$, —P(=O)$(Q_{11})(Q_{12})$, and/or a (e.g., any suitable) combination thereof,
a $C_3$-$C_{60}$ carbocyclic group, a $C_1$-$C_{60}$ heterocyclic group, a $C_6$-$C_{60}$ aryloxy group, or a $C_6$-$C_{60}$ arylthio group, each unsubstituted or substituted with deuterium, —F, —Cl, —Br, —I, a hydroxyl group, a cyano group, a nitro group, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{60}$ carbocyclic group, a $C_1$-$C_{60}$ heterocyclic group, a $C_6$-$C_{60}$ aryloxy group, a $C_6$-$C_{60}$ arylthio group, —Si$(Q_{21})(Q_{22})(Q_{23})$, —N$(Q_{21})(Q_{22})$, —B$(Q_{21})(Q_{22})$, —C(=O)(Q$_{21}$), —S(=O)$_2$(Q$_{21}$), —P(=O)(Q$_{21}$)(Q$_{22}$), and/or a (e.g., any suitable) combination thereof, or —Si(Q$_{31}$)(Q$_{32}$)(Q$_{33}$), —N(Q$_{31}$)(Q$_{32}$), —B(Q$_{31}$)(Q$_{32}$), —C(=O)(Q$_{31}$), —S(=O)$_2$(Q$_{31}$), or —P(=O)(Q$_{31}$)(Q$_{32}$), and Q$_1$ to Q$_3$, Q$_{11}$ to Q$_{13}$, Q$_{21}$ to Q$_{23}$, and Q$_{31}$ to Q$_{33}$ may each independently be hydrogen, deuterium, —F, —Cl, —Br, —I, a hydroxyl group, a cyano group, a nitro group, a C$_1$-C$_{60}$ alkyl group, a C$_2$-C$_{60}$ alkenyl group, a C$_2$-C$_{60}$ alkynyl group, a C$_1$-C$_{60}$ alkoxy group, or a C$_8$-C$_{60}$ carbocyclic group or a C$_1$-C$_{60}$ heterocyclic group, each unsubstituted or substituted with deuterium, —F, a cyano group, a C$_1$-C$_{60}$ alkyl group, a C$_1$-C$_{60}$ alkoxy group, a C$_5$-C$_{60}$ carbocyclic group, a C$_1$-C$_{60}$ heterocyclic group, and/or a (e.g., any suitable) combination thereof.

According to one or more embodiments, an ink composition includes the quantum dot and a solvent.

According to one or more embodiments, a light-emitting device includes:

a first electrode, a second electrode facing (e.g., opposite to) the first electrode, and an interlayer between the first electrode and the second electrode and including an emission layer, wherein the light-emitting device may further include the quantum dot as described above.

According to one or more embodiments, an optical member includes the quantum dot.

According to one or more embodiments, an apparatus includes the quantum dot and the optical member.

BRIEF DESCRIPTION OF THE DRAWINGS

The above and other aspects, features, and enhancements of certain embodiments of the disclosure will be more apparent from the following description taken in conjunction with the accompanying drawings, in which.

DETAILED DESCRIPTION

Figure 1:
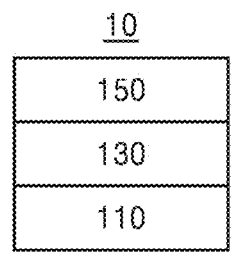
FIG. 1 is a schematic view of a structure of a light-emitting device according to one or more embodiments.

Reference will now be made in more detail to one or more embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein.

Accordingly, one or more embodiments are merely described in more detail below, by referring to the drawings, to explain aspects of the present description. As used herein, the term "and/or" includes any and all combinations of one or more of the associated listed items. Throughout the disclosure, expressions such as "at least one of", "one of", and "selected from", when preceding a list of elements, modify the entire list of elements and do not modify the individual elements of the list. For example, "at least one selected from among a, b and c", "at least one of a, b or c", and "at least one of a, b and/or c" may indicate only a, only b, only c, both (e.g., simultaneously) a and b, both (e.g., simultaneously) a and c, both (e.g., simultaneously) b and c, all of a, b, and c, or variations thereof. As used herein, the terms "use," "using," and "used" may be considered synonymous with the terms "utilize," "utilizing," and "utilized," respectively.

Because the disclosure may have diverse modified embodiments, embodiments are illustrated in the drawings and are described in the detailed description. An effect and a characteristic of the disclosure, and a method of accomplishing these will be apparent if (e.g., when) referring to one or more embodiments described with reference to the drawings. The disclosure may, however, be embodied in many different forms and should not be construed as limited to one or more embodiments set forth herein.

Hereinafter, embodiments of the disclosure will be described in more detail with reference to the accompanying drawings. The same or corresponding components will be denoted by the same reference numerals, and thus redundant description thereof will not be provided.

It will be understood that although the terms "first," "second," and/or the like, may be used herein to describe one or more suitable components, these components should not be limited by these terms. These components are only used to distinguish one component from another.

An expression used in the singular encompasses the expression of the plural, unless it has a clearly different meaning in the context.

It will be further understood that the terms "comprises", "includes", "comprising" and/or "including" used herein specify the presence of stated features or elements, but do not preclude the presence or addition of one or more other features or elements.

In the following embodiments, if (e.g., when) one or more suitable components such as layers, films, regions, plates, and/or the like, are said to be "on" another component, this may include not only a case in which other components are "immediately on" the layers, films, regions, or plates, but also a case in which other components may be placed therebetween. Sizes of elements in the drawings may be exaggerated for convenience of explanation. For example, because sizes and thicknesses of components in the drawings are arbitrarily illustrated for convenience of explanation, the following embodiments are not limited thereto.

The term "Group II" used herein may include a Group IIA element and a Group IIB element on the IUPAC periodic table, and the Group II element includes, for example, magnesium (Mg), calcium (Ca), zinc (Zn), cadmium (Cd), and mercury (Hg).

The term "Group III" used herein may include a Group IIIA element and a Group IIIB element on the IUPAC periodic table, and the Group III element may include, for example, aluminum (Al), gallium (Ga), indium (In), and thallium (Tl).

The term "Group V" used herein may include a Group VA element and a Group VB element on the IUPAC periodic table, and the Group V element may include, for example, nitrogen (N), phosphorus (P), arsenic (As), and antimony (Sb).

The term "Group VI" used herein may include a Group VIA element and a Group VIB element on the IUPAC periodic table, and the Group VI element may include, for example, sulfur(S), selenium (Se), and tellurium (Te).

Quantum Dot

In one or more embodiments, a quantum dot according to the disclosure includes a nanoparticle and a first ligand and a second ligand, the first and second ligands being arranged on the surface of the nanoparticle, wherein the first ligand is represented by Formula 1, and the second ligand includes at least one selected from among an amine group, a phosphine group, an imidazole group, and a pyridine group, and each of the first ligand and the second ligand may not include a (e.g., may exclude any) thiol group.

For example, a first ligand and a second ligand arranged on the surface of the nanoparticle may enable (e.g., accomplish) the surface treatment of the nanoparticle. Accordingly, the nanoparticle may be surface-treated by the first ligand and the second ligand.

Nanoparticle

In one or more embodiments, the nanoparticle may include: a Group II-VI semiconductor compound; a Group III-V semiconductor compound; a Group III-VI semiconductor compound; a Group I-III-VI semiconductor compound; a Group IV-VI semiconductor compound; a Group IV element or compound; and/or a (e.g., any suitable) combination thereof.

For example, the nanoparticle may include CdS, CdSe, CdTe, ZnS, ZnSe, ZnTe, ZnO, HgS, HgSe, HgTe, MgSe, MgS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, GaN, GaP, GaAs, GaSb, AlN, AlP, AlAs, AlSb, InN, InP, InAs, InSb, GaNP, GaNAs, GaNSb, GaPAS, GaPSb, AlNP, AlNAs, AlNSb, AlPAs, AlPSb, InGaP, InNP, InAlP, InNAs, InNSb, InPAs, InPSb, GaAlNP, GaS, GaSe, $Ga_2Se_3$, GaTe, InS, InSe, $In_2S_3$, $In_2Se_3$, and/or a (e.g., any suitable) combination thereof; or may include specific compounds corresponding to a Group II-VI semiconductor compound, a Group III-V semiconductor compound, a Group III-VI semiconductor compound, a Group I-III-VI semiconductor compound, a Group IV-VI semiconductor compound, a Group IV element or compound, and/or a (e.g., any suitable) combination thereof.

The nanoparticle may include a core and a first shell covering the core.

The nanoparticle may further include a first interlayer shell arranged between the core and the first shell.

The core, the first shell, and the first interlayer shell of the nanoparticle may each independently include a Group II-VI semiconductor compound, a Group III-V semiconductor compound, a Group III-VI semiconductor compound, a Group I-III-VI semiconductor compound, a Group IV-VI semiconductor compound, a Group IV element or compound, and/or a (e.g., any suitable) combination thereof.

In one or more embodiments, the core, first shell, and first interlayer shell of the nanoparticle may each independently include: CdS, CdSe, CdTe, ZnS, ZnSe, ZnTe, ZnO, HgS, HgSe, HgTe, MgSe, MgS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InGaP, InNP, InAlP, InNAs, InNSb, InPAs, InPSb, GaAlNP, GaS, GaSe, $Ga_2Se_3$, GaTe, InS, InSe, $In_2S_3$, $In_2Se_3$, and/or a (e.g., any suitable) combination thereof; or specific compounds corresponding to a Group II-VI semiconductor compound, a Group III-V semiconductor compound, a Group III-VI semiconductor compound, a Group I-III-VI semiconductor compound, a Group IV-VI semiconductor compound, a Group IV element or compound, and/or a (e.g., any suitable) combination thereof.

In one or more embodiments, the core of the nanoparticle may include InP. In one or more embodiments, the core of the nanoparticle may include ZnSeTe.

The first interlayer shell of the nanoparticle may include ZnSe.

The first shell may include a first compound.

The first compound may include a first metal and a first chalcogenide.

The first metal may include Zn. For example, the first shell may include ZnS, ZnSe, ZnTe, ZnSeS, or ZnTeS. In one or more embodiments, the first shell may include ZnS.

The first chalcogenide may include S. In one or more embodiments, the first shell may include CdS, ZnS, ZnSeS, ZnTeS, HgS, InS, InZnS, or PbS. For example, the first shell may include ZnS.

The nanoparticle may not further include a shell around (e.g., surrounding) at least a portion of the first shell. For example, the first shell may be the outermost shell of the nanoparticle.

For example, the nanoparticle may have a core/first interlayer shell/first shell structure, and the first interlayer shell may have a single-layer structure or a multi-layer structure. For example, the nanoparticle may have a two-layer shell structure, a three-layer shell structure, a four-layer shell structure, and/or the like.

First Ligand

According to one or more embodiments, the first ligand may be represented by Formula 1:

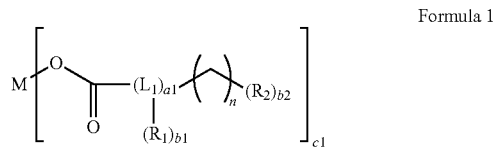

Formula 1 wherein, in Formula 1,

M may be Li, Na, K, Rb, Cs, Fr, Mg, Ca, Sr, Ba, Ra, Zn, In, Ga, Ge, Sn, Ti, and/or a (e.g., any suitable) combination thereof.

For example, M may be Li, Na, K, Mg, Zn, In, Ga, Ge, Sn, Ti, and/or a (e.g., any suitable) combination thereof. For example, M may be Mg, Zn, and/or a (e.g., any suitable) combination thereof.

In this regard, M may include a site that is chemically bonded to the nanoparticle. For example, the first ligand represented by Formula 1 may be arranged on the surface of the nanoparticle by a chemical bond between M and the nanoparticle. Therefore, M may be arranged on the surface of the nanoparticle by including a site chemically bonded to the nanoparticle. In one or more embodiments, Formula 1 may be Formula 1(1):

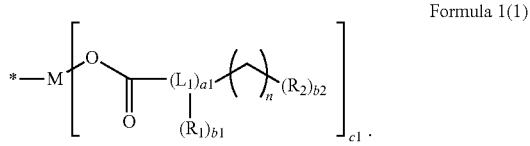

Formula 1(1)

In Formula 1(1), $L_1$ may be a single bond, a $C_1$-$C_{60}$ alkyl group that is unsubstituted or substituted with at least one $R_{10a}$, a $C_3$-$C_{60}$ carbocyclic group that is unsubstituted or substituted with at least one $R_{10a}$, or a $C_1$-$C_{60}$ heterocyclic group that is unsubstituted or substituted with at least one $R_{10a}$.

For example, $L_1$ may be a single bond, or a $C_1$-$C_{60}$ alkyl group unsubstituted or substituted with at least $R_{10a}$. In one or more embodiments, $L_1$ may be a single bond, or a $C_1$-$C_{10}$ alkyl group unsubstituted or substituted with at least one $R_{10a}$.

a1 may be an integer from 1 to 10.

$R_1$ and $R_2$ may each independently be hydrogen, deuterium, —F, —Cl, —Br, —I, a hydroxyl group, a cyano group, a nitro group, a $C_1$-$C_{60}$ alkyl group unsubstituted or substituted with at least one $R_{10a}$, a $C_2$-$C_{60}$ alkenyl group unsubstituted or substituted with at least one $R_{10a}$, a $C_2$-$C_{60}$ alkynyl group unsubstituted or substituted with at least one $R_{10a}$, a $C_1$-$C_{60}$ alkoxy group unsubstituted or substituted with at least one $R_{10a}$, a $C_3$-$C_{60}$ carbocyclic group unsubstituted or substituted with at least one $R_{10a}$, or a $C_1$-$C_{60}$ heterocyclic group unsubstituted or substituted with at least one $R_{10a}$.

b1 and b2 may each independently be an integer from 0 to 5.

n may be an integer from 1 to 15. c1 may be an integer from 1 to 10. In this regard, c1 may be determined according to M and embodiments are not limited thereto. For example, if (e.g., when) M is Mg or Zn, c1 may be an integer from 1 to 4, or an integer of 1 or 2.

$R_{10a}$ may be:
deuterium, —F, —Cl, —Br, —I, a hydroxyl group, a cyano group, or a nitro group;

a $C_1$-$C_{60}$ alkyl group, a $C_2$-$C_{60}$ alkenyl group, a $C_2$-$C_{60}$ alkynyl group, or a $C_1$-$C_{60}$ alkoxy group, each unsubstituted or substituted with deuterium, —F, —Cl, —Br, —I, a hydroxyl group, a cyano group, a nitro group, a $C_5$-$C_{60}$ carbocyclic group, a $C_1$-$C_{60}$ heterocyclic group, a $C_6$-$C_{60}$ aryloxy group, a $C_6$-$C_{60}$ arylthio group, —Si($Q_{11}$)($Q_{12}$)($Q_{13}$), —N($Q_{11}$)($Q_{12}$), —B($Q_{11}$)($Q_{12}$), —C(=O)($Q_{11}$), —S(=O)$_2$($Q_{11}$), —P(=O)($Q_{11}$)($Q_{12}$), and/or a (e.g., any suitable) combination thereof;

a $C_3$-$C_{60}$ carbocyclic group, a $C_1$-$C_{60}$ heterocyclic group, a $C_6$-$C_{60}$ aryloxy group, or a $C_6$-$C_{60}$ arylthio group, each unsubstituted or substituted with deuterium, —F, —Cl, —Br, —I, a hydroxyl group, a cyano group, a nitro group, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{60}$ carbocyclic group, a $C_1$-$C_{60}$ heterocyclic group, a $C_6$-$C_{60}$ aryloxy group, a $C_6$-$C_{60}$ arylthio group, —Si($Q_{21}$)($Q_{22}$)($Q_{23}$), —N($Q_{21}$)($Q_{22}$), —B($Q_{21}$)($Q_{22}$), —C(=O)($Q_{21}$), —S(=O)$_2$($Q_{21}$), —P(=O)($Q_{21}$)($Q_{22}$), and/or a (e.g., any suitable) combination thereof; or —Si($Q_{31}$)($Q_{32}$)($Q_{33}$), —N($Q_{31}$)($Q_{32}$), —B($Q_{31}$)($Q_{32}$), —C(=O)($Q_{31}$), —S(=O)$_2$($Q_{31}$), or —P(=O)($Q_{31}$)($Q_{32}$), wherein $Q_1$ to $Q_3$, $Q_{11}$ to $Q_{13}$, $Q_{21}$ to $Q_{23}$, and $Q_{31}$ to $Q_{33}$ may each independently be: hydrogen; deuterium; —F; —Cl; —Br; —I; a hydroxyl group; a cyano group; a nitro group; a $C_1$-$C_{60}$ alkyl group; a $C_2$-$C_{60}$ alkenyl group; a $C_2$-$C_{60}$ alkynyl group; a $C_1$-$C_{60}$ alkoxy group; or a $C_3$-$C_{60}$ carbocyclic group or a $C_1$-$C_{60}$ heterocyclic group, each unsubstituted or substituted with deuterium, —F, a cyano group, a $C_1$-$C_{60}$ alkyl group, a $C_1$-$C_{60}$ alkoxy group, a $C_3$-$C_{60}$ carbocyclic group, a $C_1$-$C_{60}$ heterocyclic group, and/or a (e.g., any suitable) combination thereof.

According to one or more embodiments, the first ligand may include at least one of
a first-1 ligand represented by Formula 1-1, and
a first-2 ligand represented by Formula 1-2:

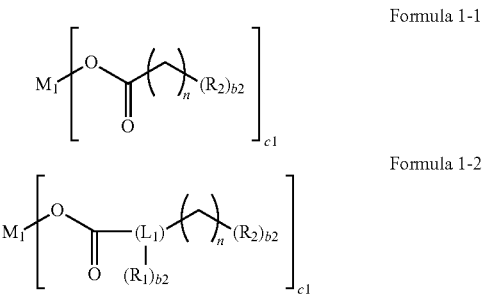

Formula 1-1

Formula 1-2 wherein, in Formulae 1-1 and 1-2, $M_1$ and $M_2$ may each independently be Li, Na, K, Rb, Cs, Fr, Mg, Ca, Sr, Ba, Ra, Zn, In, Ga, Ge, Sn, Ti, and/or a (e.g., any suitable) combination thereof.

For example, $M_1$ may be Li, Na, K, Rb, Cs, Fr, Mg, Ca, Sr, Ba, Ra, and/or a (e.g., any suitable) combination thereof, $M_2$ may be Mg, Zn, In, Ga, Ge, Sn, Ti, and/or a (e.g., any suitable) combination thereof, and $L_1$, $R_1$, $R_2$, b1, b2, n, and c1 are as described herein.

$M_1$ and $M_2$ may each independently include a site that is chemically bonded to the nanoparticle. For example, the first-1 ligand represented by Formula 1-1 and the first-2 ligand represented by Formula 1-2 may be arranged on the surface of the nanoparticle by a chemical bond between M (i.e., $M_1$ and $M_2$) and the nanoparticle. Therefore, each of $M_1$ and $M_2$ may be arranged on the surface of the nanoparticle by including a site chemically bonded to the nanoparticle. In one or more embodiments, Formula 1-1 and Formula 1-2 may be respectively represented by Formula 1(1)-1 and Formula 1(1)-2 as follows:

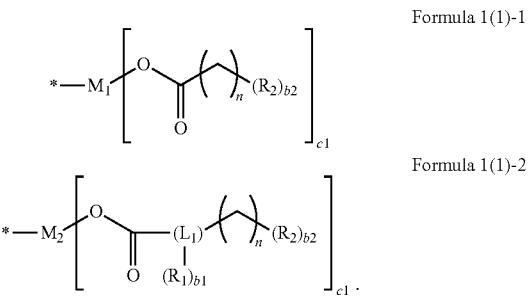

Formula 1(1)-1

Formula 1(1)-2

According to one or more embodiments, the standard reduction level value of $M_1$ may be smaller than the conduction band energy level value of the first shell.

For example, the standard reduction level value of $M_1$ may be −2.0 V or less.

According to one or more embodiments, in Formula 1-2, $R_1$ may be a $C_1$-$C_{20}$ alkyl group unsubstituted or substituted with at least one $R_{10a}$, and n may be an integer of 1 to 10.

For example, because $R_1$ is a $C_1$-$C_{20}$ alkyl group substituted or unsubstituted with at least one $R_{10a}$, even if the chain length is decreased, particle stability in ink may be increased and electron mobility in the device may be increased, thereby obtaining the efficiency and lifespan improvement effects for a device. According to one or more embodiments, the first ligand may include at least one of the first-1 ligand represented by Formula 1-1, and/or at least one of the first-2 ligand represented by Formula 1-2.

Second Ligand

According to one or more embodiments, the second ligand may include at least one selected from among an amine group, a phosphine group, an imidazole group, and a pyridine group.

The second ligand may include a main chain and a functional group, and the functional group may include at least one selected from among an amine group, a phosphine group, an imidazole group, and a pyridine group.

In this regard, the functional group may have a site chemically bonded to the nanoparticle. Therefore, the second ligand may be arranged on the surface of the nanoparticle due to the functional group.

For example, the functional group may include a site chemically bonded to the nanoparticle through lone pairs of electrons of an amine group, a phosphine group, an imidazole group, and/or a pyridine group. Therefore, the second ligand and the nanoparticle may be chemically bonded by a non-covalent electron pair of the functional group.

The main chain may include one or more of (e.g., selected from among) a $C_1$-$C_{60}$ alkyl group unsubstituted or substituted with at least one $R_{10a}$, a $C_2$-$C_{60}$ alkenyl group unsubstituted or substituted with at least $R_{10a}$, a $C_2$-$C_{60}$ alkynyl group unsubstituted or substituted with at least one $R_{10a}$, a $C_3$-$C_{60}$ cycloalkyl group unsubstituted or substituted with at least one $R_{10a}$, and a $C_6$-$C_{60}$ aryl group unsubstituted or substituted with at least one $R_{10a}$.

For example, the main chain may include one or more of (e.g., selected from among) a $C_1$-$C_{60}$ alkyl group unsubstituted or substituted with at least one $R_{10a}$, a $C_2$-$C_{60}$ alkenyl group unsubstituted or substituted with at least $R_{10a}$, a $C_3$-$C_{60}$ cycloalkyl group unsubstituted or substituted with at least one $R_{10a}$, and a $C_6$-$C_{60}$ aryl group unsubstituted or substituted with at least one $R_{10a}$.

Specific Examples of Ligand

According to one or more embodiments, the first ligand may be at least one selected from among a 2-ethyl butanoic acid magnesium salt, a 2-ethyl hexanoic acid magnesium salt, a 2-butyl octanoic acid magnesium salt, a 2,2,4,8,10,10-hexamethylundecane-5-carboxylic acid magnesium salt, 2-ethyl butanoic acid zinc salt, 2-ethyl hexanoic acid zinc salt, 2-butyl octanoic acid zinc salt, and 2,2,4,8,10,10-hexamethylundecane-5-carboxylic acid zinc salt.

According to one or more embodiments, the second ligand may include an amine group as functional group, and the second ligand may be at least one selected from among methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine (cetylamine), heptadecylamine, octadecylamine, and oleylamine. In one or more embodiments, the second ligand may include a phosphine group as a functional group, wherein the second ligand may be at least one selected from among trioctylphosphine, trimethylphosphine, triethylphosphine, and triphenylphosphine. Accordingly, the second ligand may be at least one selected from among methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine (cetylamine), heptadecylamine, octadecylamine, oleylamine, trioctylphosphine, trimethylphosphine, triethylphosphine, and triphenylphosphine.

The quantum dot according to one or more embodiments may include the first ligand and the second ligand placed on the surface of the nanoparticle, and the first ligand and the second ligand may not include a (e.g., may exclude any) thiol group.

The first ligand, as represented by Formula 1, may improve the stability of nanoparticles and quantum dots by passivating metal defects in the nanoparticles.

In one or more embodiments, the first ligand may include at least one of a first-1 ligand and a first-2 ligand, and the standard reduction level value of $M_1$ of the first-1 ligand may be smaller than the conduction band energy level value of the first shell. That is, the first ligand may include either a first-1 ligand, a first-2 ligand, or both. Additionally, the standard reduction potential of $M_1$ associated with the first-1 ligand may be lower than the energy level of the conduction band in the first shell. Accordingly, reduction of metals on the surface of nanoparticles can be minimized or reduced to improve the stability of nanoparticles and quantum dots.

The second ligand may include an amine group, a phosphine group, an imidazole group, or a pyridine group to passivate the chalcogenide defects of the nanoparticle, thereby improving the stability of the nanoparticle.

Additionally, the second ligand may act as a neutral ligand and thus, due to the electrochemical neutralization of the nanoparticle, improve the stability of the nanoparticle and the quantum dot.

The first ligand and the second ligand of nanoparticle does not include a (e.g., any) thiol group, thereby minimizing or reducing interference with electron injection into the quantum dot.

Method of Preparing Quantum Dots

Quantum dots according to the disclosure can be manufactured according to the manufacturing methods in the examples to be described in more detail later. For example, the method of synthesizing quantum dots can be recognized by those skilled in the art by referring to the synthesis examples and/or examples described in more detail later.

Ink Composition

In one or more embodiments, an ink composition including the quantum dot and a solvent are provided.

The amount of the solvent in the ink composition may be about 80 parts by weight to about 99.9 parts by weight based on a total of 100 parts by weight of the ink composition.

According to one or more embodiments, the viscosity of the ink composition may be about 2 cP to about 10 cP.

According to one or more embodiments, the surface tension of the ink composition may be about 20 dyne/cm to about 40 dyne/cm.

According to one or more embodiments, the vapor pressure of the ink composition may be $10^{-2}$ mmHg or less.

Because the ink composition has the above viscosity range, the above surface tension range, and the above vapor pressure range, the inkjet process of ejecting the ink composition may be easily performed.

According to one or more embodiments, the quantum dot may include a first ligand and a second ligand, and the solvent may be hydrophilic or hydrophobic.

According to one or more embodiments, the hydrophobic solvent may include one or more of an aliphatic hydrocarbon system and/or an aromatic hydrocarbon system.

For example, the hydrophobic solvent may include one or more of (e.g., selected from among): alkanes including n-pentane, n-hexane, n-heptane, n-octane, n-nonane, n-decane, dodecane, hexadecane, oxadecane, and/or the like; haloalkanes including dichloromethane, 1,2-dichloroethane, 1,1,2-trichloroethane, and/or the like; cycloalkanes including cyclohexane, methylcyclohexane, and/or the like; aryls including toluene, xylene, mesitylene, ethylbenzene, n-hexylbenzene, cyclohexylbenzene, trimethylbenzene, tetrahydronaphthalene, and/or the like; and haloaryls including chlorobenzene, o-dichlorobenzene, cyclohexylbenzene, and/or the like.

In one or more embodiments, the hydrophilic solvent may include one or more selected from among an alcohol group, an ether group, a ketone group, and an ester group.

For example, the hydrophilic solvent may include one or more of (e.g., selected from among): alkylene glycol alkyl ethers such as ethylene glycol monomethyl ether, ethylene glycol monoethyl ether, ethylene glycol monopropyl ether, ethylene glycol monobutyl ether, propylene glycol monomethyl ether, propylene glycol methyl ethyl ether, and/or the like; diethylene glycol dialkyl ethers such as diethylene glycol dimethyl ether, diethylene glycol diethyl ether, diethylene glycol dipropyl ether, diethylene glycol dibutyl ether, and/or the like; alkylene glycol alkyl ether acetates such as methyl cellosolve acetate, ethyl cellosolve acetate, propylene glycol monomethyl ether acetate, propylene glycol monoethyl ether acetate, and propylene glycol monopropyl ether acetate, and/or the like; alkoxyalkyl acetates such as methoxybutyl acetate, methoxypentyl acetate, and/or the like; aromatic hydrocarbons such as benzene, toluene, xylene, mesitylene, and/or the like; ketones such as methyl ethyl ketone, acetone, methyl amyl ketone, methyl isobutyl ketone, cyclohexanone, and/or the like; alcohols such as ethanol, propanol, butanol, hexanol, cyclohexanol, ethylene glycol, glycerin, and/or the like; esters such as 3-ethoxypropionic acid ethyl ester, 3-methoxypropionic acid methyl ester, 3-phenyl-propionic acid ethyl ester, and/or the like; cyclic esters such as γ-butyrolactone, and/or the like; and methoxybenzene (anisole).

With respect to a total of 100 parts by weight of the ink composition, the amount of the quantum dot may be 1 part by weight to 10 parts by weight, or 2 parts by weight to 5 parts by weight.

With respect to a total of 100 parts by weight of the ink composition, the amount of the solvent may be 80 parts by weight to 99 parts by weight, or 90 parts by weight to 99 parts by weight.

The quantum dot may be utilized in a light-emitting device (for example, an organic light-emitting device). Accordingly, a light-emitting device according to one or more embodiments includes: a first electrode; a second electrode opposite to (e.g., facing) the first electrode; an interlayer located between the first electrode and the second electrode and including an emission layer; and the quantum dot as described herein.

In one or more embodiments,
the first electrode of the light-emitting device may be an anode,
the second electrode of the light-emitting device may be a cathode,
the interlayer may further include a hole transport region arranged between the first electrode and the emission layer and an electron transport region arranged between the emission layer and the second electrode,
the hole transport region may include a hole injection layer, a hole transport layer, an emission auxiliary layer, an electron blocking layer, and/or a (e.g., any suitable) combination thereof, and
the electron transport region may include a buffer layer, a hole blocking layer, an electron control layer, an electron transport layer, an electron injection layer, and/or a (e.g., any suitable) combination thereof.

In one or more embodiments, the quantum dot may be included between the first electrode and the second electrode of the light-emitting device. Accordingly, the quantum dot may be included in the interlayer of the light-emitting device, for example, in the emission layer of the interlayer.

In one or more embodiments, the emission layer in the interlayer of the light-emitting device may include a dopant and a host, wherein the host may include the quantum dot. For example, the quantum dot may act as a host. The emission layer may be to emit red light, green light, blue light, and/or white light. For example, the emission layer may be to emit blue light. The blue light may have a maximum emission wavelength of, for example, about 430 nm to about 490 nm.

In one or more embodiments, the emission layer of the interlayer of the light-emitting device may include a dopant and a host, wherein the host may include the quantum dot and the dopant may be to emit blue light. For example, the dopant may include a transition metal and ligand(s) in the number of m, and m may be an integer from 1 to 6. The ligand(s) in the number of m may be substantially identical to or different from each other, at least one of the ligand(s) in the number of m may be bonded to the transition metal via a carbon-transition metal bond, and the carbon-transition metal bond may be a coordinate bond. For example, at least one of the ligand(s) in the number of m may be a carbene ligand (for example, Ir(pmp)$_3$ and/or the like). The transition metal may be, for example, iridium, platinum, osmium, palladium, rhodium, gold, and/or the like. More details on the emission layer and the dopant may each independently be the same as described herein.

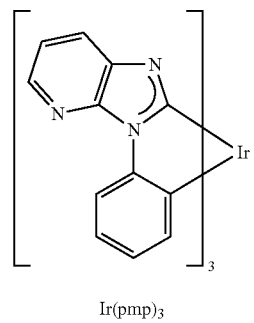

Ir(pmp)$_3$

In one or more embodiments, the light-emitting device may include a capping layer arranged outside the first electrode or outside the second electrode.

In one or more embodiments, the light-emitting device may further include at least one of a first capping layer located outside the first electrode or a second capping layer located outside the second electrode, and at least one of the first capping layer or the second capping layer may include the quantum dot. The first capping layer and the second capping layer may each be the same as described herein.

In one or more embodiments, the light-emitting device may further include:

a first capping layer arranged outside the first electrode and including the quantum dot;

a second capping layer arranged outside the second electrode and including the quantum dot; or both the first capping layer and the second capping layer.

The wording "(the interlayer and/or the capping layer) includes a quantum dot" may be interpreted as "(the interlayer and/or capping layer) may include the quantum dot or two or more different types (kinds) of quantum dots."

The term "interlayer" as used herein refers to a single layer and/or all of a plurality of layers arranged between the first electrode and the second electrode of the light-emitting device.

According to another aspect, an apparatus and an electronic device, including the quantum dot and/or the light-emitting device as described above. The electronic apparatus may further include a thin-film transistor. For example, the electronic apparatus may further include a thin-film transistor including a source electrode and a drain electrode, wherein the first electrode of the light-emitting device may be electrically connected to the source electrode or the drain electrode. In one or more embodiments, the electronic apparatus may further include a color filter, a color conversion layer, a touch screen layer, a polarizing layer, and/or a (e.g., any suitable) combination thereof. More details of the electronic apparatus may be referred to the descriptions provided herein.

Light-Emitting Device 10

Hereinafter, the structure of the light-emitting device 10 according to one or more embodiments and a method of manufacturing the light-emitting device 10 will be described with reference to FIG. 1.

FIG. 1 is a schematic cross-sectional view of a light-emitting device 10 according to one or more embodiments. The light-emitting device 10 includes a first electrode 110, an interlayer 130, and a second electrode 150.

First Electrode 110

In FIG. 1, a substrate may be additionally arranged under the first electrode 110 and/or on the second electrode 150. In one or more embodiments, as the substrate, a glass substrate or a plastic substrate may be used. In one or more embodiments, the substrate may be a flexible substrate, and may include plastics with excellent or suitable heat resistance and durability, such as polyimide, polyethylene terephthalate (PET), polycarbonate, polyethylene naphthalate, polyarylate (PAR), polyetherimide, and/or a (e.g., any suitable) combination thereof.

The first electrode 110 may be formed by, for example, depositing or sputtering a material for forming the first electrode 110 on the substrate. When the first electrode 110 is an anode, a material for forming the first electrode 110 may be a high-work function material that facilitates injection of holes.

The first electrode 110 may be a reflective electrode, a semi-transmissive electrode, or a transmissive electrode. In one or more embodiments, if (e.g., when) the first electrode 110 is a transmissive electrode, a material for forming the first electrode 110 may include indium tin oxide (ITO), indium zinc oxide (IZO), tin oxide ($SnO_2$), zinc oxide (ZnO), and/or a (e.g., any suitable) combination thereof. In one or more embodiments, if (e.g., when) the first electrode 110 is a semi-transmissive electrode or a reflective electrode, a material for forming the first electrode 110 may include magnesium (Mg), silver (Ag), aluminum (Al), aluminum-lithium (Al—Li), calcium (Ca), magnesium-indium (Mg—In), magnesium-silver (Mg—Ag), and/or a (e.g., any suitable) combination thereof.

The first electrode 110 may have a single-layer structure consisting of a single layer or a multi-layer structure including multiple layers. For example, the first electrode 110 may have a three-layer structure of ITO/Ag/ITO.

Interlayer 130

The interlayer 130 is arranged on the first electrode 110. The interlayer 130 may include the emission layer.

The interlayer 130 may further include a hole transport region arranged between the first electrode 110 and the emission layer, and an electron transport region arranged between the emission layer and the second electrode 150.

The interlayer 130 may further include, in addition to one or more suitable organic materials, a metal-containing compound such as an organometallic compound, an inorganic material such as quantum dots, and/or the like.

In one or more embodiments, the interlayer 130 may include, i) two or more emitting units sequentially stacked between the first electrode 110 and the second electrode 150, and ii) a charge generation layer between the two or more emitting units. When the interlayer 130 includes the two or more emitting units and the charge generation layer, the light-emitting device 10 may be a tandem light-emitting device.

Hole Transport Region in Interlayer 130

The hole transport region may have: i) a single-layer structure consisting of a single layer consisting of a single material, ii) a single-layer structure consisting of a single layer including (e.g., consisting of) multiple materials that are different from each other, or iii) a multi-layer structure including multiple layers including multiple materials that are different from each other.

The hole transport region may include a hole injection layer, a hole transport layer, an emission auxiliary layer, an electron blocking layer, and/or a (e.g., any suitable) combination thereof.

For example, the hole transport region may have a multi-layer structure including a hole injection layer/hole transport layer structure, a hole injection layer/hole transport layer/emission auxiliary layer structure, a hole injection layer/emission auxiliary layer structure, a hole transport layer/emission auxiliary layer structure, or a hole injection layer/hole transport layer/electron blocking layer structure, wherein constituent layers of each structure are stacked sequentially from the first electrode 110.

The hole transport region may include a compound represented by Formula 201, a compound represented by Formula 202, and/or a (e.g., any suitable) combination thereof:

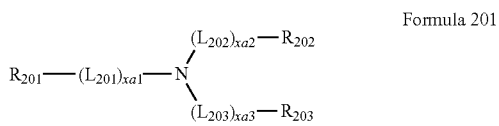

Formula 201

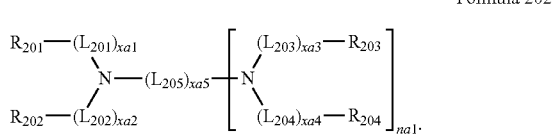

Formula 202

In Formulae 201 and 202, $L_{201}$ to $L_{204}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$, $L_{205}$ may be *—O—**, *—S—**, *—N($Q_{201}$)-**, a $C_1$-$C_{20}$ alkylene group unsubstituted or substituted with at least one $R_{10a}$, a $C_2$-$C_{20}$ alkenylene group unsubstituted or substituted with at least one $R_{10a}$, a $C_3$-$C_{60}$ carbocyclic group unsubstituted or substituted with at least one $R_{10a}$, or a $C_1$-$C_{60}$ heterocyclic group unsubstituted or substituted with at least one $R_{10a}$, xa1 to xa4 may each independently be an integer from 0 to 5, xa5 may be an integer from 1 to 10, $R_{201}$ to $R_{204}$ and $Q_{201}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$, $R_{201}$ and $R_{202}$ may optionally be linked to each other via a single bond, a $C_1$-$C_5$ alkylene group unsubstituted or substituted with at least one $R_{10a}$, or a $C_2$-$C_5$ alkenylene group unsubstituted or substituted with at least one $R_{10a}$, to form a $C_8$-$C_{60}$ polycyclic group (for example, a carbazole group, and/or the like) unsubstituted or substituted with at least one $R_{10a}$ (for example, Compound HT16, and/or the like), $R_{203}$ and $R_{204}$ may optionally be bonded to each other via a single bond, a $C_1$-$C_5$ alkylene group unsubstituted or substituted with at least one $R_{10a}$, or a $C_2$-$C_5$ alkenylene group unsubstituted or substituted with at least one $R_{10a}$, to form a $C_8$-$C_{60}$ polycyclic group unsubstituted or substituted with at least one $R_{10a}$, and na1 may be an integer from 1 to 4.

For example, each of Formulae 201 and 202 may include at least one selected from among groups represented by Formulae CY201 to CY217:

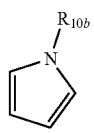

CY201

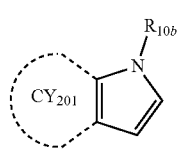

CY202

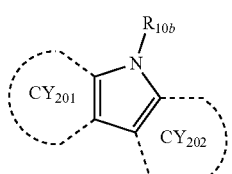

CY203

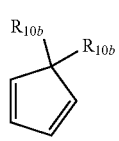

CY204

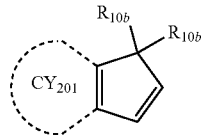

CY205

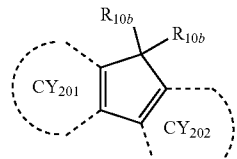

CY206

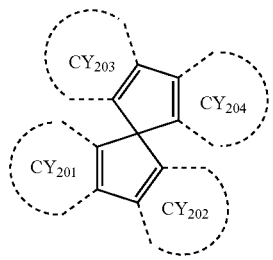

CY207

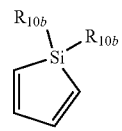

CY208

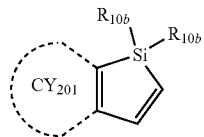

CY209

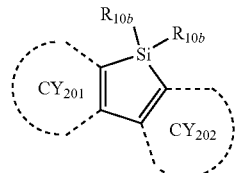

CY210

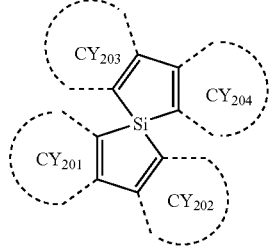

CY211

CY212

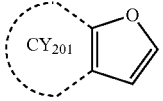

CY213

CY214

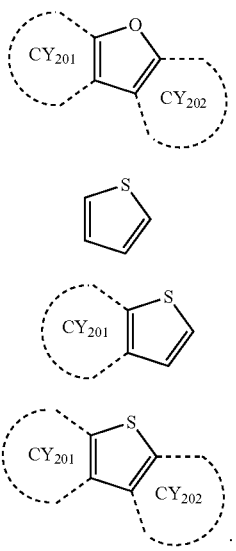

CY215

CY216

CY217

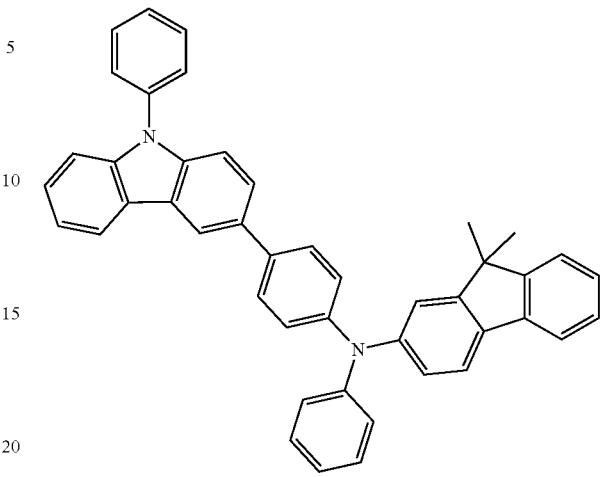

HT1

In Formulae CY201 to CY217, $R_{10b}$ and $R_{10c}$ may each be the same as described in connection with $R_{10a}$, ring CY201 to ring CY204 may each independently be a $C_3$-$C_{20}$ carbocyclic group or a $C_1$-$C_{20}$ heterocyclic group, and at least one hydrogen in Formulae CY201 to CY217 may be unsubstituted or substituted with $R_{10a}$.

In one or more embodiments, in Formulae CY201 to CY217, ring CY201 to ring CY204 may each independently be a benzene group, a naphthalene group, a phenanthrene group, or an anthracene group.

In one or more embodiments, each of Formulae 201 and 202 may include at least one of the groups represented by Formulae CY201 to CY203.

In one or more embodiments, Formula 201 may include at least one of the groups represented by Formulae CY201 to CY203 and at least one of the groups represented by Formulae CY204 to CY217.

In one or more embodiments, in Formula 201, xa1 may be 1, $R_{201}$ may be one of the groups represented by Formulae CY201 to CY203, xa2 may be 0, and $R_{202}$ may be one of the groups represented by Formulae CY204 to CY207.

In one or more embodiments, each of Formulae 201 and 202 may not include (e.g., may exclude any of) the groups represented by Formulae CY201 to CY203.

In one or more embodiments, each of Formulae 201 and 202 may not include (e.g., may exclude any of) the groups represented by Formulae CY201 to CY203, and may include at least one of the groups represented by Formulae CY204 to CY217.

In one or more embodiments, each of Formulae 201 and 202 may not include (e.g., may exclude any of) the groups represented by Formulae CY201 to CY217.

For example, the hole transport region may include: at least one of (e.g., selected from among) Compounds HT1 to HT46; m-MTDATA; TDATA; 2-TNATA; NPB(NPD); β-NPB; TPD; spiro-TPD; spiro-NPB; methylated NPB; TAPC; HMTPD; 4,4',4"-tris(N-carbazolyl)triphenylamine (TCTA); polyaniline/dodecylbenzenesulfonic acid (PANI/DBSA); poly(3,4-ethylenedioxythiophene)/poly(4-styrenesulfonate) (PEDOT/PSS); polyaniline/camphor sulfonic acid (PANI/CSA); polyaniline/poly(4-styrenesulfonate) (PANI/PSS); and/or a (e.g., any suitable) combination thereof:

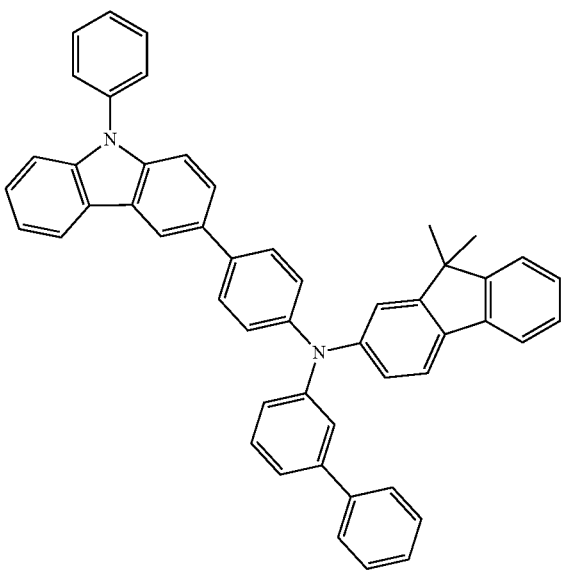

HT2

HT3
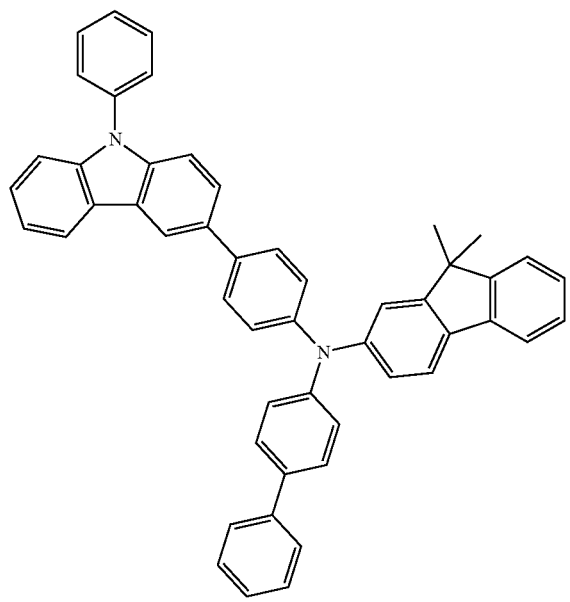
HT4
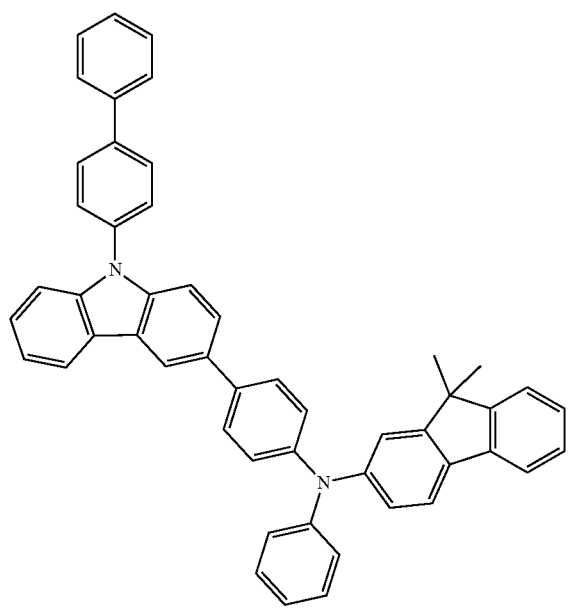
HT5
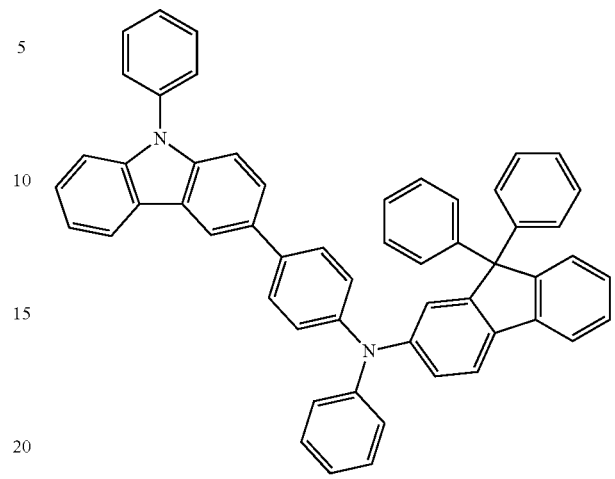
HT6
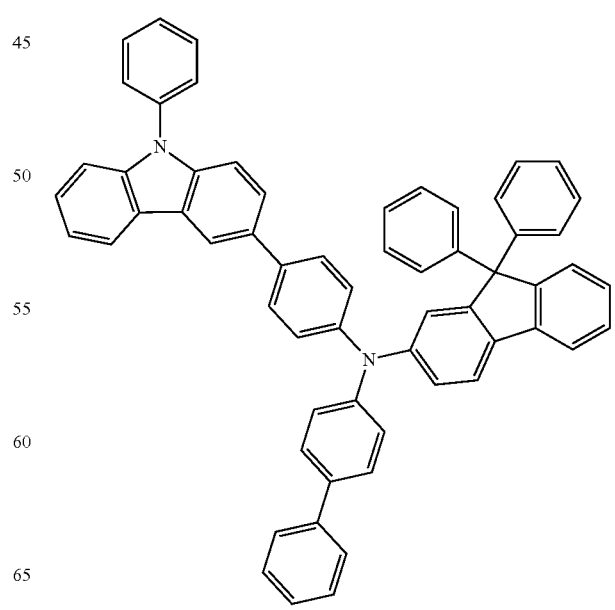

HT7
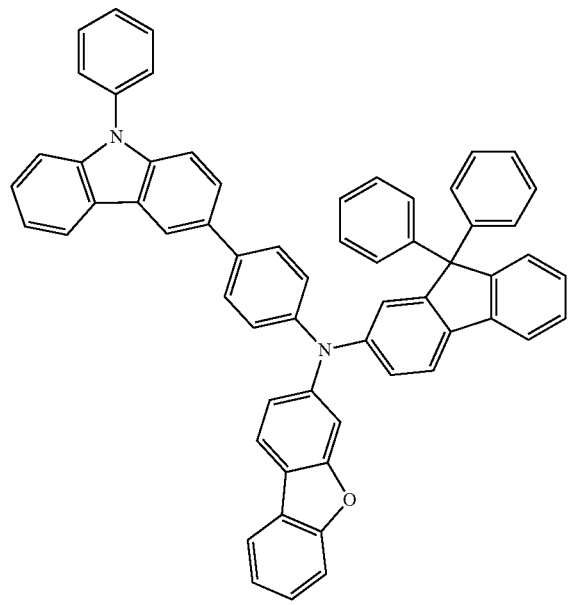
HT9
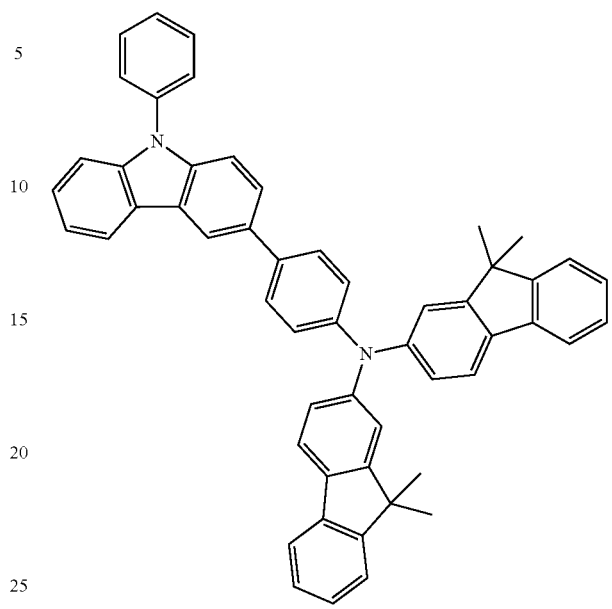
HT8
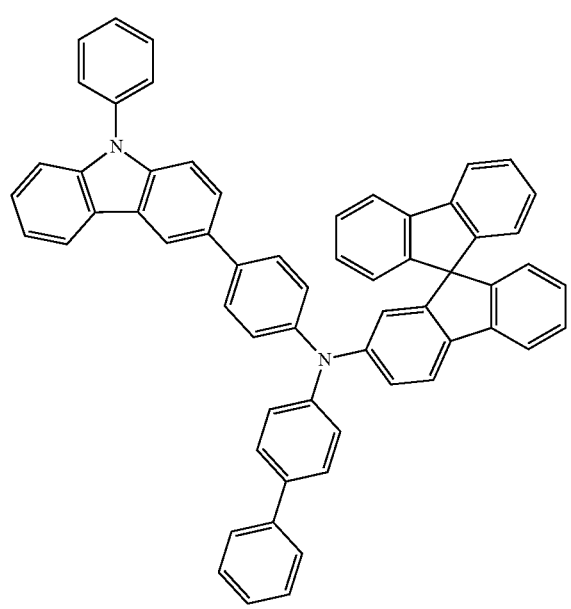
HT10
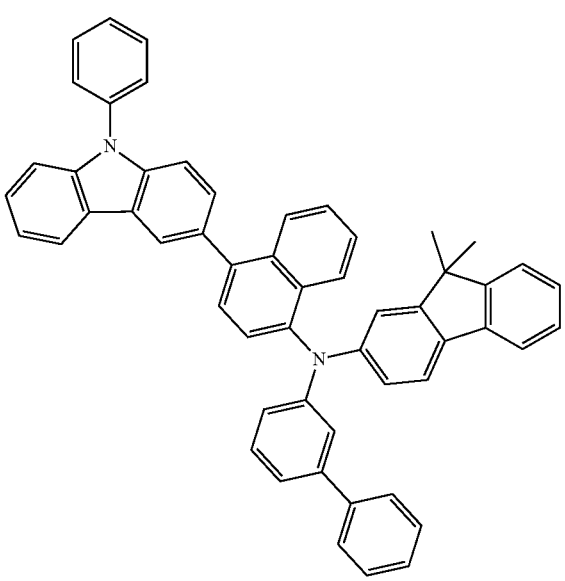

HT11
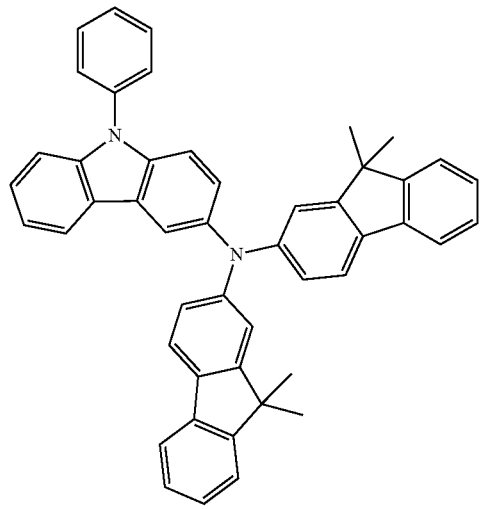
HT12
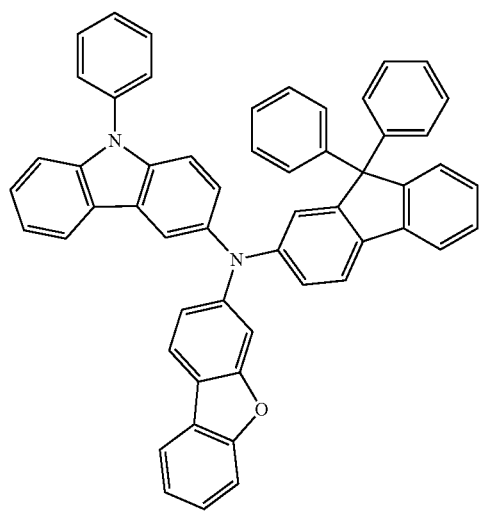
HT13
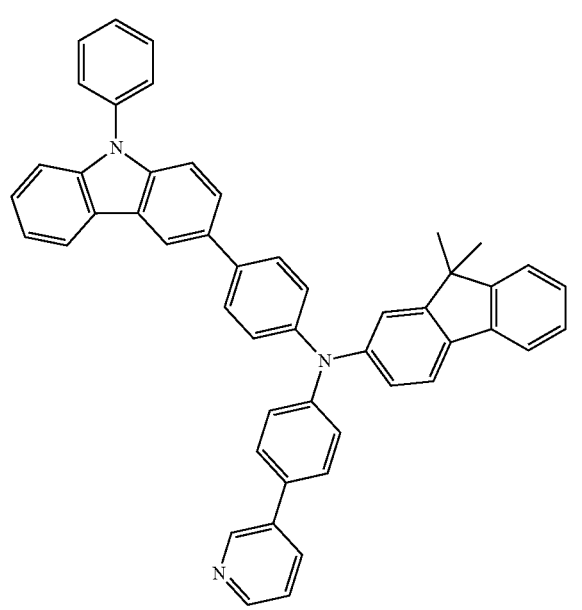
HT14
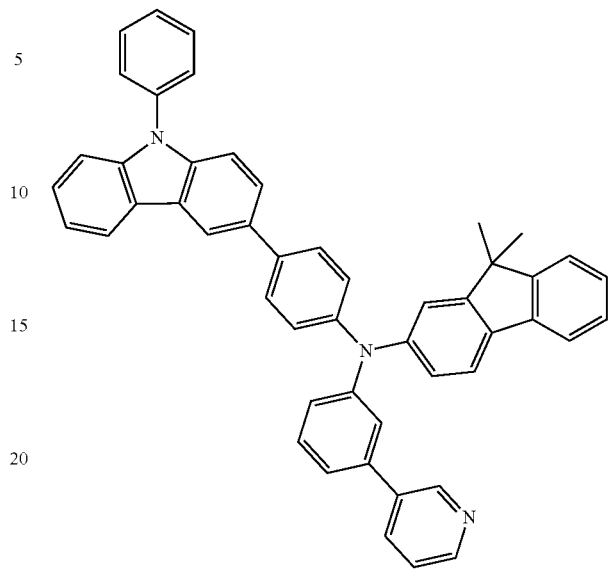
HT15
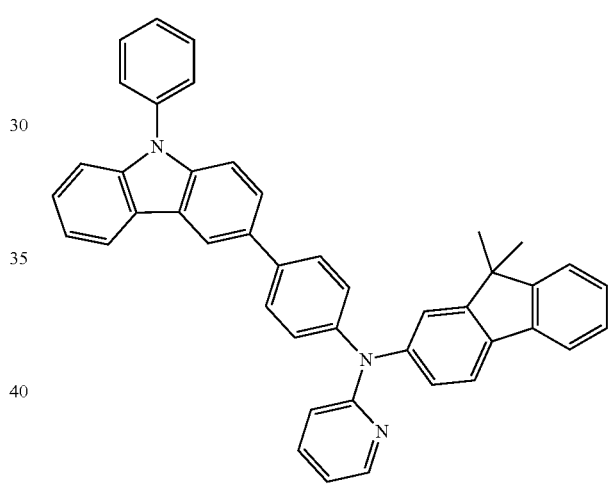
HT16
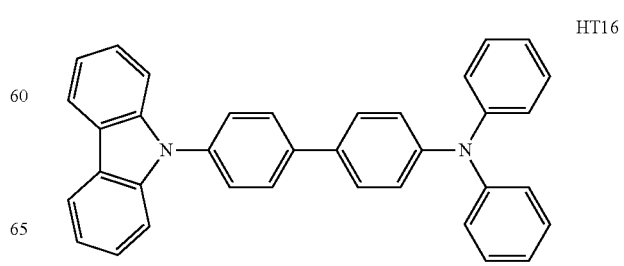

HT17
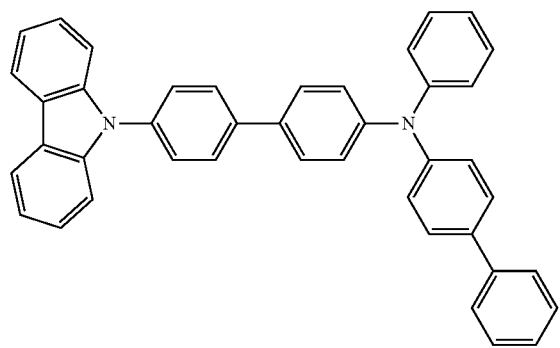
HT18
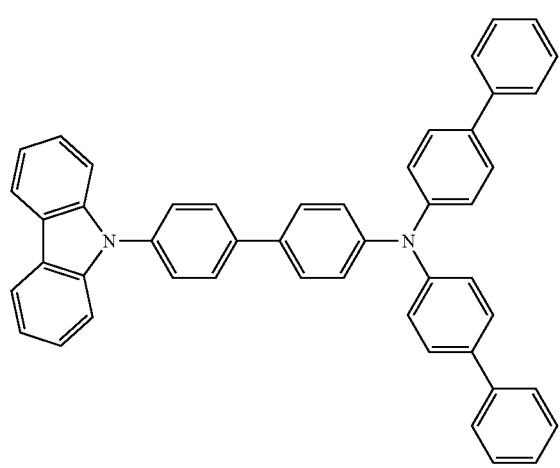
HT19
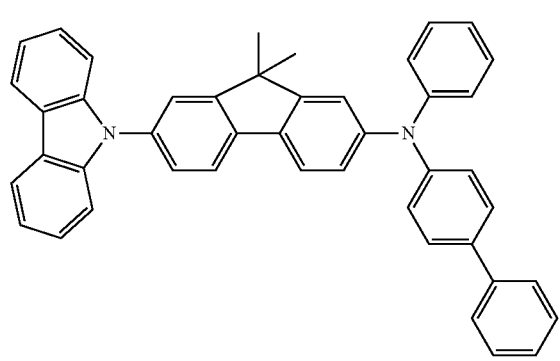
HT20
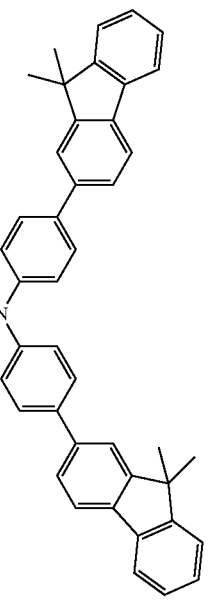
HT21
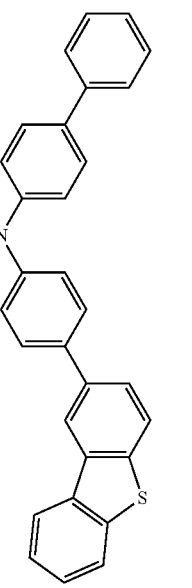
HT22
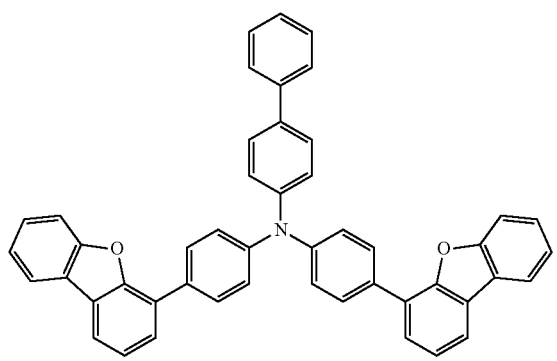

HT23
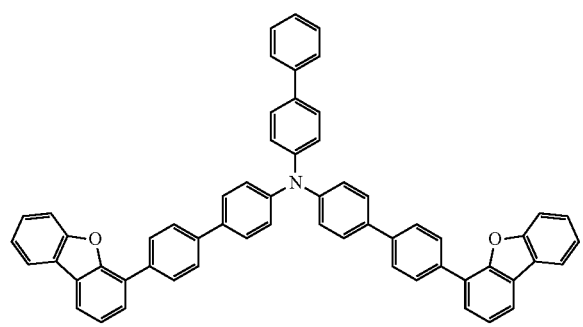
HT24
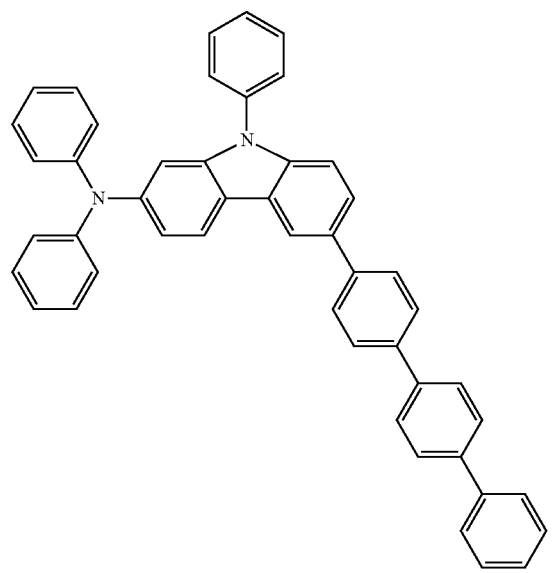
HT25
HT26
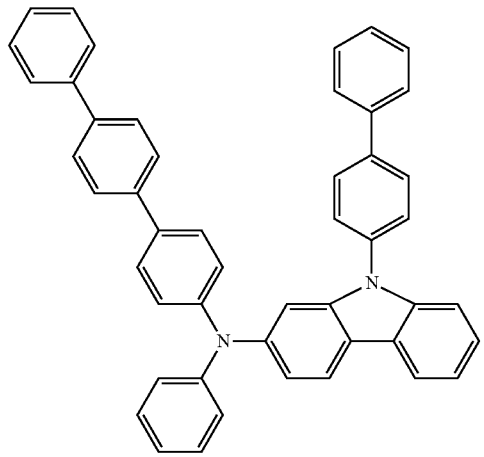
HT27
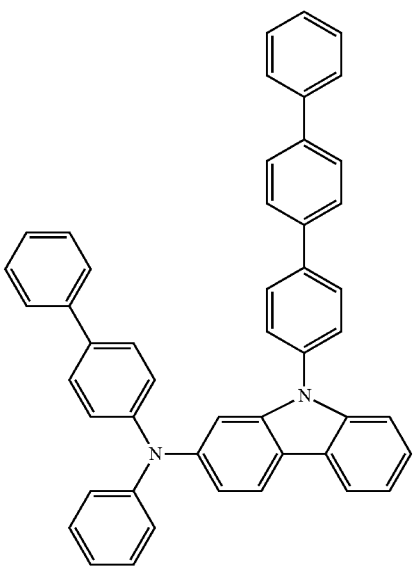
HT28
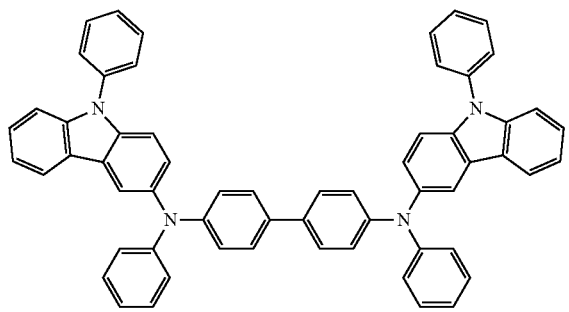

HT29
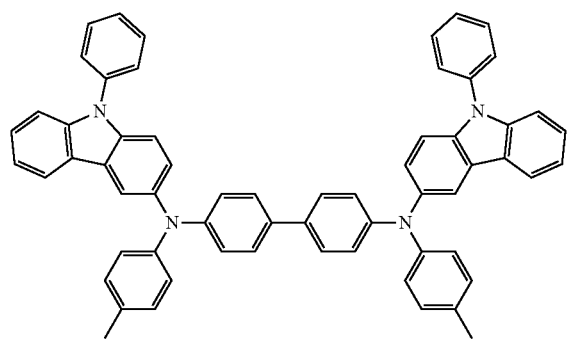
HT30
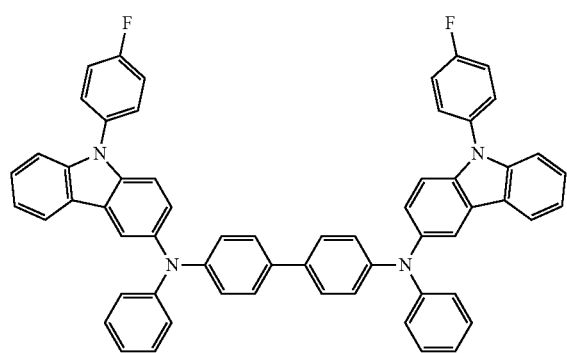
HT31
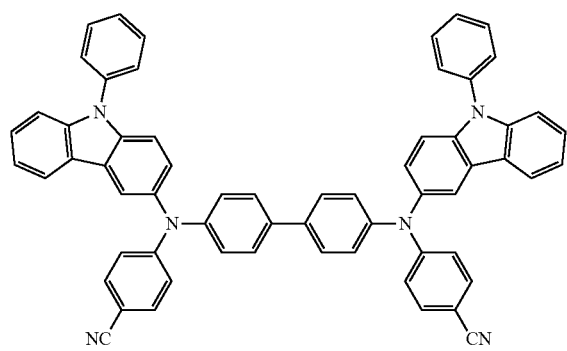
HT32
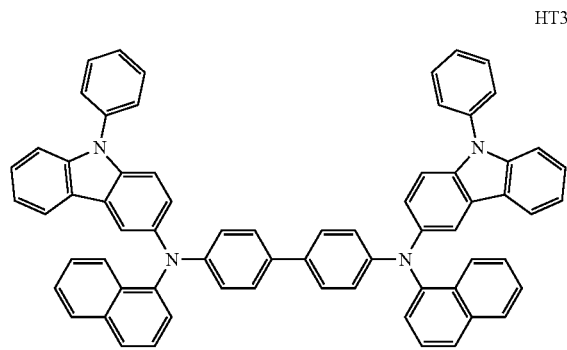
HT33
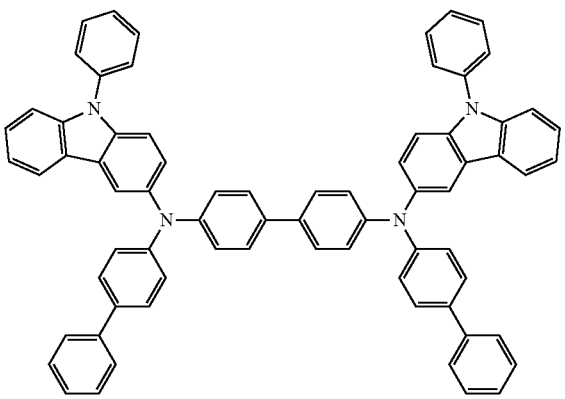
HT34
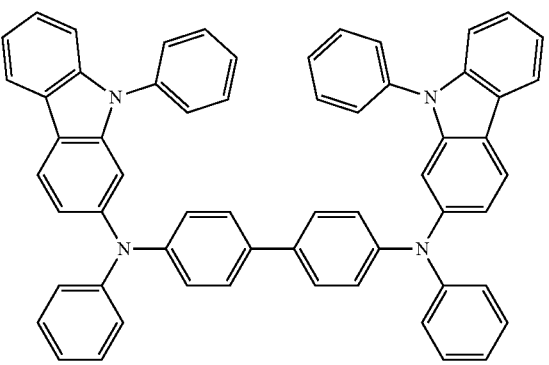
HT35
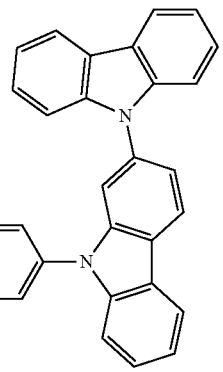

HT36
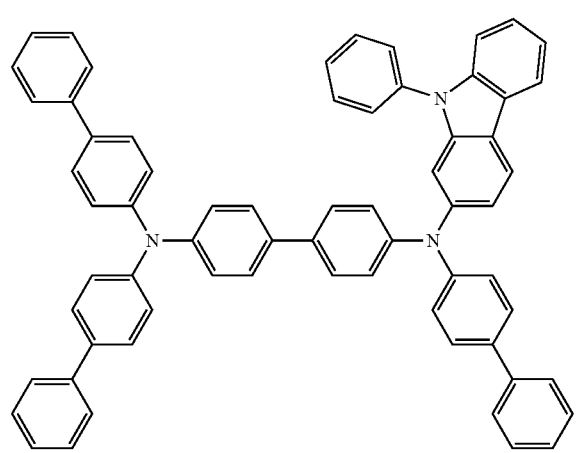
HT37
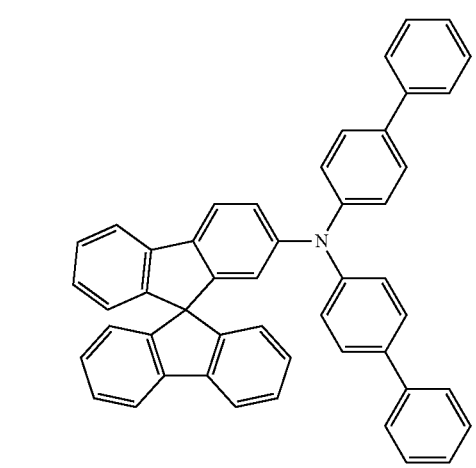
HT38
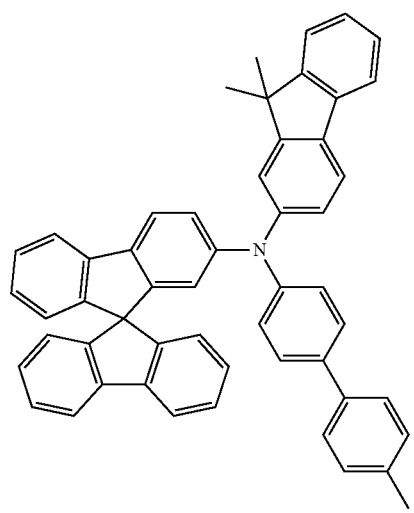
HT39
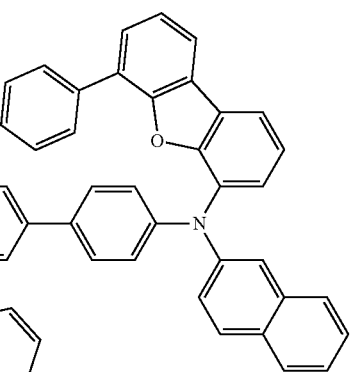
HT40
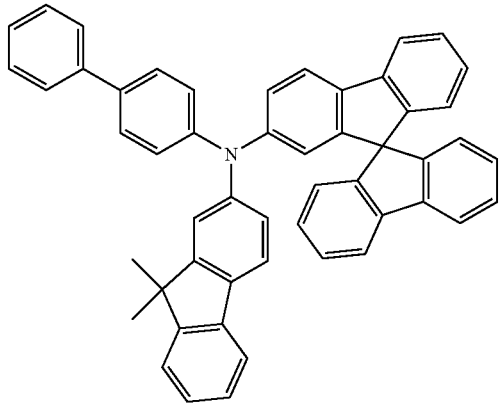
HT41
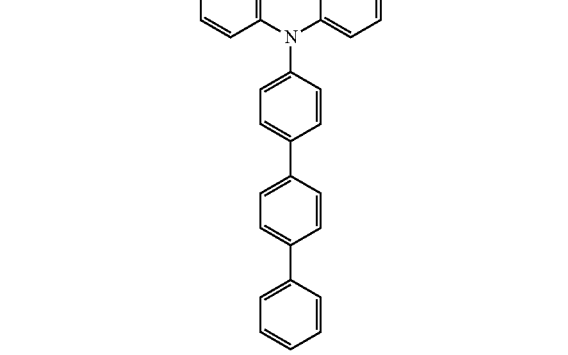
HT42
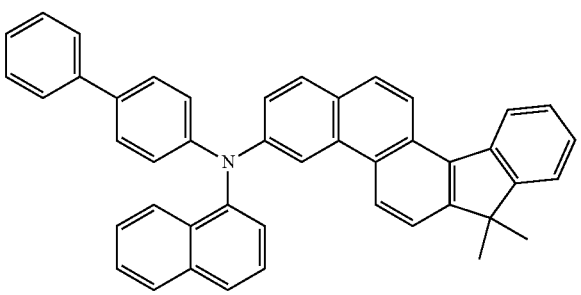

HT43
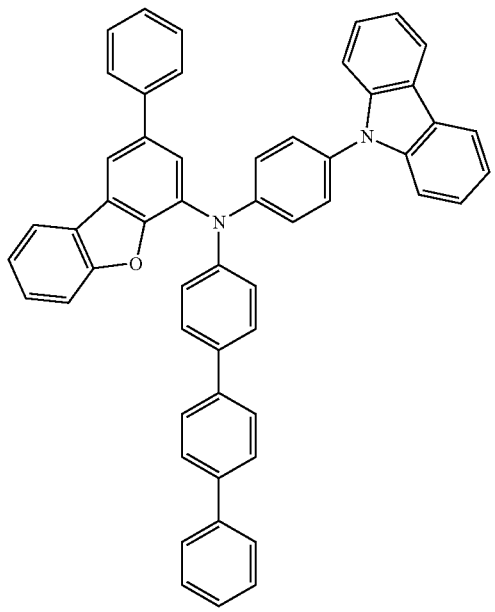
HT44
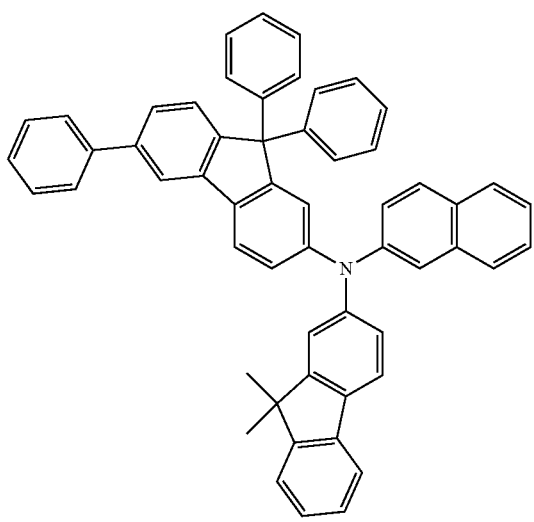
HT45
HT46
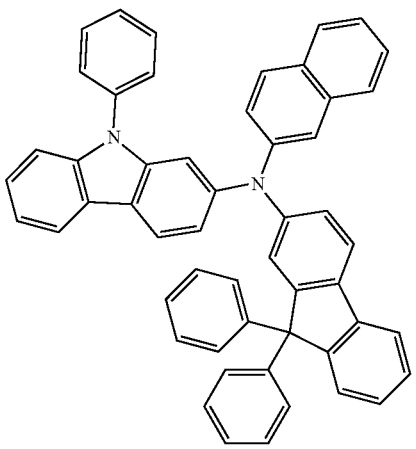
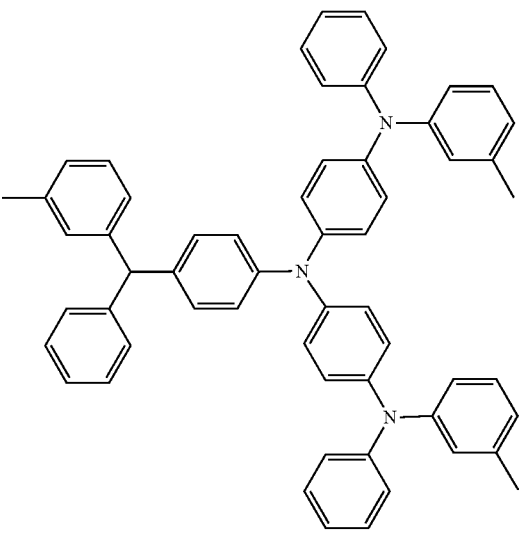
m-MTDATA
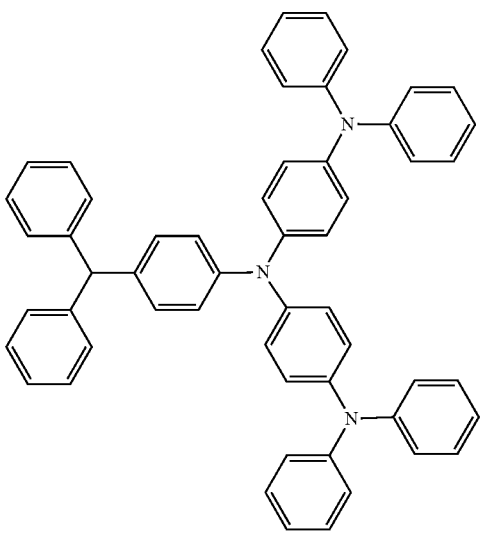
TDATA

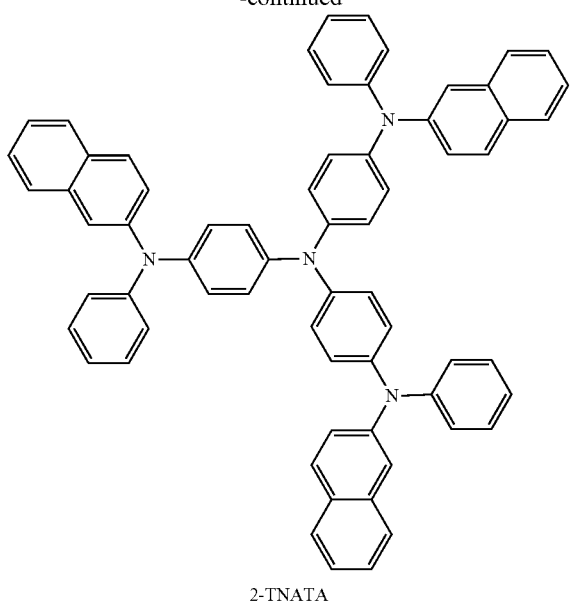
2-TNATA
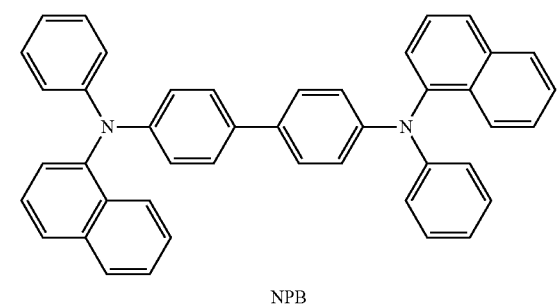
NPB
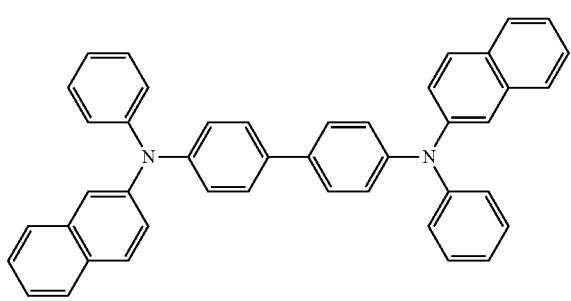
β-NPB
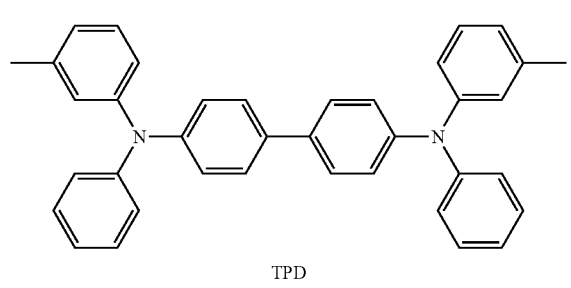
TPD
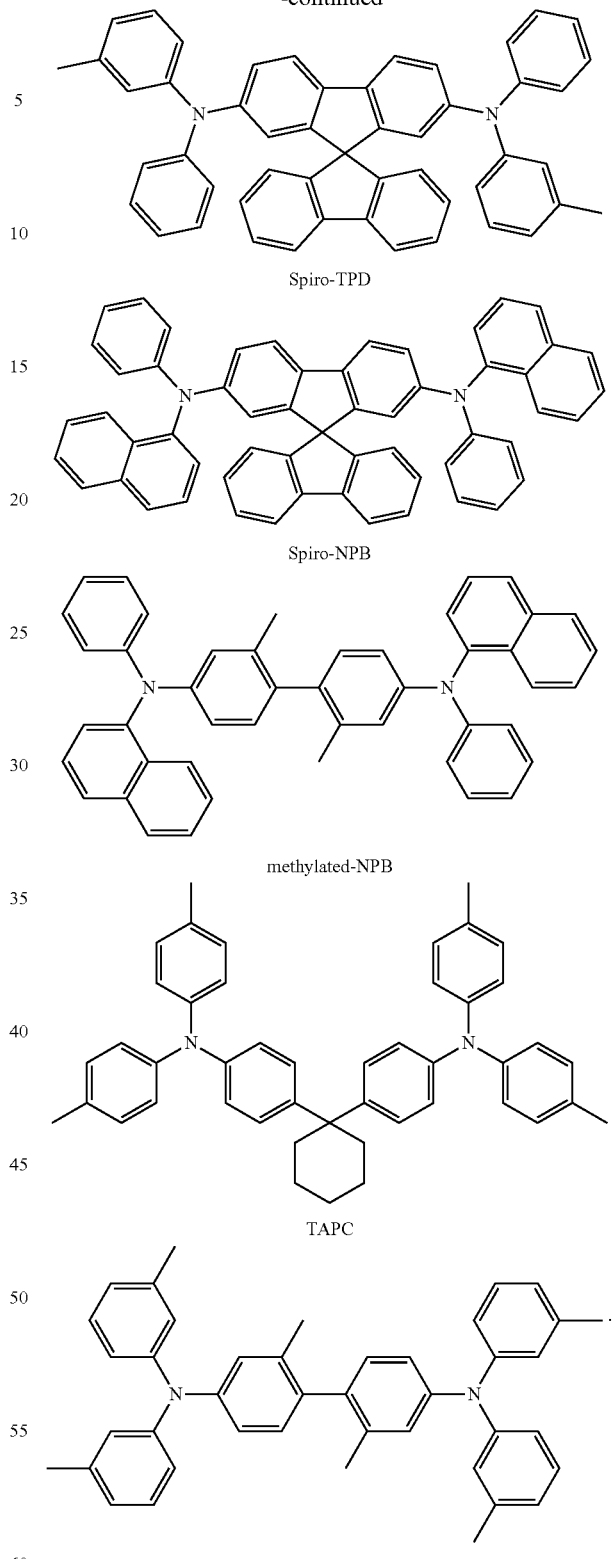
Spiro-TPD
Spiro-NPB
methylated-NPB
TAPC
HMTPD
The thickness of the hole transport region may be in a range of about 50 Å to about 10,000 Å, for example, about 100 Å to about 4,000 Å. When the hole transport region includes a hole injection layer, a hole transport layer, and/or a (e.g., any suitable) combination thereof, a thickness of the hole injection layer may be in a range of about 100 Å to about 9,000 Å, for example, about 100 Å to about 1,000 Å, and a thickness of the hole transport layer may be in a range of about 50 Å to about 2,000 Å, for example, about 100 Å to about 1,500 Å. When the thicknesses of the hole transport region, the hole injection layer, and the hole transport layer are within these ranges, satisfactory hole transporting characteristics may be obtained without a substantial increase in driving voltage.

The emission auxiliary layer may increase light-emission efficiency by compensating for an optical resonance distance according to the wavelength of light emitted by the emission layer, and the electron blocking layer may block or reduce the leakage of electrons from the emission layer to the hole transport region. Materials that may be included in the hole transport region may be included in the emission auxiliary layer and the electron blocking layer.

p-Dopant

The hole transport region may further include, in addition to these materials, a charge-generation material for the improvement of conductive properties. The charge-generation material may be uniformly (e.g., substantially uniformly) or non-uniformly dispersed in the hole transport region (for example, in the form of a single layer consisting of a charge-generation material).

The charge-generation material may be, for example, a p-dopant.

For example, the p-dopant may have a lowest unoccupied molecular orbital (LUMO) energy level of less than or equal to −3.5 eV.

In one or more embodiments, the p-dopant may include a quinone derivative, a cyano group-containing compound, a compound including element EL1 and element EL2, and/or a (e.g., any suitable) combination thereof.

Examples of the quinone derivative are TCNQ, F4-TCNQ, and/or the like.

Examples of the cyano group-containing compound are HAT-CN, a compound represented by Formula 221, and/or the like:

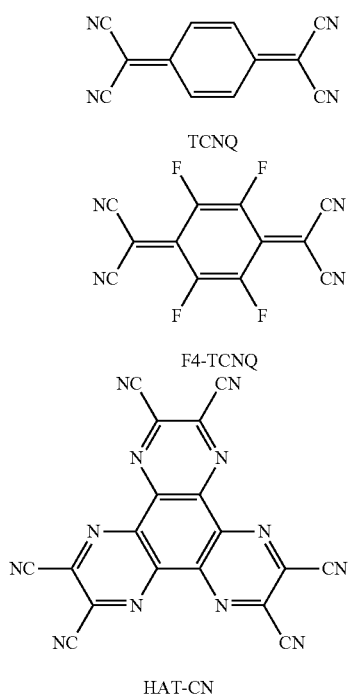

TCNQ

F4-TCNQ

HAT-CN

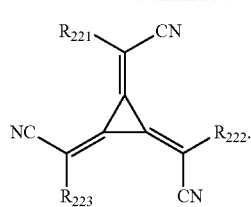

Formula 221

In Formula 221, $R_{221}$ to $R_{223}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$, and at least one of $R_{221}$ to $R_{223}$ may each independently be a $C_3$-$C_{60}$ carbocyclic group or a $C_1$-$C_{60}$ heterocyclic group, each substituted with: a cyano group; —F; —Cl; —Br; —I; a $C_1$-$C_{20}$ alkyl group substituted with a cyano group, —F, —Cl, —Br, —I, and/or a (e.g., any suitable) combination thereof; and/or a (e.g., any suitable) combination thereof.

In the compound including element EL1 and element EL2, element EL1 may be a metal, a metalloid, and/or a (e.g., any suitable) combination thereof, and element EL2 may be a non-metal, a metalloid, and/or a (e.g., any suitable) combination thereof.

Examples of the metal are alkali metals (for example, lithium ($L_i$), sodium (Na), potassium (K), rubidium (Rb), cesium (Cs), and/or the like); alkaline earth metals (for example, beryllium (Be), magnesium (Mg), calcium (Ca), strontium (Sr), barium (Ba), and/or the like); transition metals (for example, titanium (Ti), zirconium (Zr), hafnium (Hf), vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), and/or the like); post-transition metals (for example, zinc (Zn), indium (In), tin (Sn), and/or the like); lanthanide metals (for example, lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and/or the like); and/or the like.

Examples of the metalloid are silicon (Si), antimony (Sb), tellurium (Te), and/or the like.

Examples of the non-metal are oxygen (O), halogen (for example, F, Cl, Br, I, and/or the like), and/or the like.

Examples of the compound including element EL1 and element EL2 are metal oxides, metal halides (for example, metal fluoride, metal chloride, metal bromide, metal iodide, and/or the like), metalloid halides (for example, metalloid fluoride, metalloid chloride, metalloid bromide, metalloid iodide, and/or the like), metal tellurides, and/or a (e.g., any suitable) combination thereof.

Examples of the metal oxide are tungsten oxides (for example, WO, $W_2O_3$, $WO_2$, $WO_3$, $W_2O_5$, and/or the like), vanadium oxides (for example, VO, $V_2O_3$, $VO_2$, $V_2O_5$, and/or the like), molybdenum oxides (MoO, $Mo_2O_3$, $MoO_2$, $MoO_3$, $Mo_2O_5$, and/or the like), rhenium oxides (for example, $ReO_3$, and/or the like), and/or the like.

Examples of the metal halide are alkali metal halides, alkaline earth metal halides, transition metal halides, post-transition metal halides, lanthanide metal halides, and/or the like.

Examples of the alkali metal halide are LiF, NaF, KF, RbF, CsF, LiCl, NaCl, KCl, RbCl, CsCl, LiBr, NaBr, KBr, RbBr, CsBr, LiI, NaI, KI, RbI, CsI, and/or the like.

Examples of the alkaline earth metal halide are $BeF_2$, $MgF_2$, $CaF_2$, $SrF_2$, $BaF_2$, $BeCl_2$, $MgCl_2$, $CaCl_2$), $SrCl_2$, $BaCl_2$, $BeBr_2$, $MgBr_2$, $CaBr_2$, $SrBr_2$, $BaBr_2$, $BeI_2$, $MgI_2$, $CaI_2$, $SrI_2$, $BaI_2$, and/or the like.

Examples of the transition metal halide are titanium halide (for example, $TiF_4$, $TiCl_4$, $TiBr_4$, $TiI_4$, and/or the like), zirconium halide (for example, $ZrF_4$, $ZrCl_4$, $ZrBr_4$, $ZrI_4$, and/or the like), hafnium halide (for example, $HfF_4$, $HfCl_4$, $HfBr_4$, $HfI_4$, and/or the like), vanadium halide (for example, $VF_3$, $VCl_3$, $VBr_3$, $VI_3$, and/or the like), niobium halide (for example, $NbF_3$, $NbCl_3$, $NbBr_3$, $NbI_3$, and/or the like), tantalum halide (for example, $TaF_3$, $TaCl_3$, $TaBr_3$, $TaI_3$, and/or the like), chromium halide (for example, $CrF_3$, $CrCl_3$, $CrBr_3$, $CrI_3$, and/or the like), molybdenum halide (for example, $MoF_3$, $MoCl_3$, $MoBr_3$, $MoI_3$, and/or the like), tungsten halide (for example, $WF_3$, $WCl_3$, $WBr_3$, $WI_3$, and/or the like), manganese halide (for example, $MnF_2$, $MnCl_2$, $MnBr_2$, $MnI_2$, and/or the like), technetium halide (for example, $TcF_2$, $TcCl_2$, $TcBr_2$, $TcI_2$, and/or the like), rhenium halide (for example, $ReF_2$, $ReCl_2$, $ReBr_2$, $ReI_2$, and/or the like), Iron (II) halide (for example, $FeF_2$, $FeCl_2$, $FeBr_2$, $FeI_2$, and/or the like), ruthenium halide (for example, $RuF_2$, $RuCl_2$, $RuBr_2$, $RuI_2$, and/or the like), osmium halide (for example, $OsF_2$, $OsCl_2$, $OsBr_2$, $OsI_2$, and/or the like), cobalt halide (for example, $CoF_2$, $CoCl_2$, $CoBr_2$, $CoI_2$, and/or the like), rhodium halide (for example, $RhF_2$, $RhCl_2$, $RhBr_2$, $RhI_2$, and/or the like), iridium halide (for example, $IrF_2$, $IrCl_2$, $IrBr_2$, $IrI_2$, and/or the like), nickel halide (for example, $NiF_2$, $NiCl_2$, $NiBr_2$, $NiI_2$, and/or the like), palladium halide (for example, $PdF_2$, $PdCl_2$, $PdBr_2$, $PdI_2$, and/or the like), platinum halide (for example, $PtF_2$, $PtCl_2$, $PtBr_2$, $PtI_2$, and/or the like), Copper (I) halide (for example, CuF, CuCl, CuBr, CuI, and/or the like), silver halide (for example, AgF, AgCl, AgBr, AgI, and/or the like), gold halide (for example, AuF, AuCl, AuBr, AuI, and/or the like), and/or the like.

Examples of the post-transition metal halide are zinc halides (for example, $ZnF_2$, $ZnCl_2$, $ZnBr_2$, $ZnI_2$, and/or the like), indium halides (for example, $InI_3$, and/or the like), tin halides (for example, $SnI_2$, and/or the like), and/or the like.

Examples of the lanthanide metal halide are YbF, $YbF_2$, $YbF_3$, $SmF_3$, YbCl, $YbCl_2$, $YbCl_3$ $SmCl_3$, YbBr, $YbBr_2$, $YbBr_3 SmBr_3$, YbI, $YbI_2$, $YbI_3$, and $SmI_3$.

Examples of the metalloid halide are antimony halides (for example, $SbCl_5$, and/or the like.) and/or the like.

Examples of the metal telluride are alkali metal tellurides (for example, $Li_2Te$, $Na_2Te$, $K_2Te$, $Rb_2Te$, $Cs_2Te$, and/or the like), alkaline earth metal tellurides (for example, BeTe, MgTe, CaTe, SrTe, BaTe, and/or the like), transition metal tellurides (for example, $TiTe_2$, $ZrTe_2$, $HfTe_2$, $V_2Te_3$, $Nb_2Te_3$, $Ta_2Te_3$, $Cr_2Te_3$, $Mo_2Te_3$, $W_2Te_3$, MnTe, TcTe, ReTe, FeTe, RuTe, OsTe, CoTe, RhTe, IrTe, NiTe, PdTe, PtTe, $Cu_2Te$, CuTe, $Ag_2Te$, AgTe, $Au_2Te$, and/or the like), post-transition metal tellurides (for example, ZnTe, and/or the like), lanthanide metal tellurides (for example, LaTe, CeTe, PrTe, NdTe, PmTe, EuTe, GdTe, TbTe, DyTe, HoTe, ErTe, TmTe, YbTe, LuTe, and/or the like), and/or the like.

Emission Layer in Interlayer 130

When the light-emitting device is a full-color light-emitting device, the emission layer may be patterned into a red emission layer, a green emission layer, and/or a blue emission layer, according to a sub-pixel. In one or more embodiments, the emission layer may have a stacked structure of two or more layers of a red emission layer, a green emission layer, and a blue emission layer, in which the two or more layers contact each other or are separated from each other, to emit white light. In one or more embodiments, the emission layer may include two or more materials of a red light-emitting material, a green light-emitting material, and a blue light-emitting material, in which the two or more materials are mixed with each other in a single layer, to emit white light.

The emission layer may include a quantum dot.

The term "quantum dot" as used herein refers to a crystal of a semiconductor compound, and may include any material capable of emitting light of one or more suitable emission wavelengths according to the size of the crystal. Quantum dots may be to emit light of one or more suitable emission wavelengths by adjusting a ratio of elements constituting the quantum dots.

A diameter of the quantum dot may be, for example, in a range of about 1 nm to about 10 nm.

The quantum dot may be synthesized by a wet chemical process, a metal organic chemical vapor deposition process, a molecular beam epitaxy process, or any process similar thereto.

The wet chemical process is a method including mixing a precursor material with an organic solvent and then growing quantum dot particle crystals. When the crystal grows, the organic solvent naturally acts as a dispersant coordinated on the surface of the quantum dot crystal and controls the growth of the crystal so that the growth of quantum dot particles can be controlled or selected through a process which costs less, and is easier than vapor deposition methods, such as metal organic chemical vapor deposition (MOCVD) and/or molecular beam epitaxy (MBE).

The quantum dot may include: a Group II-VI semiconductor compound; a Group III-V semiconductor compound; a Group III-VI semiconductor compound; a Group I-III-VI semiconductor compound; a Group IV-VI semiconductor compound; a Group IV element or compound; and/or a (e.g., any suitable) combination thereof.

Examples of the Group II-VI semiconductor compound are: a binary compound, such as CdS, CdSe, CdTe, ZnS, ZnSe, ZnTe, ZnO, HgS, HgSe, HgTe, MgSe, MgS, and/or the like; a ternary compound, such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and/or the like; a quaternary compound, such as CdZnSeS, CdZnSeTe, CdZnSTe, CdHgSeS, CdHgSeTe, CdHgSTe, HgZnSeS, HgZnSeTe, HgZnSTe, and/or the like; and/or a (e.g., any suitable) combination thereof.

Examples of the Group III-V semiconductor compound are: a binary compound, such as GaN, GaP, GaAs, GaSb, AlN, AlP, AlAs, AlSb, InN, InP, InAs, InSb, and/or the like; a ternary compound, such as GaNP, GaNAs, GaNSb, GaPAs, GaPSb, AlNP, AlNAs, AlNSb, AlPAs, AlPSb, InGaP, InNP, InAlP, InNAs, InNSb, InPAs, InPSb, and/or the like; a quaternary compound, such as GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and/or the like; and/or a (e.g., any suitable) combination thereof. In one or more embodiments, the Group III-V semiconductor compound may further include a Group II element. Examples of the Group III-V semiconductor compound further including the Group II element are InZnP, InGaZnP, InAlZnP, and/or the like.

Examples of the Group III-VI semiconductor compound are: a binary compound, such as GaS, GaSe, $Ga_2Se_3$, GaTe, InS, InSe, $In_2S_3$, $In_2Se_3$, InTe, and/or the like; a ternary compound, such as $InGaS_3$, $InGaSe_3$, and/or the like; and/or a (e.g., any suitable) combination thereof.

Examples of the Group I-III-VI semiconductor compound may include: a ternary compound, such as AgInS, $AgInS_2$, $AgInSe_2$, AgGaS, $AgGaS_2$, $AgGaSe_2$, CuInS, $CuInS_2$, $CuInSe_2$, $CuGaS_2$, $CuGaSe_2$, $CuGaO_2$, $AgGaO_2$, $AgAlO_2$, and/or the like; a quaternary compound, such as $AgInGaS_2$, $AgInGaSe_2$, and/or the like; and/or a (e.g., any suitable) combination thereof.

Examples of the Group IV-VI semiconductor compound are: a binary compound, such as SnS, SnSe, SnTe, PbS, PbSe, PbTe, and/or the like; a ternary compound, such as SnSeS, SnSeTe, SnSTe, PbSeS, PbSeTe, PbSTe, SnPbS, SnPbSe, SnPbTe, and/or the like; a quaternary compound, such as SnPbSSe, SnPbSeTe, SnPbSTe, and/or the like; and/or a (e.g., any suitable) combination thereof.

Examples of the Group IV element or compound are: a single element compound, such as Si, Ge, and/or the like; a binary compound, such as SiC, SiGe, and/or the like; and/or a (e.g., any suitable) combination thereof.

Each element included in a multi-element compound, such as the binary compound, the ternary compound, and the quaternary compound, may be present at a substantially uniform concentration or non-uniform concentration in a particle. For example, the formulae above refers to types (kinds) of elements included in the compound, wherein the element ratios in the compound may vary. For example, $AgInGaS_2$ refers to $AgIn_xGa_{1-x}S_2$ (where x is a real number between 0 and 1).

In one or more embodiments, the quantum dot may have a single structure in which the concentration of each element in the quantum dot is substantially uniform, or may have a core-shell dual structure. For example, a material included in the core and a material included in the shell may be different from each other.

The shell of the quantum dot may act as a protective layer which prevents or reduces chemical denaturation (or degradation) of the core to maintain semiconductor characteristics, and/or as a charging layer which imparts electrophoretic characteristics to the quantum dot. The shell may be single-layered or multi-layered. The interface between the core and the shell may have a concentration gradient in which the concentration of an element existing in the shell decreases toward the center of the core.

Examples of the shell of the quantum dot are an oxide of metal, metalloid, or non-metal, a semiconductor compound, and/or a (e.g., any suitable) combination thereof. Examples of the oxide of metal, metalloid, or non-metal are: a binary compound, such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, NiO, and/or the like; a ternary compound, such as $MgAl_2O_4$, $CoFe_2O_4$, $NiFe_2O_4$, $CoMn_2O_4$, and/or the like; and/or a (e.g., any suitable) combination thereof. Examples of the semiconductor compound are: as described herein, a Group II-VI semiconductor compound; a Group III-V semiconductor compound; a Group III-VI semiconductor compound; a Group I-III-VI semiconductor compound; a Group IV-VI semiconductor compound; and/or a (e.g., any suitable) combination thereof. Examples of the semiconductor compound are CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, and/or a (e.g., any suitable) combination thereof.

Each element included in the multi-element compound such as the binary compound and the ternary compound may be present in the particle at a substantially uniform or non-uniform concentration. For example, the formulae above refers to types (kinds) of elements included in the compound, wherein the element ratios in the compound may vary.

The quantum dot may have a full width of half maximum (FWHM) of the emission wavelength spectrum of less than or equal to about 45 nm, less than or equal to about 40 nm, or for example, less than or equal to about 30 nm. When the FWHM of the quantum dot is within these ranges, the quantum dot may have improved color purity or improved color reproducibility. In addition, because light emitted through the quantum dot is emitted in all directions, the wide viewing angle may be improved.

In one or more embodiments, the quantum dot may be in the form of spherical, pyramidal, multi-arm, or cubic nanoparticles, nanotubes, nanowires, nanofibers, or nanoplate particles. In one or more embodiments, the quantum dot may be the quantum dot according to one or more embodiments of the present disclosure.

Because the energy band gap may be adjusted by controlling the size of the quantum dot, light having one or more suitable wavelength bands may be obtained from the quantum dot emission layer. Accordingly, by using quantum dots of different sizes, a light-emitting device that emits light of one or more suitable wavelengths may be implemented. For example, the control of the size of the quantum dots or the ratio of elements in the quantum dot compound may be selected to emit red light, green light, and/or blue light. In addition, the size of the quantum dots may be configured to emit white light by combination of light of one or more suitable colors.

The emission layer may be formed by applying an ink composition on a hole transport region and volatilizing at least a portion of the solvent included in the ink composition.

The ink composition may be applied using an ink jet printing method, a spin coating method, a casting method, a micro gravure coating method, a gravure coating method, a bar coating method, a roll coating method, a wire bar coating method, a dip coating method, a spray coating method, a screen printing method, a flexographic method, an offset printing method, and/or the like.

In one or more embodiments, the emission layer may further include a host and a dopant, in addition to the quantum dot. The dopant may include a phosphorescent dopant, a fluorescent dopant, and/or a (e.g., any suitable) combination thereof.

The amount of the dopant in the emission layer may be from about 0.01 parts by weight to about 15 parts by weight based on 100 parts by weight of the host.

In one or more embodiments, the emission layer may include a delayed fluorescence material. The delayed fluorescence material may act as a host or a dopant in the emission layer 120.

The thickness of the emission layer may be in a range of about 100 Å to about 1,000 Å, for example, about 200 Å to about 600 Å. When the thickness of the emission layer 15 is within these ranges, excellent or suitable luminescence characteristics may be obtained without a substantial increase in driving voltage.

Host

In one or more embodiments, the host may include a compound represented by Formula 301:

$$[Ar_{301}]_{xb11}-[(L_{301})_{xb1}-R_{301}]_{xb21} \quad \text{Formula 301}$$

wherein, in Formula 301,

Ar$_{301}$ and L$_{301}$ may each independently be a C$_3$-C$_{60}$ carbocyclic group unsubstituted or substituted with at least one R$_{10a}$ or a C$_1$-C$_{60}$ heterocyclic group unsubstituted or substituted with at least one R$_{10a}$, xb11 may be 1, 2, or 3, xb1 may be an integer from 0 to 5, R$_{301}$ may be hydrogen, deuterium, —F, —Cl, —Br, —I, a hydroxyl group, a cyano group, a nitro group, a C$_1$-C$_{60}$ alkyl group unsubstituted or substituted with at least one R$_{10a}$, a C$_2$-C$_{60}$ alkenyl group unsubstituted or substituted with at least one R$_{10a}$, a C$_2$-C$_{60}$ alkynyl group unsubstituted or substituted with at least one R$_{10a}$, a C$_1$-C$_{60}$ alkoxy group unsubstituted or substituted with at least one R$_{10a}$, a C$_3$-C$_{60}$ carbocyclic group unsubstituted or substituted with at least one R$_{10a}$, a C$_1$-C$_{60}$ heterocyclic group unsubstituted or substituted with at least one R$_{10a}$, —Si(Q$_{301}$)(Q$_{302}$)(Q$_{303}$), —N(Q$_{301}$)(Q$_{302}$), —B(Q$_{301}$)(Q$_{302}$), —C(=O)(Q$_{301}$), —S(=O)$_2$(Q$_{301}$), or —P(=O)(Q$_{301}$)(Q$_{302}$), xb21 may be an integer from 1 to 5, and Q$_{301}$ to Q$_{303}$ may each be the same as described in connection with Q$_1$.

For example, if (e.g., when) xb11 in Formula 301 is 2 or more, two or more of Ar$_{301}$ may be linked to each other via a single bond.

In one or more embodiments, the host may include a compound represented by Formula 301-1, a compound represented by Formula 301-2, and/or a (e.g., any suitable) combination thereof:

In Formulae 301-1 and 301-2, ring A$_{301}$ to ring A$_{304}$ may each independently be a C$_3$-C$_{60}$ carbocyclic group unsubstituted or substituted with at least one R$_{10a}$ or a C$_1$-C$_{60}$ heterocyclic group unsubstituted or substituted with at least one R$_{10a}$, X$_{301}$ may be O, S, N-[(L$_{304}$)$_{xb4}$-R$_{304}$], C(R$_{304}$)(R$_{305}$), or Si(R$_{304}$)(R$_{305}$), xb22 and xb23 may each independently be 0, 1, or 2, L$_{301}$, xb1, and R$_{301}$ may each be the same as described herein, L$_{302}$ to L$_{304}$ may each independently be the same as described in connection with L$_{301}$, xb2 to xb4 may each independently be the same as described in connection with xb1, and R$_{302}$ to R$_{305}$ and R$_{311}$ to R$_{314}$ may each be the same as described in connection with R$_{301}$.

In one or more embodiments, the host may include an alkaline earth metal complex, a post-transition metal complex, and/or a (e.g., any suitable) combination thereof. In one or more embodiments, the host may include a Be complex (for example, Compound H55), an Mg complex, a Zn complex, and/or a (e.g., any suitable) combination thereof.

In one or more embodiments, the host may include: at least one of (e.g., selected from among among) Compounds H1 to H128; 9,10-di(2-naphthyl) anthracene (ADN); 2-methyl-9,10-bis(naphthalen-2-yl) anthracene (MADN); 9,10-di-(2-naphthyl)-2-t-butyl-anthracene (TBADN); 4,4'-bis(N-carbazolyl)-1,1'-biphenyl (CBP); 1,3-di(carbazol-9-yl)benzene (mCP); 1,3,5-tri (carbazol-9-yl)benzene (TCP); and/or a (e.g., any suitable) combination thereof:

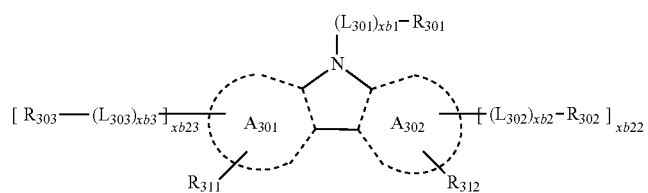

Formula 301-1

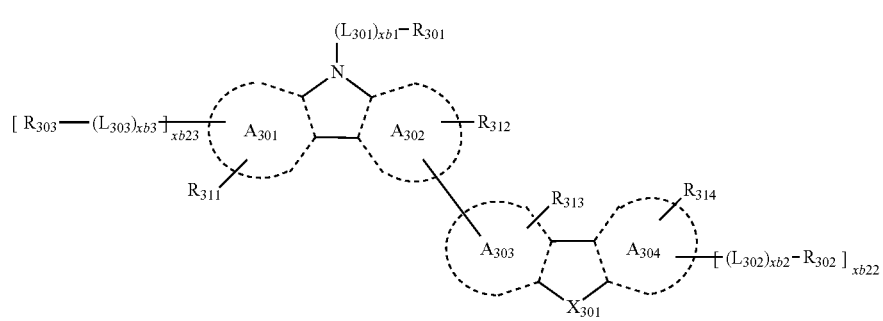

Formula 301-2

H1
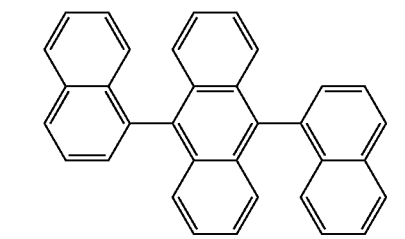
H2
H3
H4
H5
H6
H7
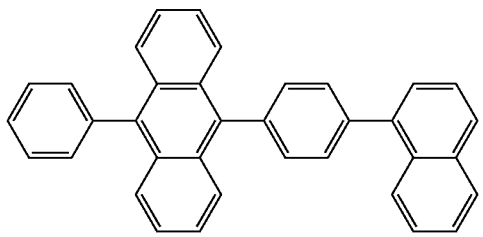
H8
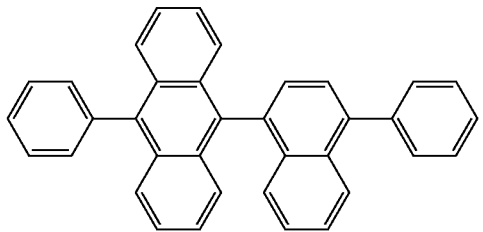
H9
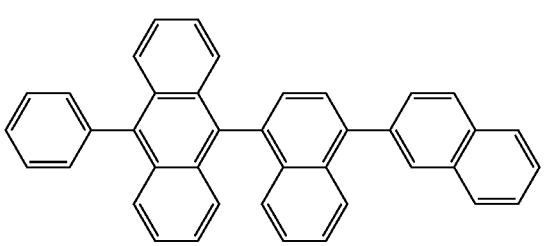
H10
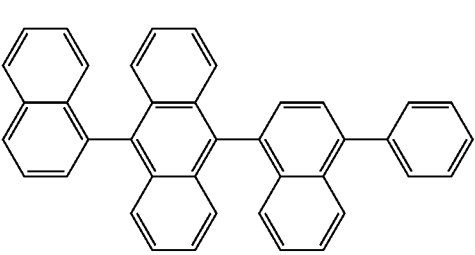
H11
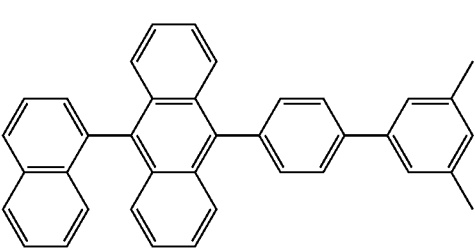
H12
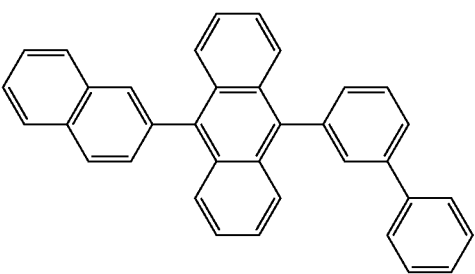

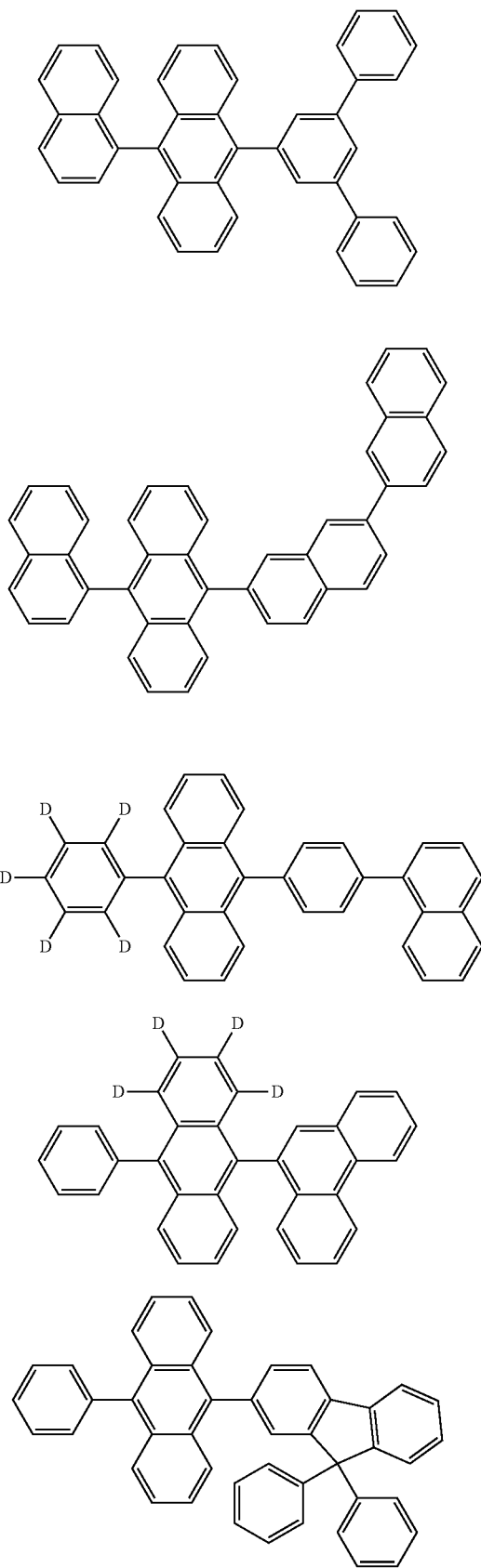

H23
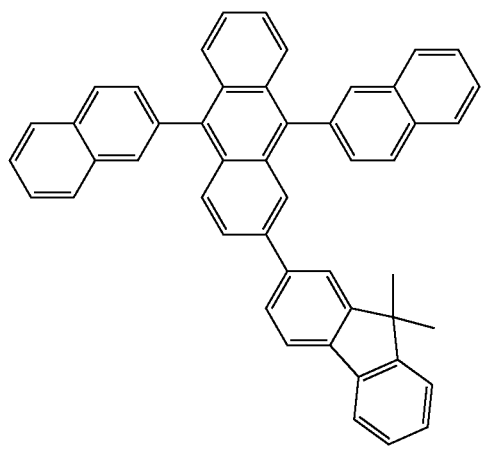
H24
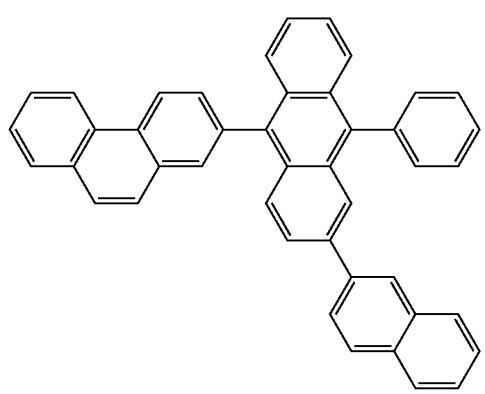
H25
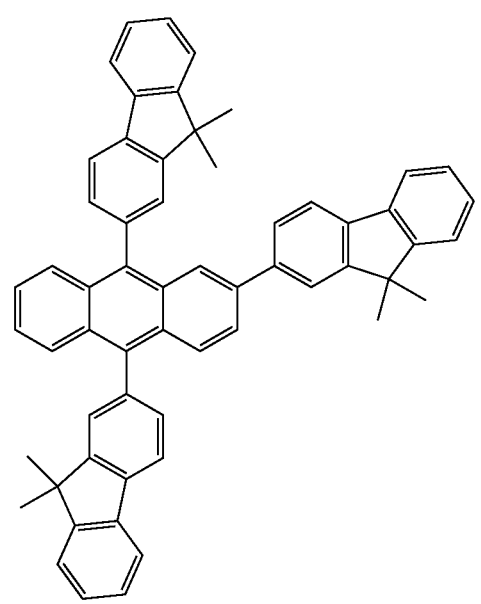
H26
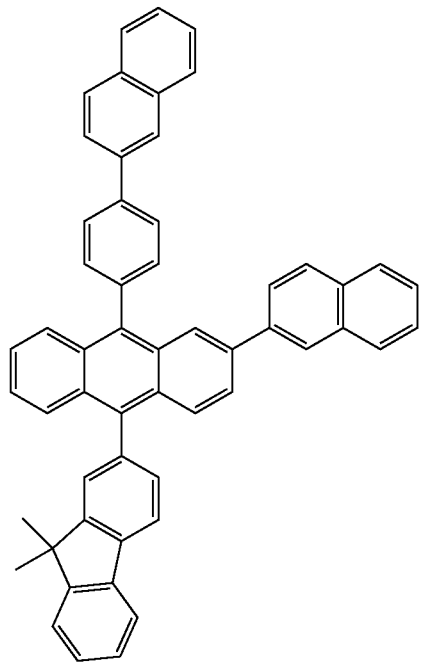
H27
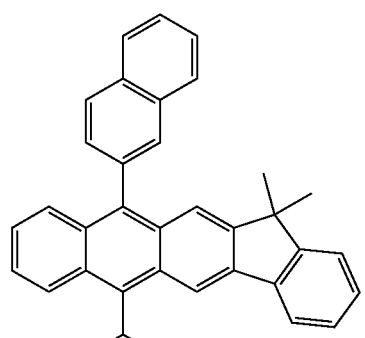
H28
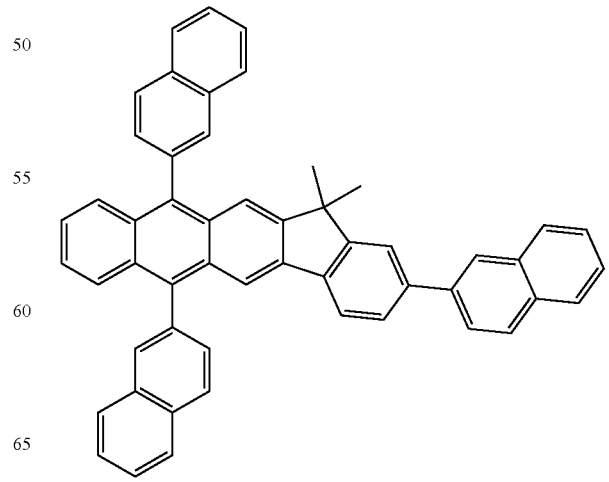

H29
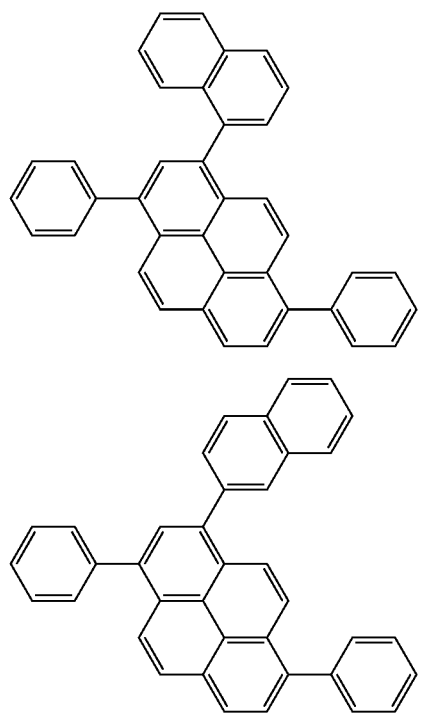
H30
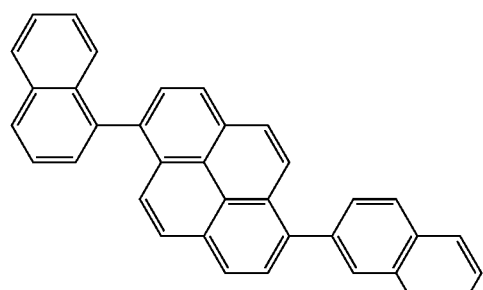
H31
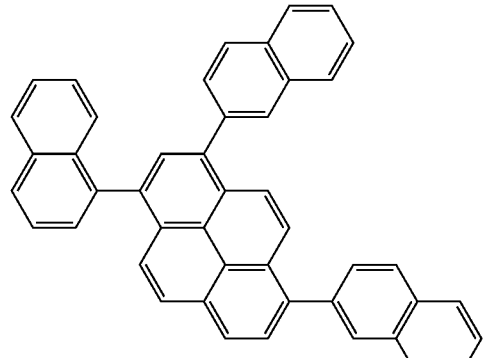
H32
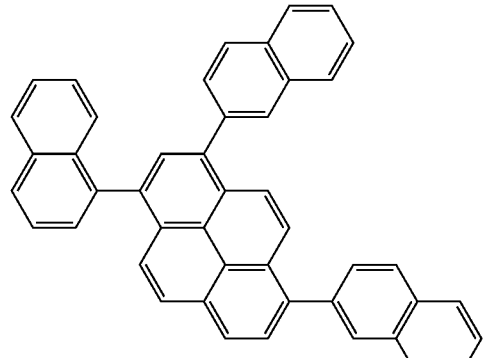
H33
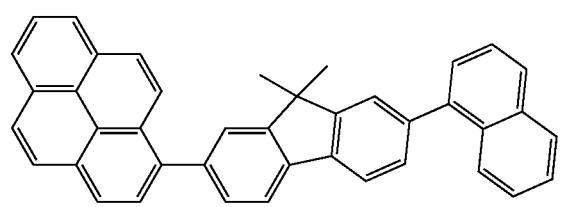
H34
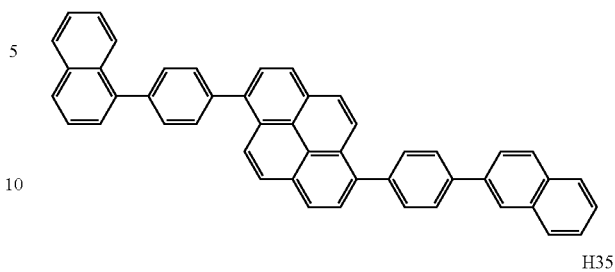
H35
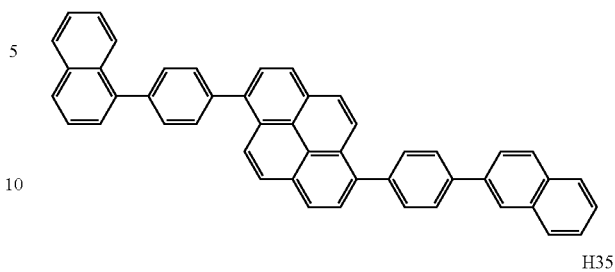
H36
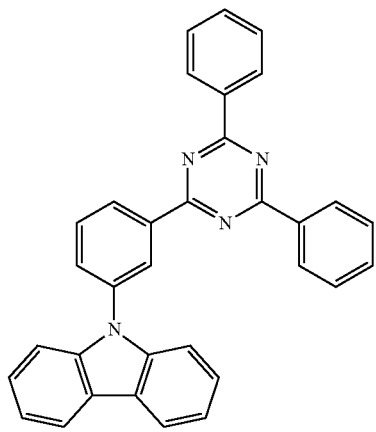
H37
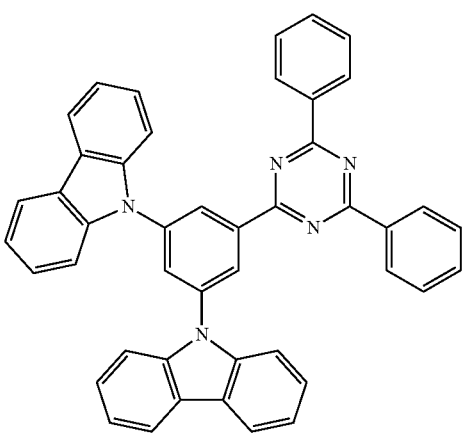

H38
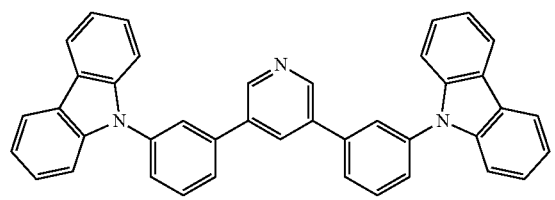
H41
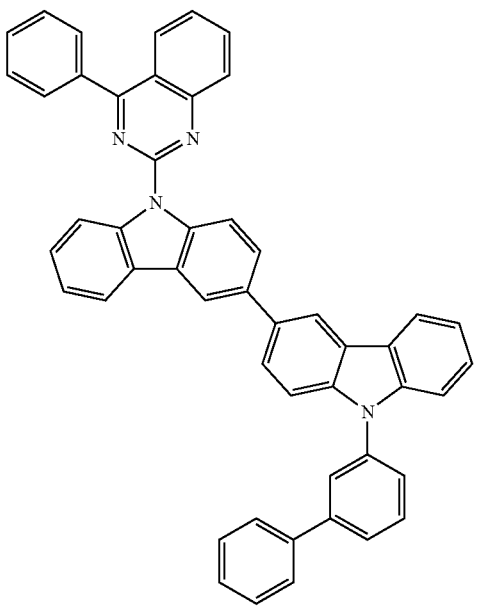
H39
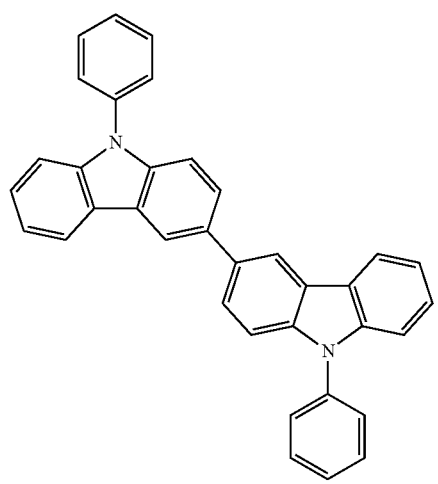
H42
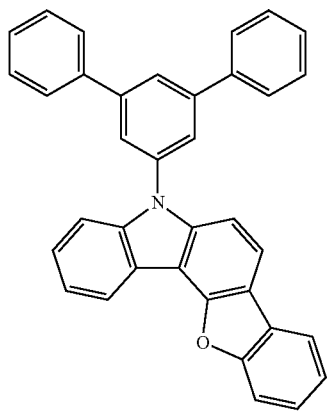
H40
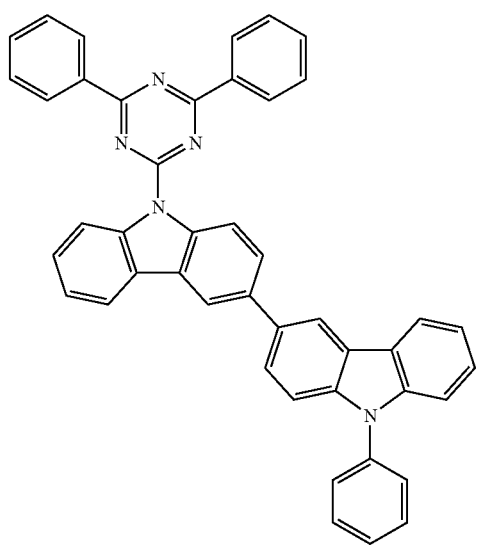
H43
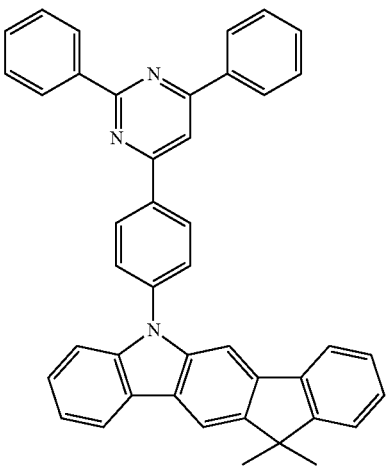

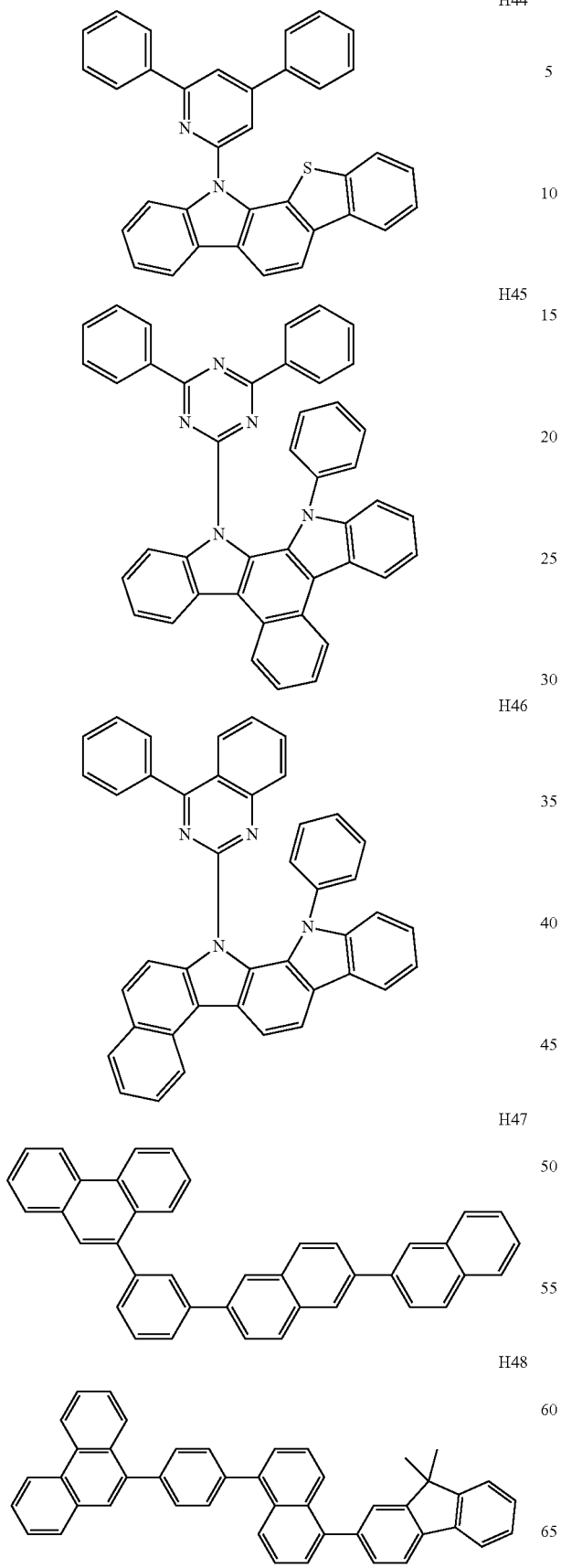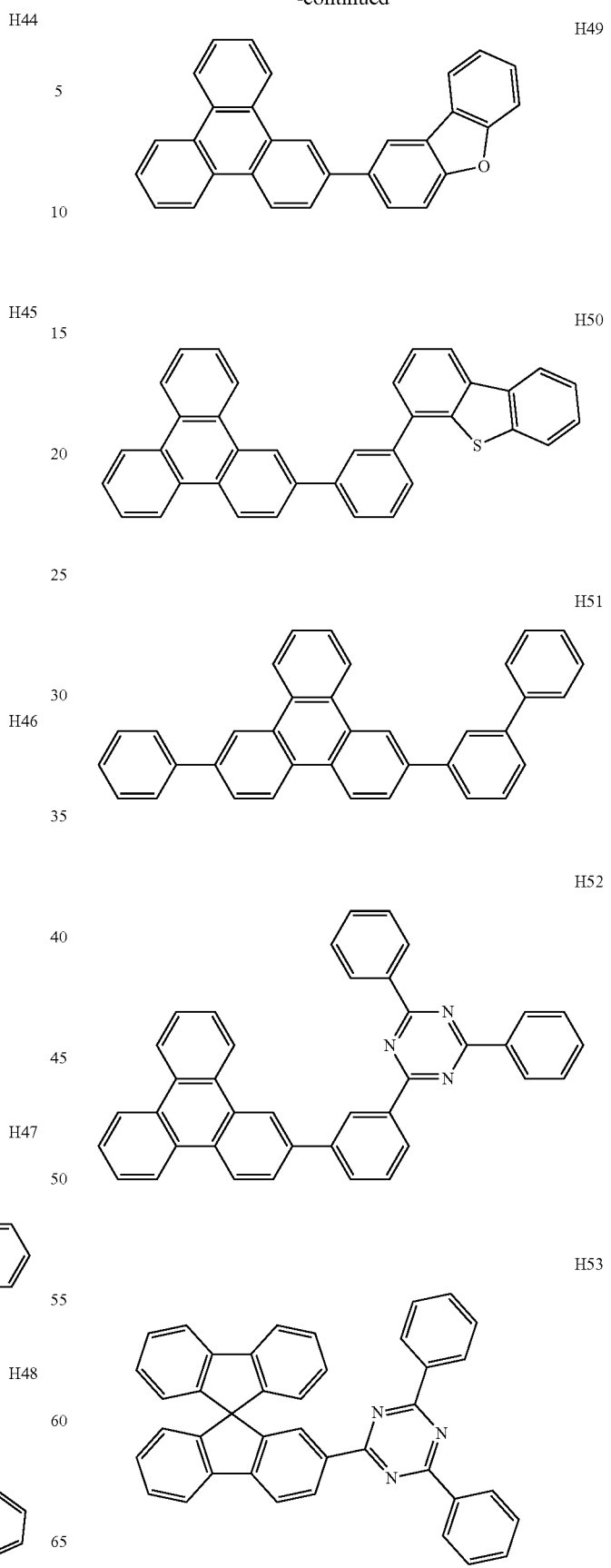

H54
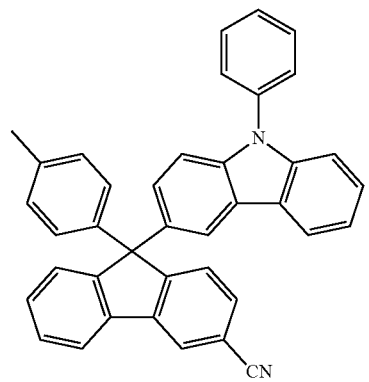
H55
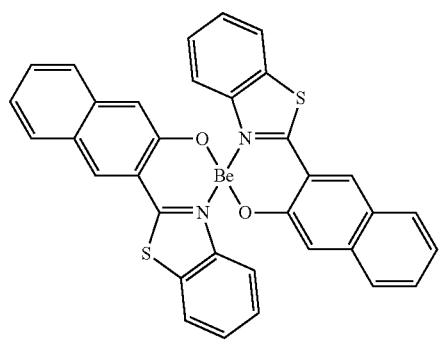
H56
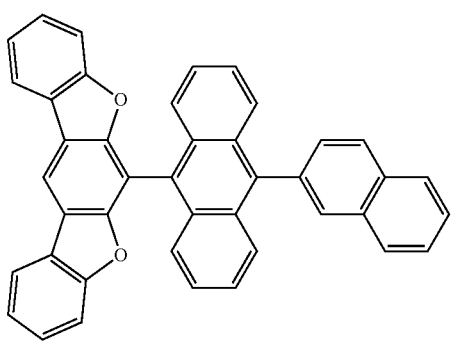
H57
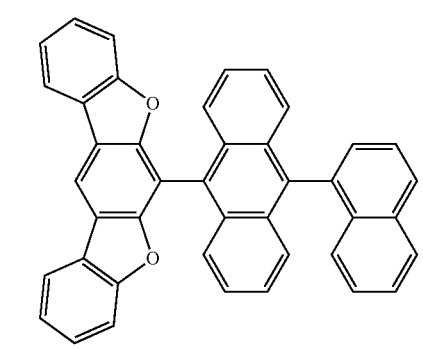
H58
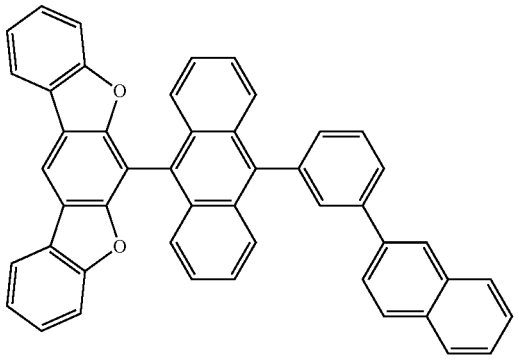
H59
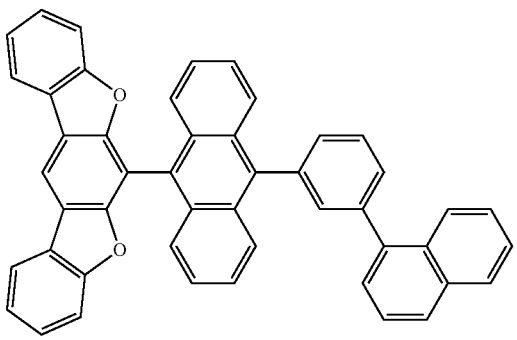
H60
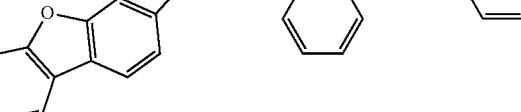
H61
H62
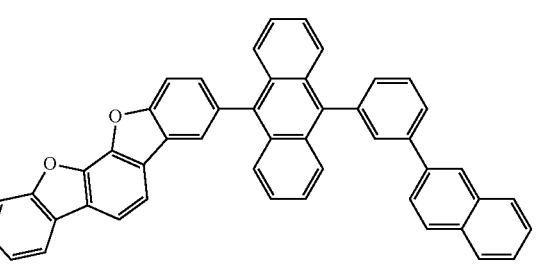

H63
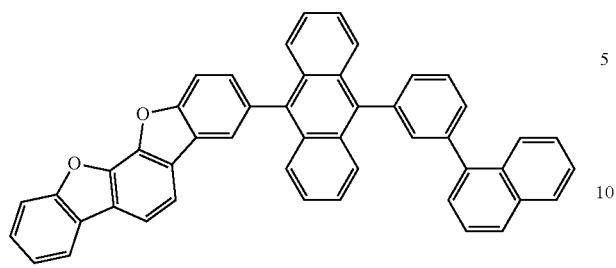
H64
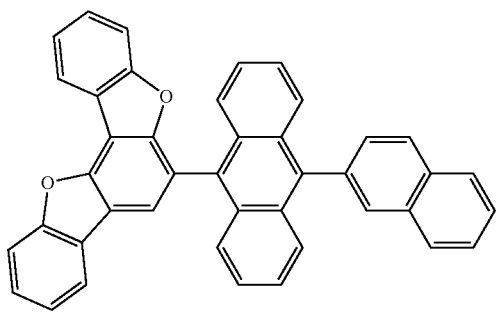
H65
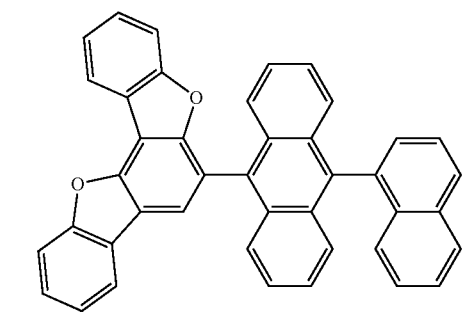
H66
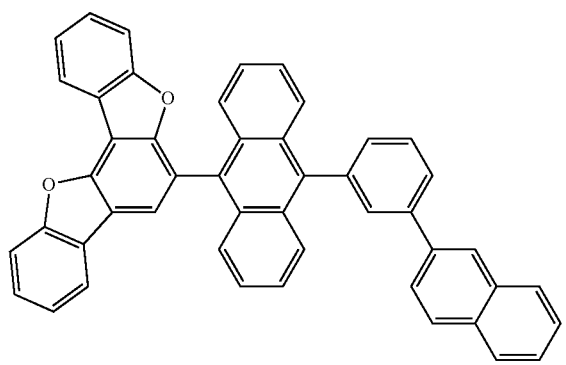
H67
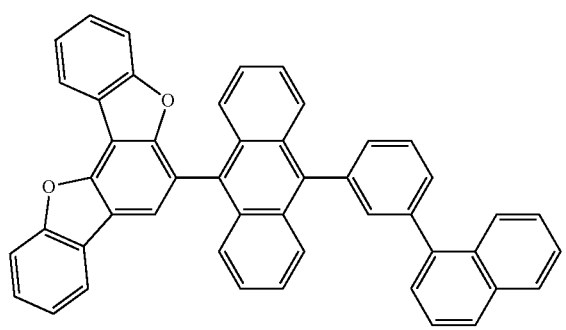
H68
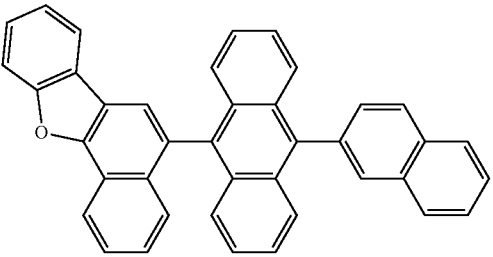
H69
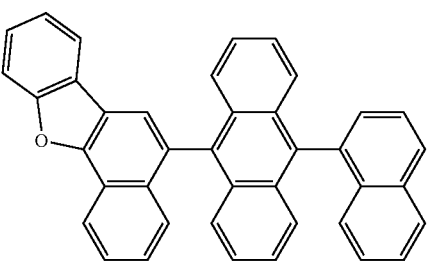
H70
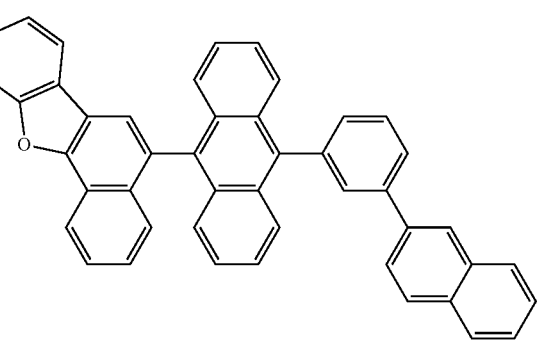
H71
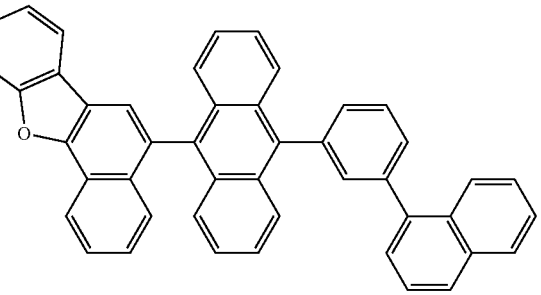
H72
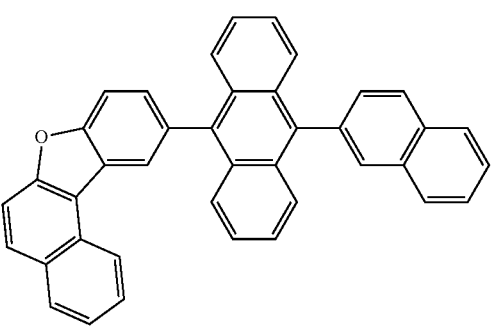

H73
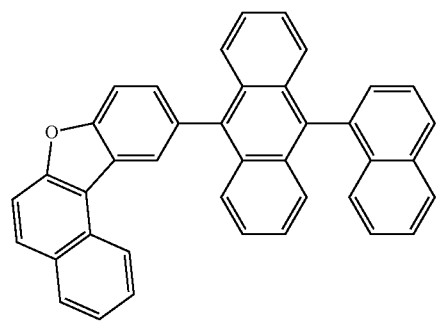
H74
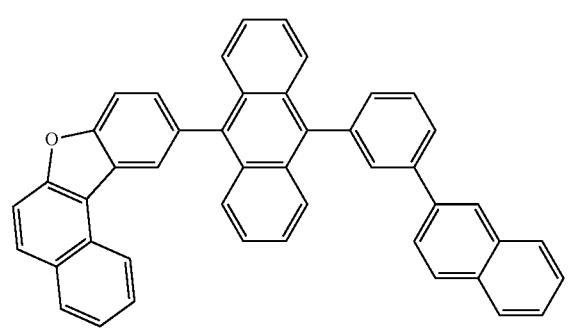
H75
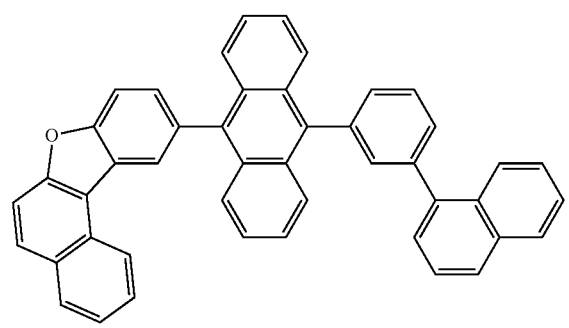
H76
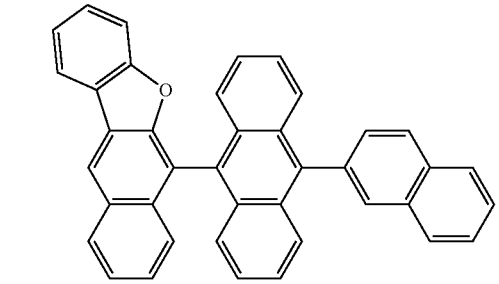
H77
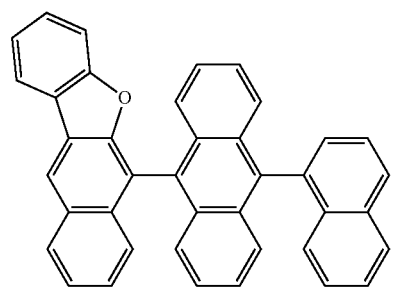
H78
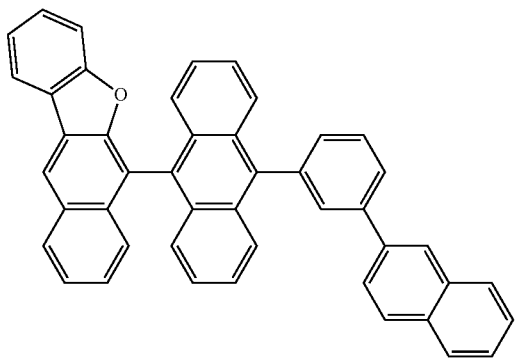
H79
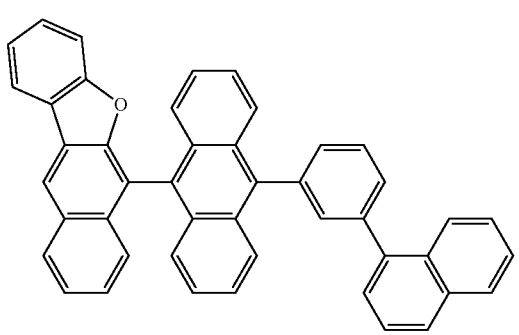
H80
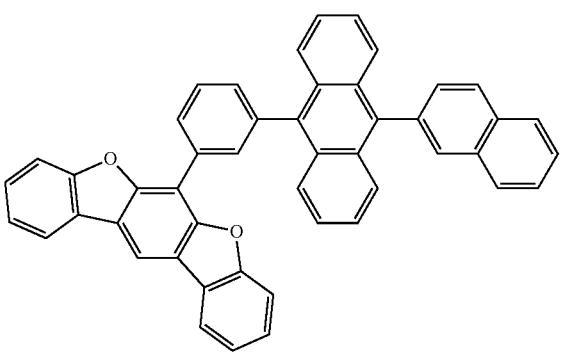
H81
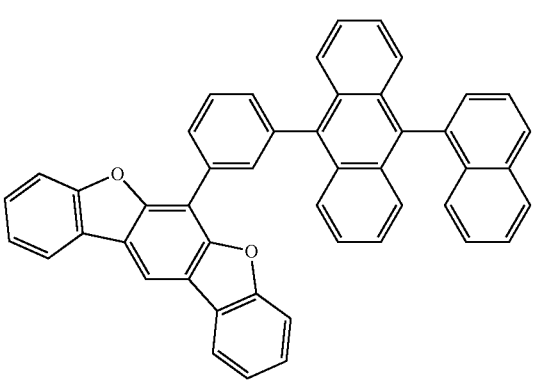

H82
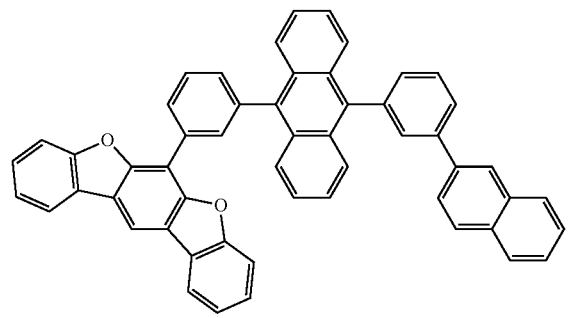
H83
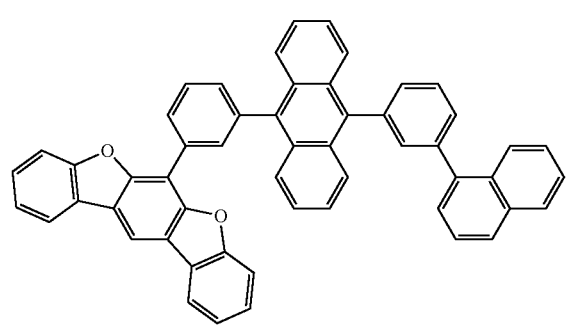
H84
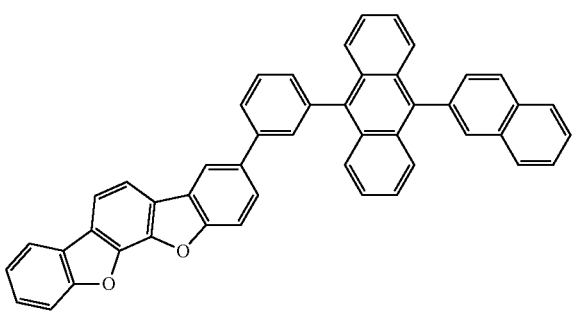
H85
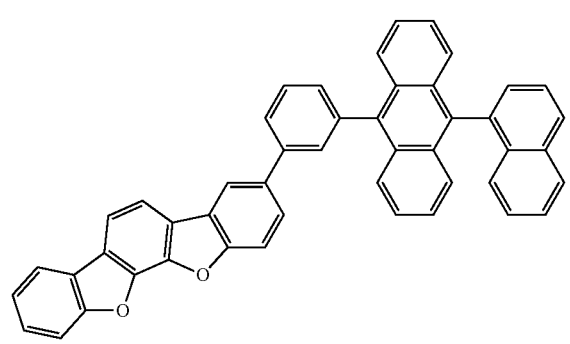
H86
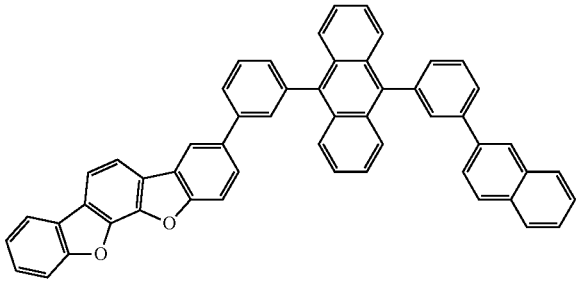
H87
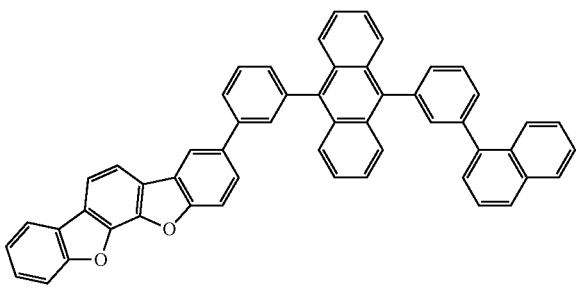
H88
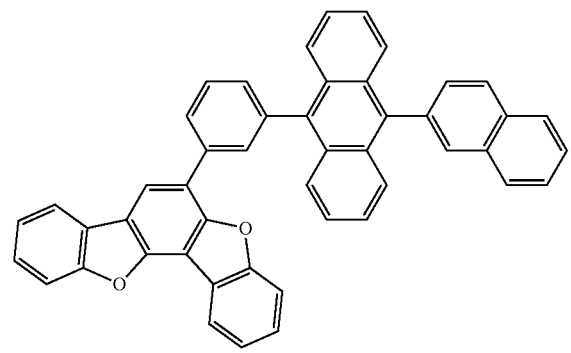
H89
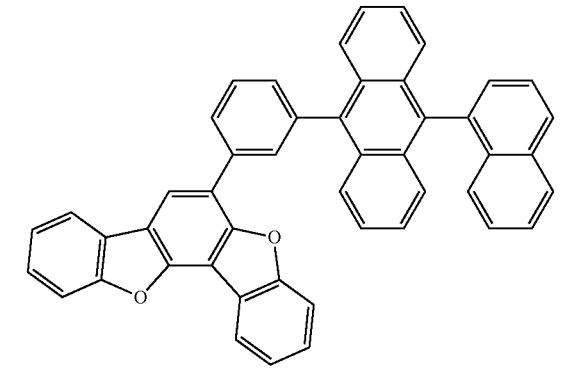

-continued
H90
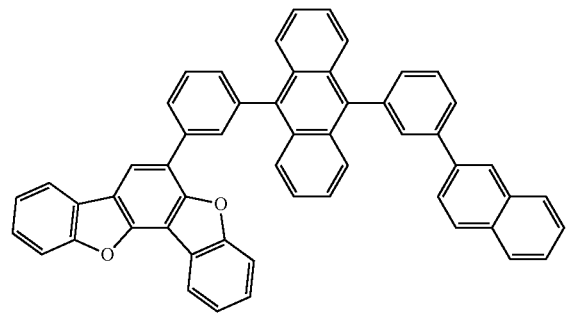
H91
H92
H93
-continued
H94
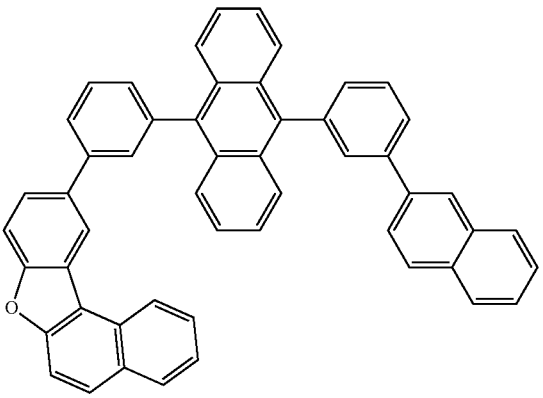
H95
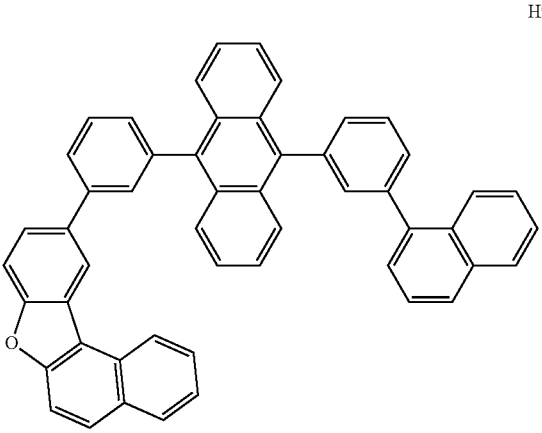
H96
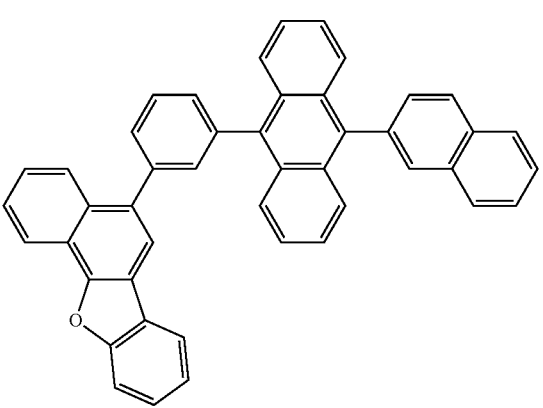
H97
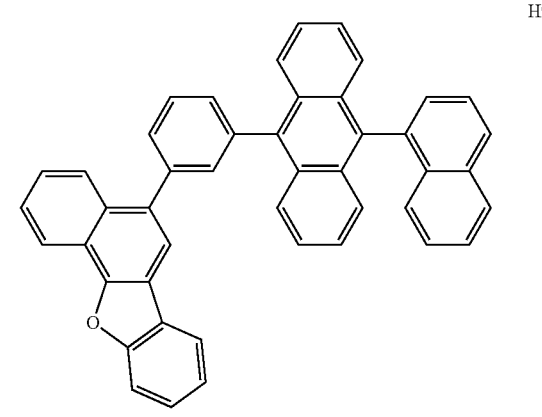

-continued
H98
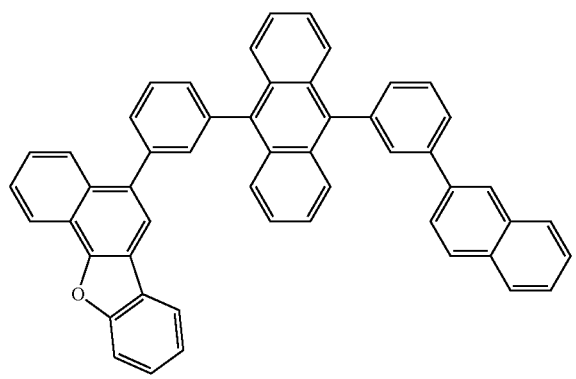
H99
H100
H101
-continued
H102
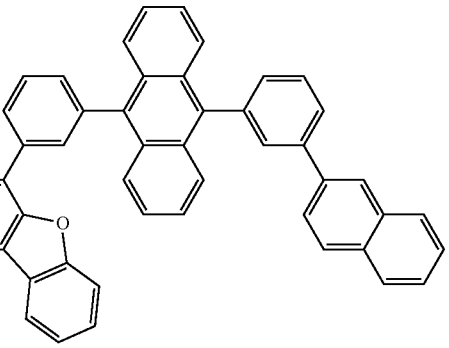
H103
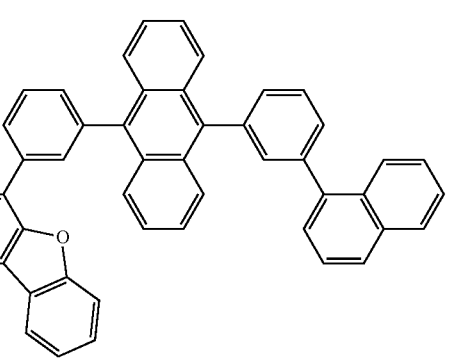
H104
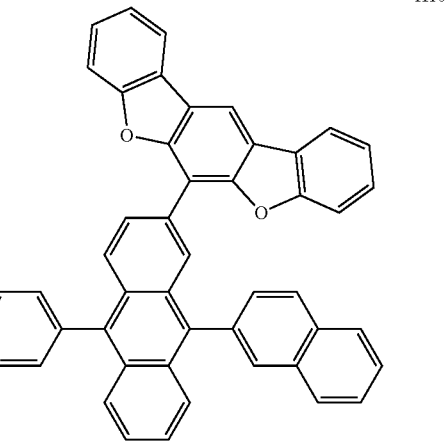
H105
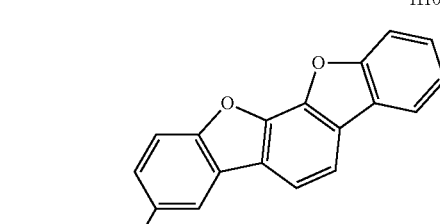
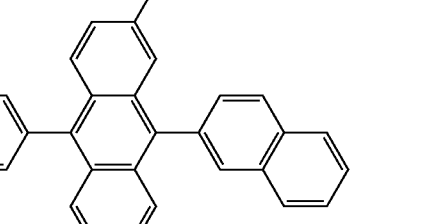

-continued
H106
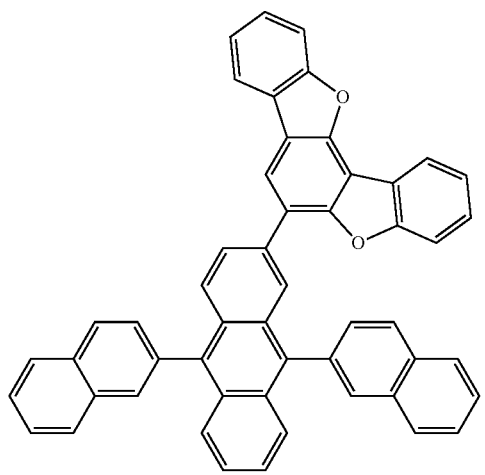
H107
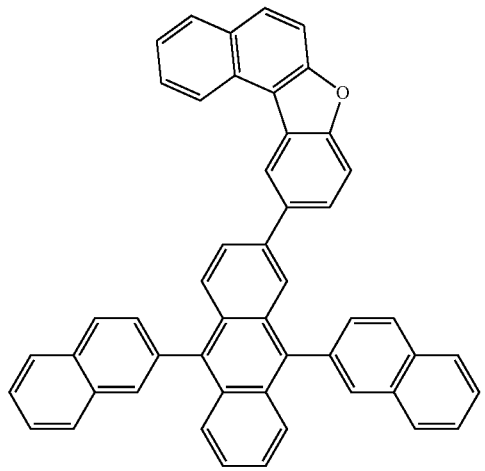
H-108
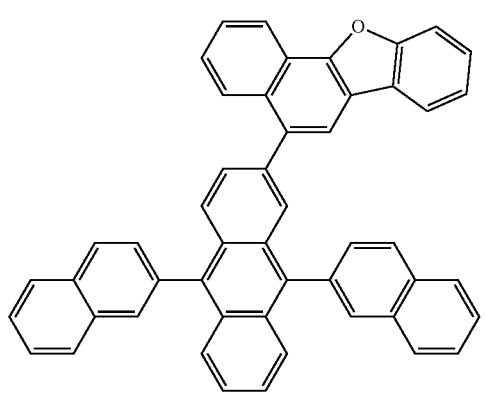
-continued
H109
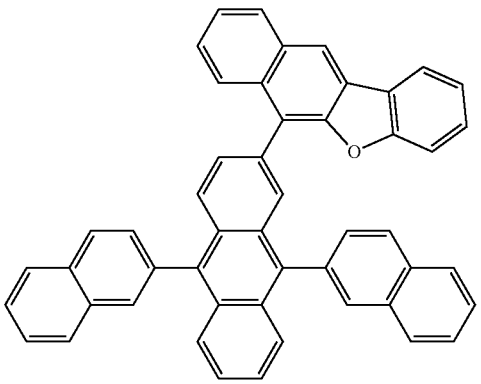
H110
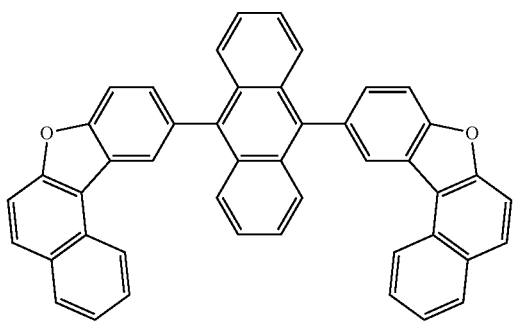
H111
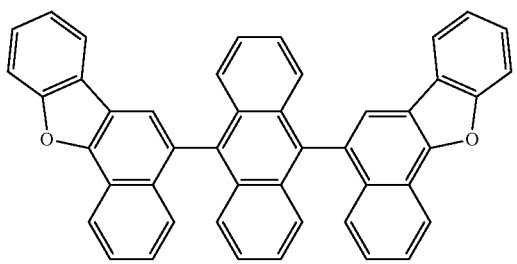
H112
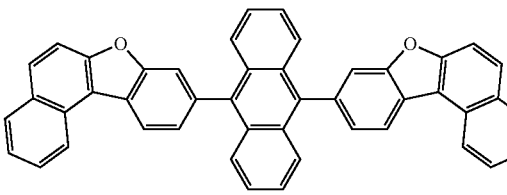
H113
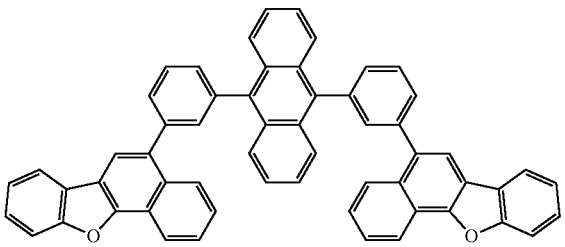

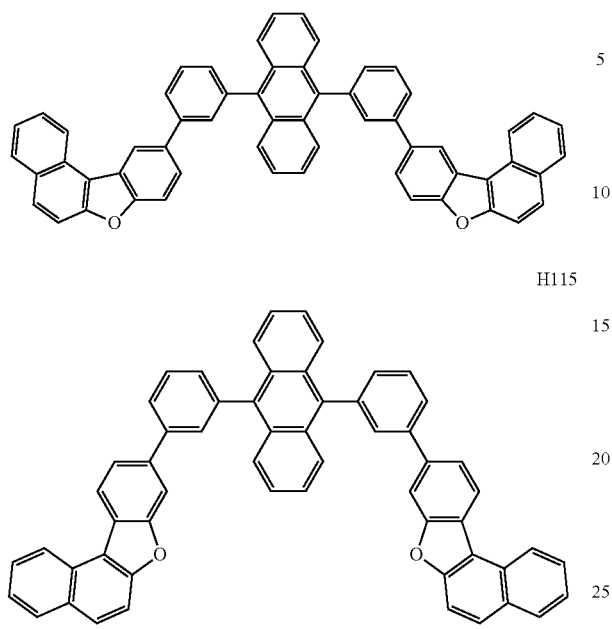
H114
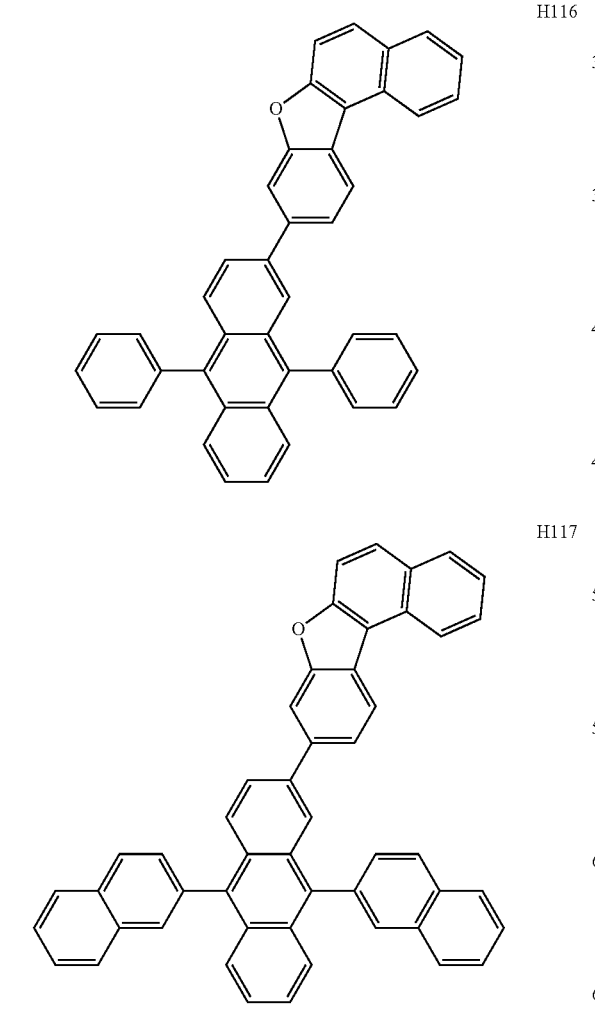
H115
H116
H117
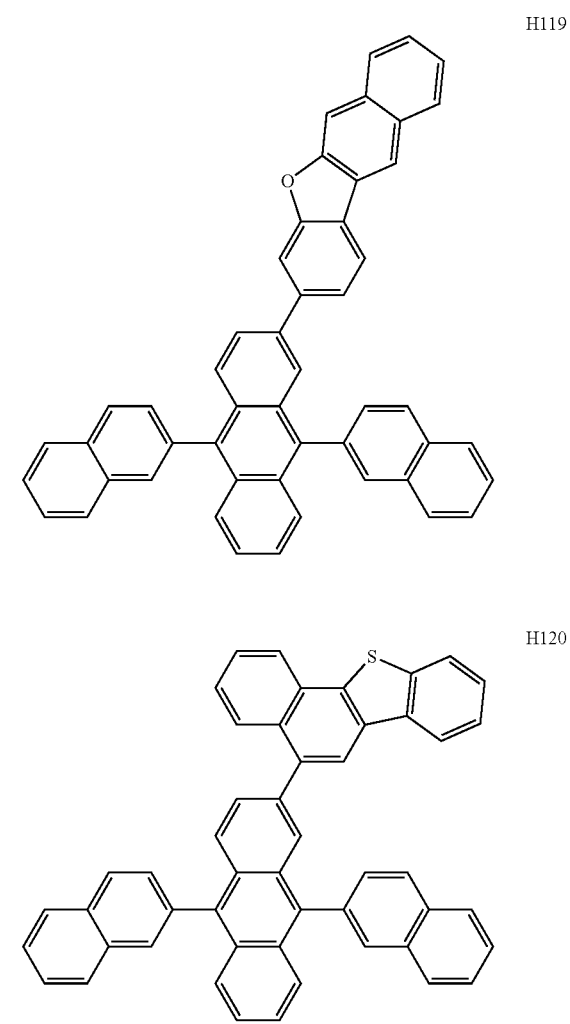
H118
H119
H120

-continued
H121
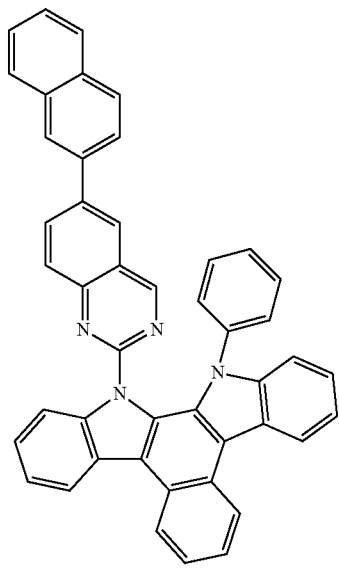
H122
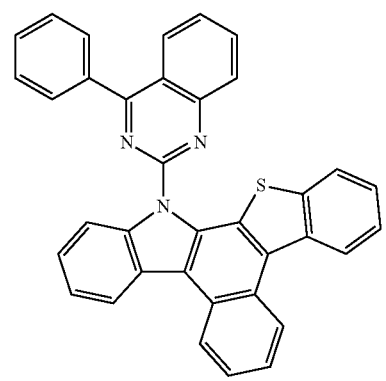
H123
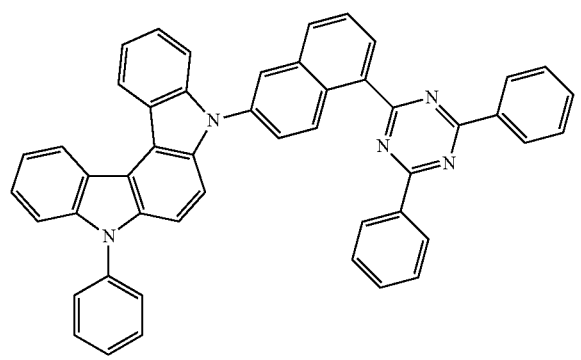
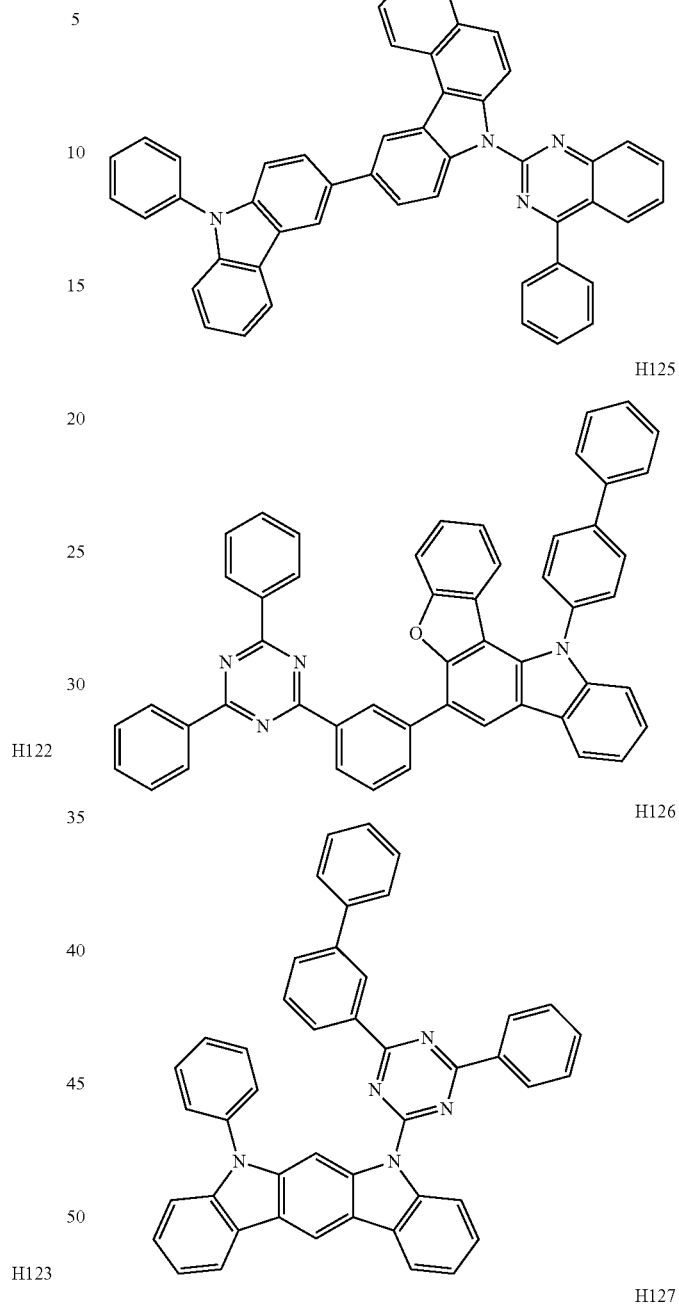
H127
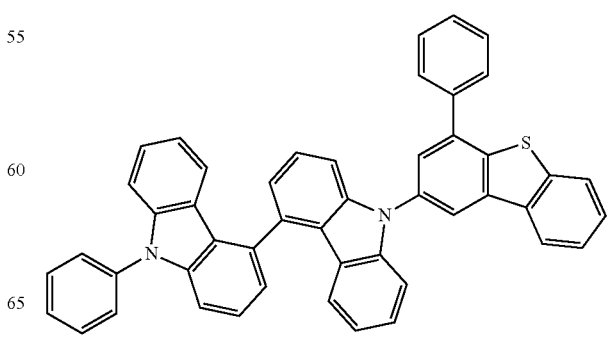

H128

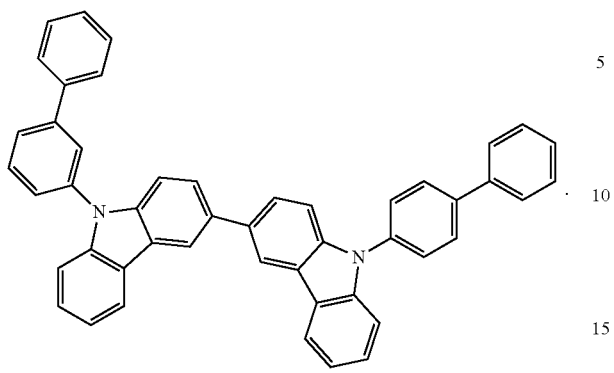

Phosphorescent Dopant

The phosphorescent dopant may include at least one transition metal as a central metal.

The phosphorescent dopant may include a monodentate ligand, a bidentate ligand, a tridentate ligand, a tetradentate ligand, a pentadentate ligand, a hexadentate ligand, and/or a (e.g., any suitable) combination thereof.

The phosphorescent dopant may be electrically neutral.

For example, the phosphorescent dopant may include an organometallic compound represented by Formula 401:

$$M(L_{401})_{xc1}(L_{402})_{xc2}$$ Formula 401

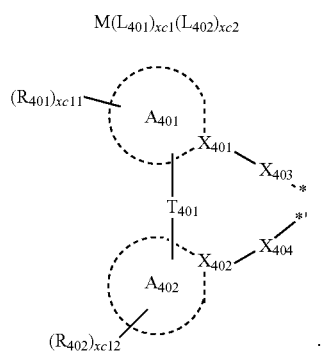

Formula 402

In Formulae 401 and 402,

M may be a transition metal (for example, iridium (Ir), platinum (Pt), palladium (Pd), osmium (Os), titanium (Ti), gold (Au), hafnium (Hf), europium (Eu), terbium (Tb), rhodium (Rh), rhenium (Re), or thulium (Tm)), $L_{401}$ may be a ligand represented by Formula 402, and xc1 may be 1, 2, or 3, wherein, if (e.g., when) xc1 is 2 or more, two or more of $L_{401}$ may be substantially identical to or different from each other, $L_{402}$ may be an organic ligand, and xc2 may be 0, 1, 2, 3, or 4, and if (e.g., when) xc2 is 2 or more, two or more of $L_{402}$ may be substantially identical to or different from each other, $X_{401}$ and $X_{402}$ may each independently be N or C, ring $A_{401}$ and ring $A_{402}$ may each independently be a $C_3$-$C_{60}$ carbocyclic group or a $C_1$-$C_{60}$ heterocyclic group, $T_{401}$ may be a single bond, *—O—**, *—S—**, *—C(=O)—**, *—N($Q_{411}$)-**, *—C($Q_{411}$)($Q_{412}$)-**, *—C($Q_{411}$)=C($Q_{412}$)-**, *—C($Q_{411}$)=**, or *=C=**, $X_{403}$ and $X_{404}$ may each independently be a chemical bond (for example, a covalent bond or a coordination bond), O, S, N($Q_{413}$), B($Q_{413}$), P($Q_{413}$), C($Q_{413}$)($Q_{414}$), or Si($Q_{413}$)($Q_{414}$), $Q_{411}$ to $Q_{414}$ may each be the same as described in connection with $Q_1$, $R_{401}$ and $R_{402}$ may each independently be hydrogen, deuterium, —F, —Cl, —Br, —I, a hydroxyl group, a cyano group, a nitro group, a $C_1$-$C_{20}$ alkyl group unsubstituted or substituted with at least one $R_{10a}$, a $C_1$-$C_{20}$ alkoxy group unsubstituted or substituted with at least one $R_{10a}$, a $C_3$-$C_{60}$ carbocyclic group unsubstituted or substituted with at least one $R_{10a}$, a $C_1$-$C_{60}$ heterocyclic group unsubstituted or substituted with at least one $R_{10a}$, —Si($Q_{401}$)($Q_{402}$)($Q_{403}$), —N($Q_{401}$)($Q_{402}$), —B($Q_{401}$)($Q_{402}$), —C(=O)($Q_{401}$), —S(=O)$_2$($Q_{401}$), or —P(=O)($Q_{401}$)($Q_{402}$), $Q_{401}$ to $Q_{403}$ may each be the same as described in connection with $Q_1$, xc11 and xc12 may each independently be an integer from 0 to 10, and

* and *' in Formula 402 each indicate a binding site to M in Formula 401.

For example, in Formula 402, i) $X_{401}$ may be nitrogen and $X_{402}$ may be carbon, or ii) each of $X_{401}$ and $X_{402}$ may be nitrogen.

In one or more embodiments, if (e.g., when) xc1 in Formula 401 is 2 or more, two ring $A_{401}$(s) among two or more of $L_{401}$ may be optionally linked to each other via $T_{402}$, which is a linking group, and two ring $A_{402}$(s) among two or more of $L_{401}$ may be optionally linked to each other via $T_{403}$, which is a linking group (see Compounds PD1 to PD4 and PD7). $T_{402}$ and $T_{403}$ may each be the same as described in connection with $T_{401}$.

In Formula 401, $L_{402}$ may be an organic ligand. For example, $L_{402}$ may include a halogen group, a diketone group (for example, an acetylacetonate group), a carboxylic acid group (for example, a picolinate group), —C(=O), an isonitrile group, a —CN group, a phosphorus group (for example, a phosphine group, a phosphite group, and/or the like), and/or a (e.g., any suitable) combination thereof.

The phosphorescent dopant may include, for example, at least one of (e.g., selected from among among) Compounds PD1 to PD39, and/or a (e.g., any suitable) combination thereof.

PD1

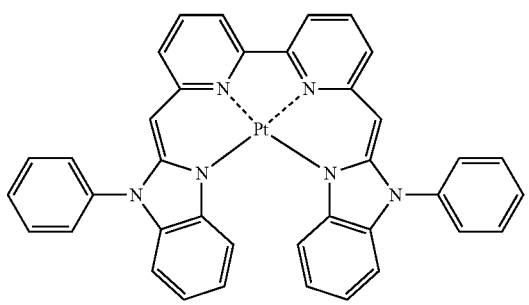

-continued
PD2
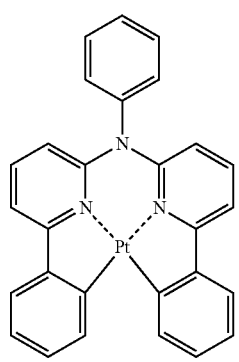
PD3
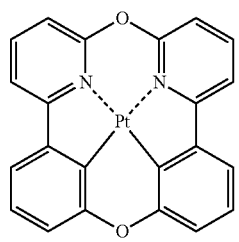
PD4
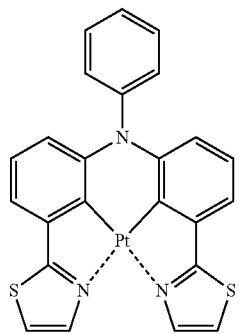
PD5
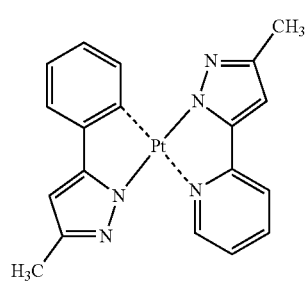
PD6
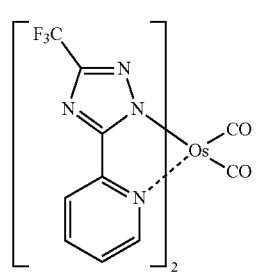
-continued
PD7
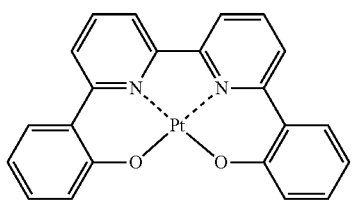
PD8
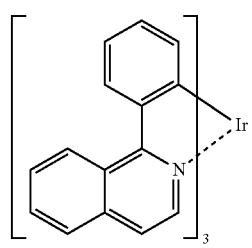
PD9
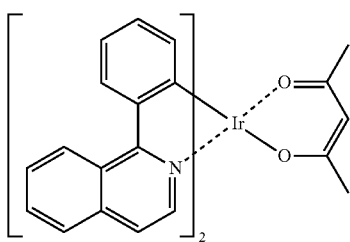
PD10
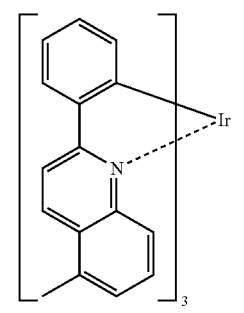
PD11
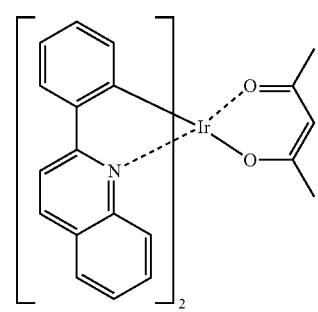

-continued
PD12
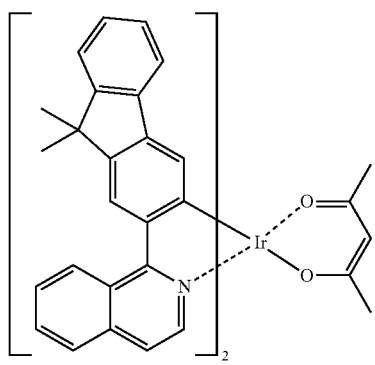
PD13
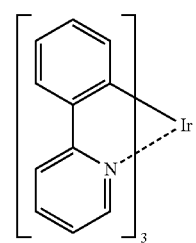
PD14
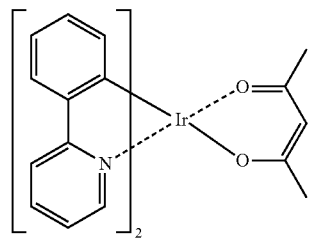
PD15
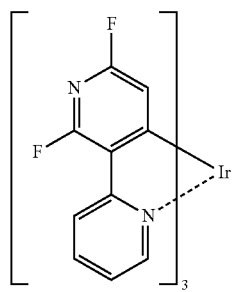
PD16
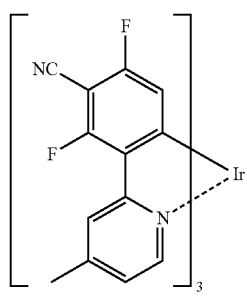
PD17
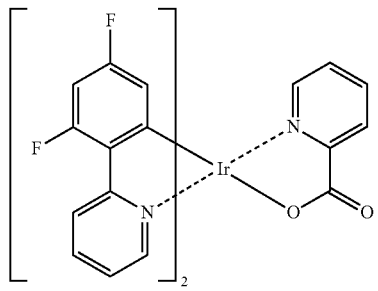
PD18
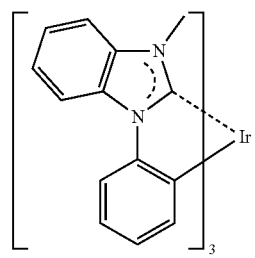
PD19
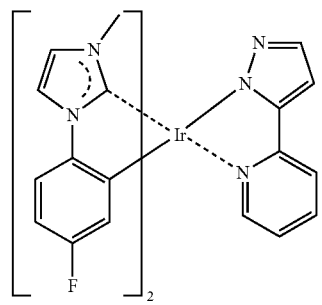
PD20
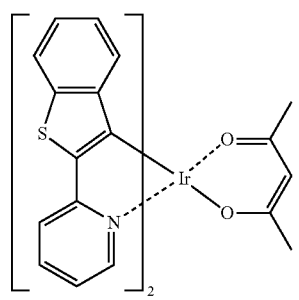
PD21
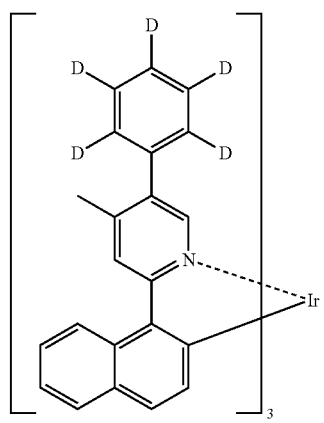

PD22 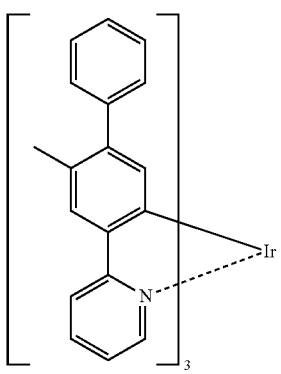
PD23 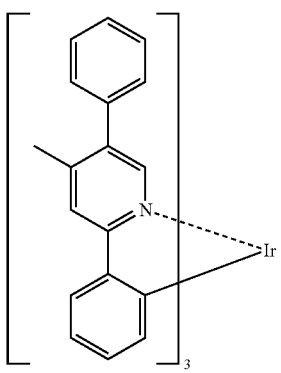
PD24 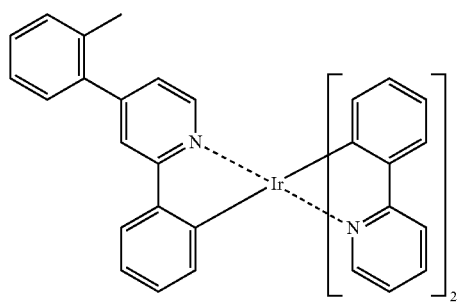
PD25 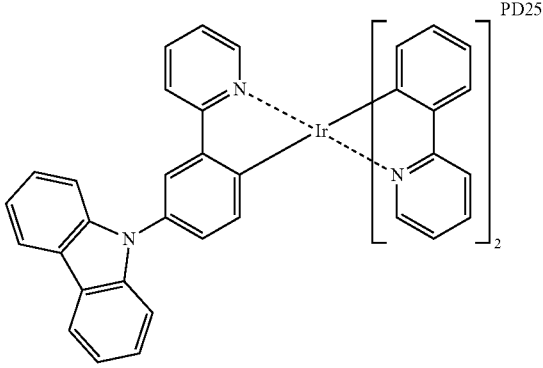
PD26 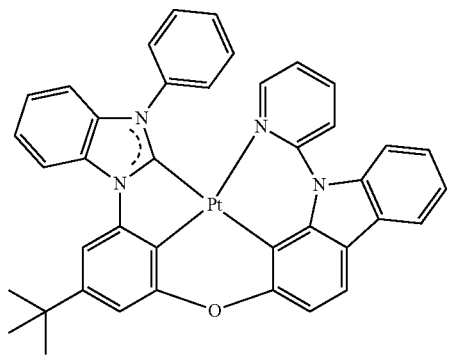
PD27' 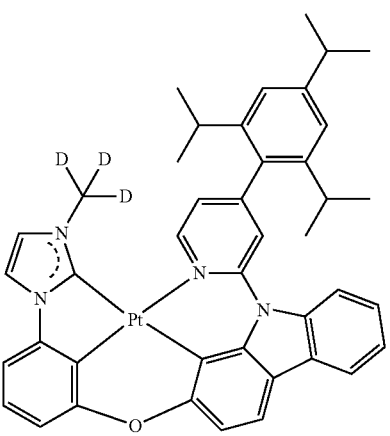
PD28 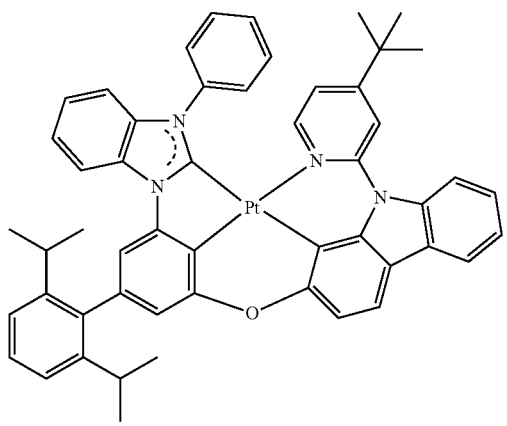
PD29 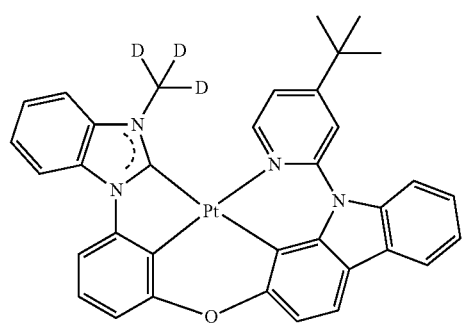

PD30
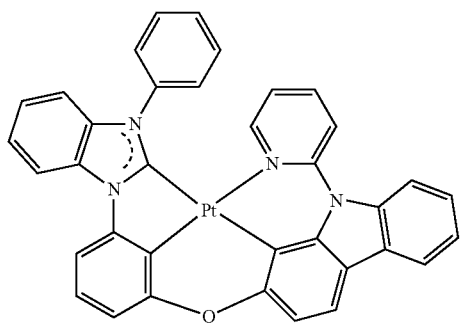
PD31
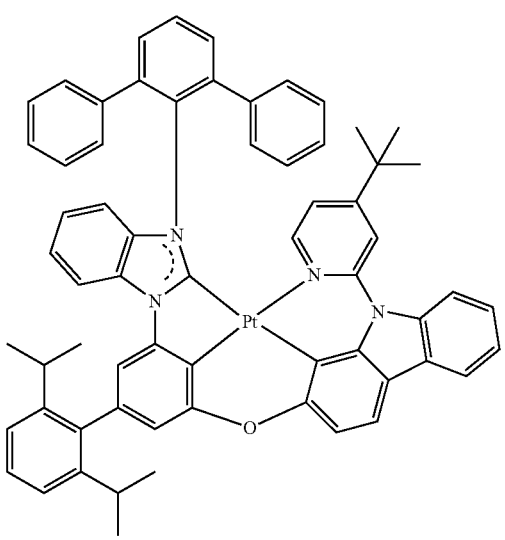
PD32
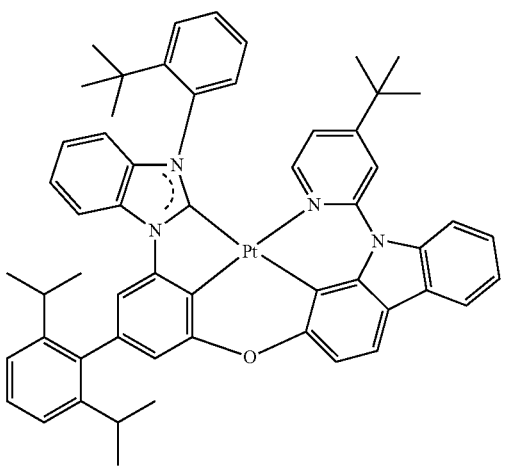
PD33
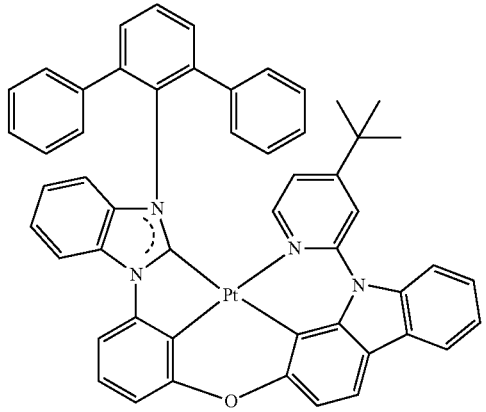
PD34
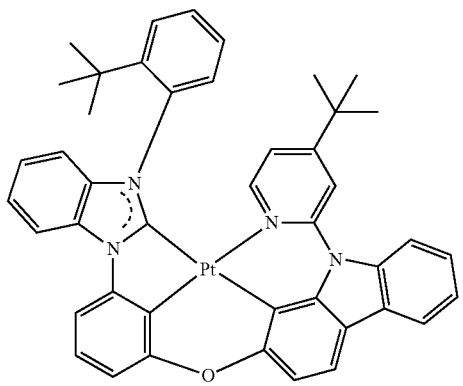
PD35
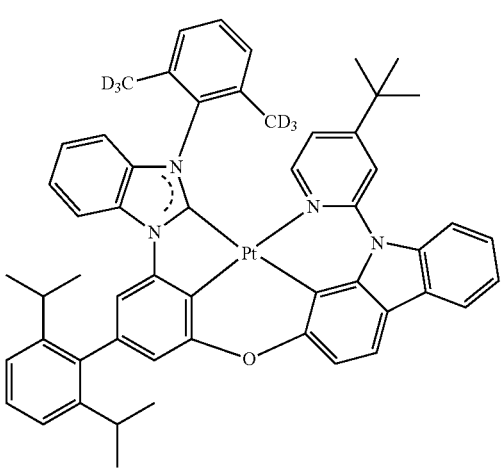

PD36

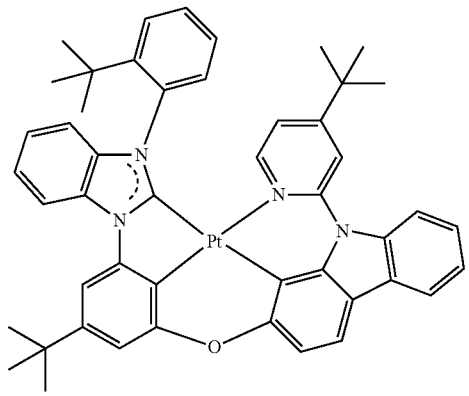

PD37

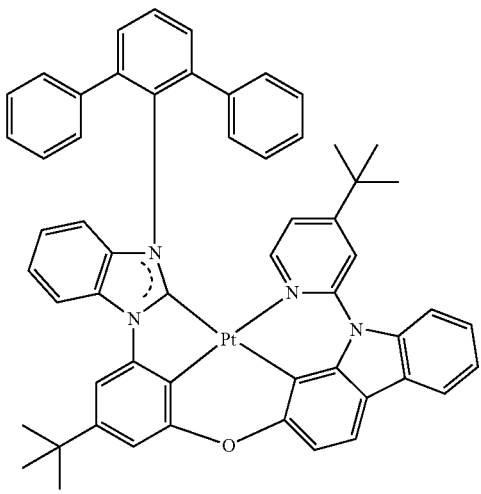

PD38

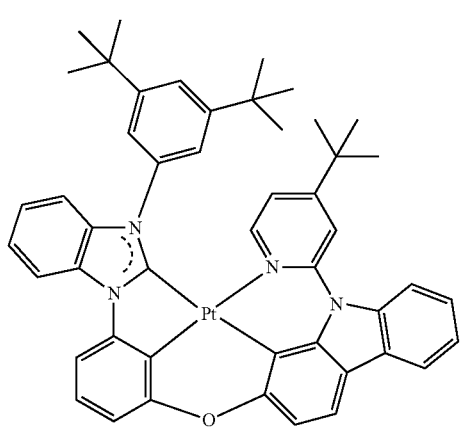

PD39

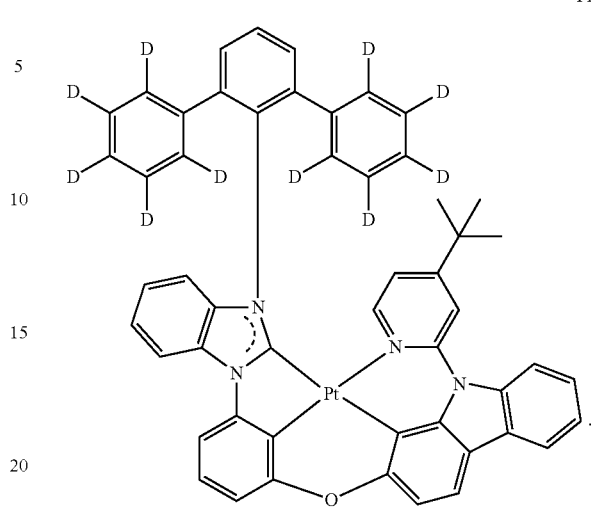

Fluorescent Dopant

The fluorescent dopant may include an amine group-containing compound, a styryl group-containing compound, and/or a (e.g., any suitable) combination thereof.

For example, the fluorescent dopant may include a compound represented by Formula 501:

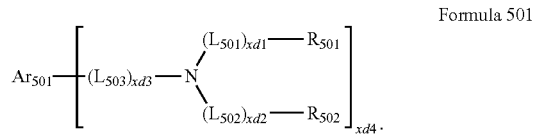

Formula 501

In Formula 501, $Ar_{501}$, $L_{501}$ to $L_{503}$, $R_{501}$, and $R_{502}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$, xd1 to xd3 may each independently be 0, 1, 2, or 3, and xd4 may be 1, 2, 3, 4, 5, or 6.

In one or more embodiments, $Ar_{501}$ in Formula 501 may be a condensed cyclic group (for example, an anthracene group, a chrysene group, a pyrene group, and/or the like.) in which three or more monocyclic groups are condensed together.

In one or more embodiments, xd4 in Formula 501 may be 2.

In one or more embodiments, the fluorescent dopant may include: at least one of (e.g., selected from among among) Compounds FD1 to FD37; DPVBi; DPAVBi; and/or a (e.g., any suitable) combination thereof:

FD1
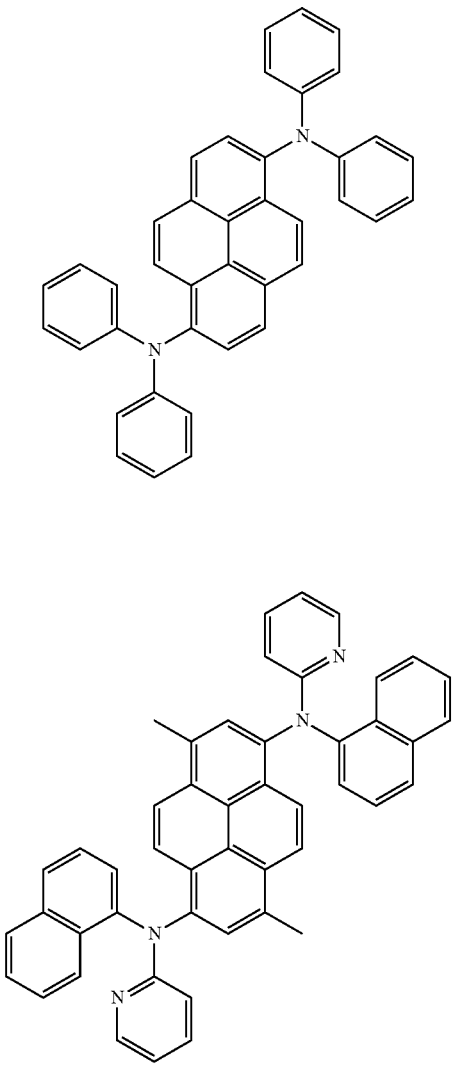
FD2
FD3
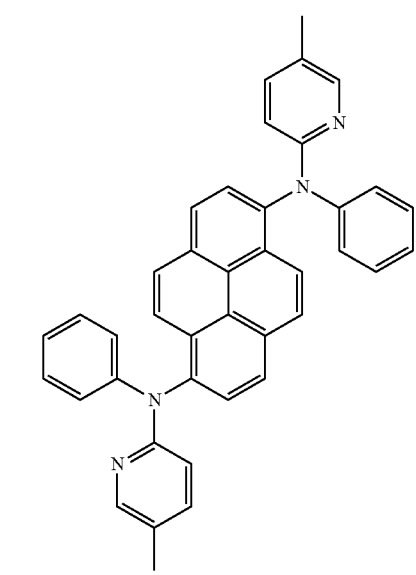
-continued
FD4
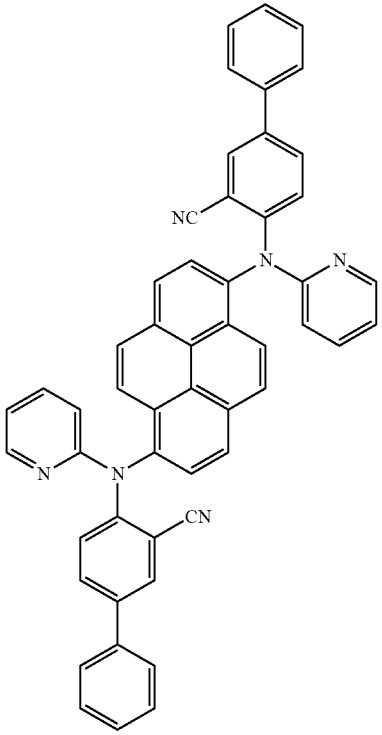
FD5
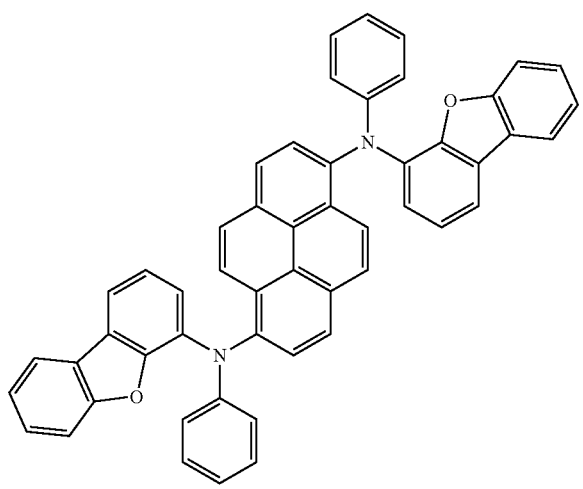

-continued
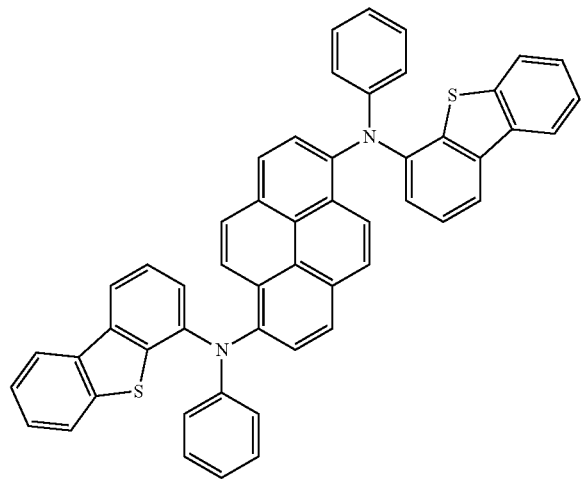
FD6
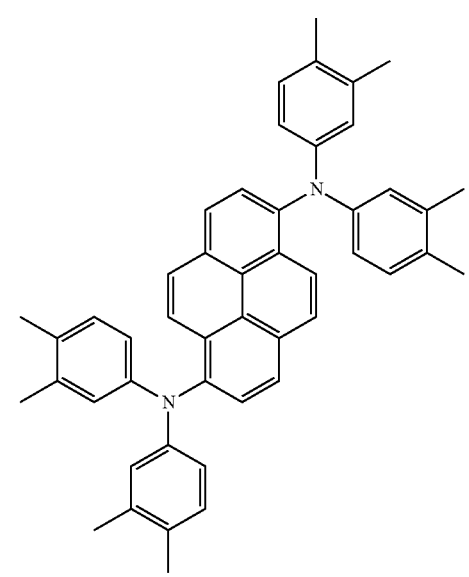
FD7
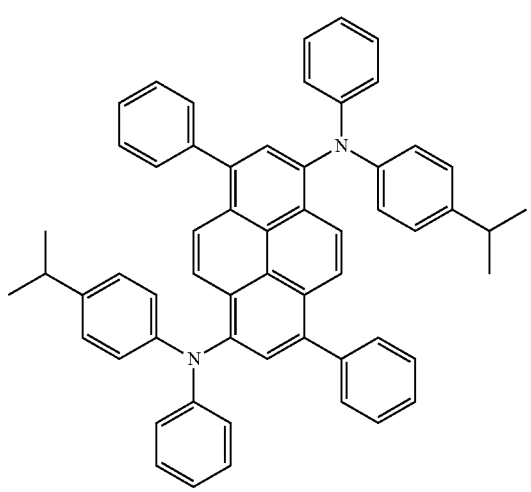
FD8
-continued
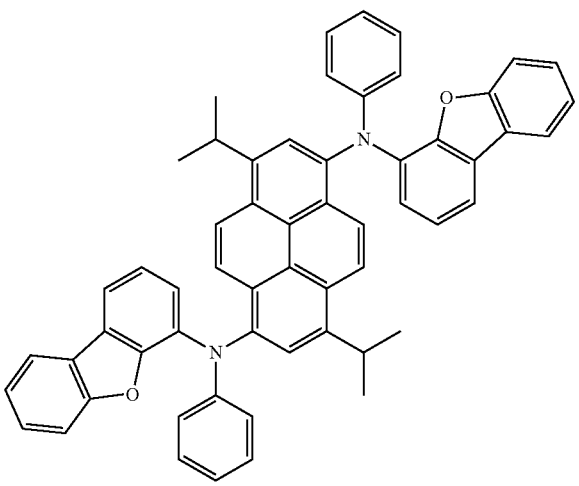
FD9
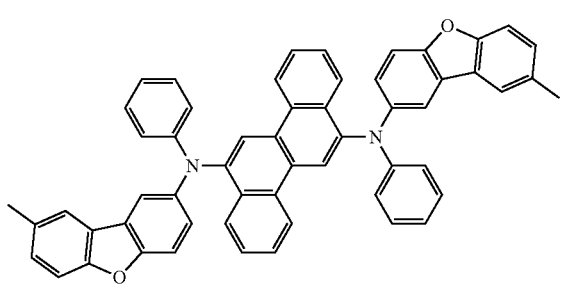
FD10
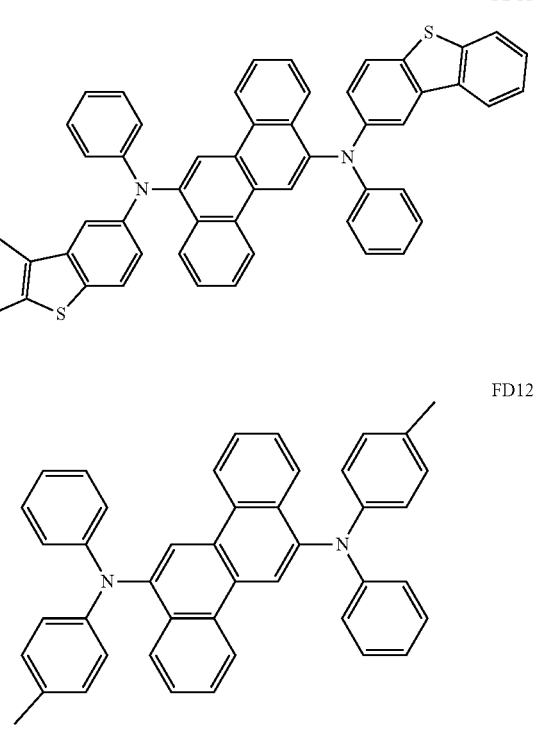
FD11
FD12

FD13
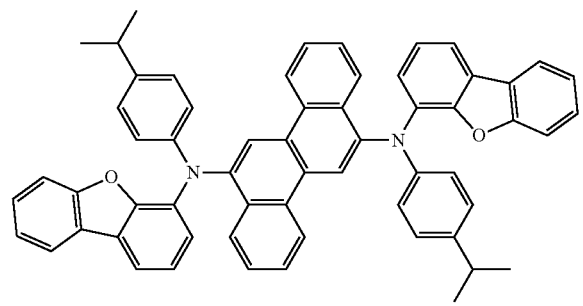
FD14
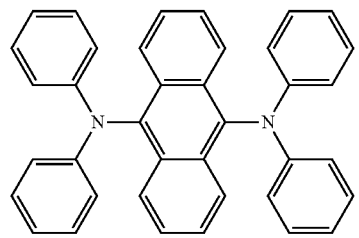
FD15
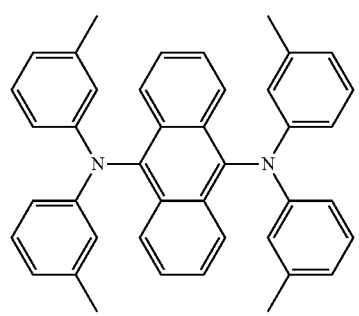
FD16
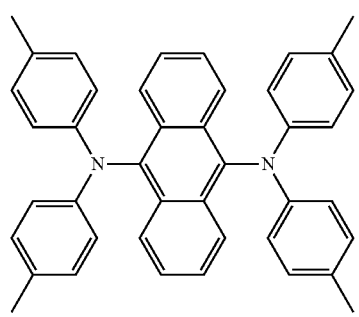
FD17
FD18
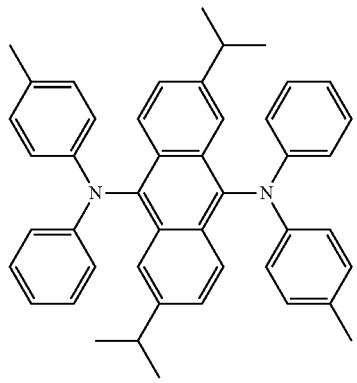
FD19
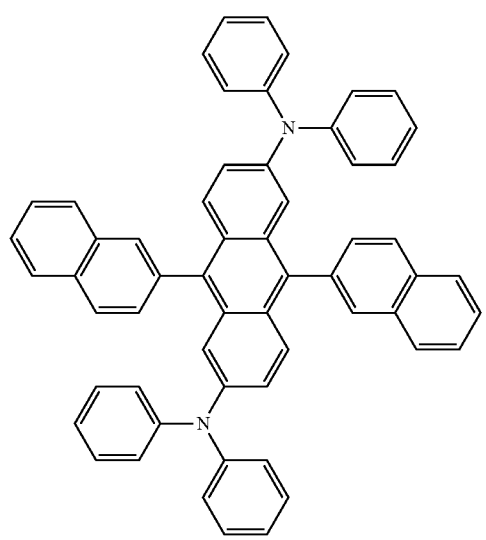
FD20
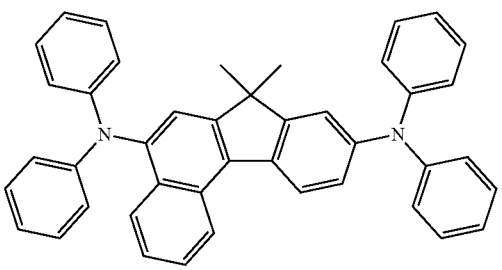
FD21
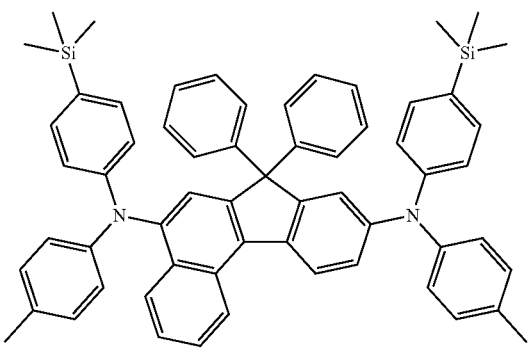

FD22
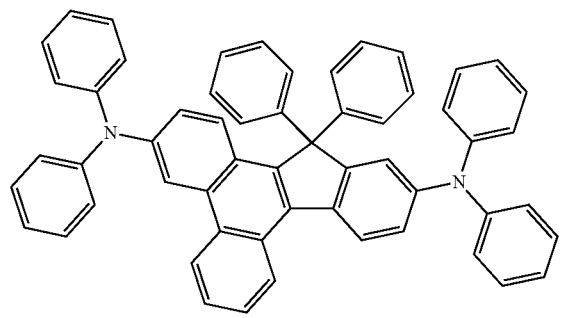
FD26
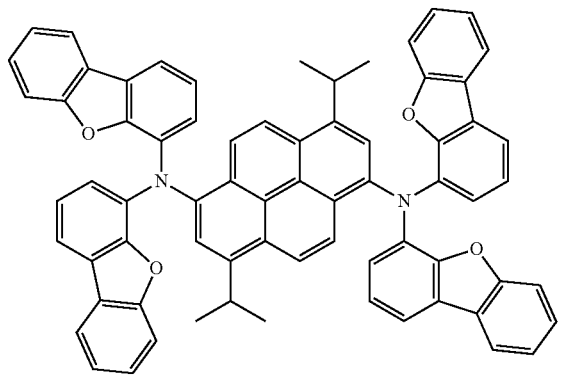
FD23
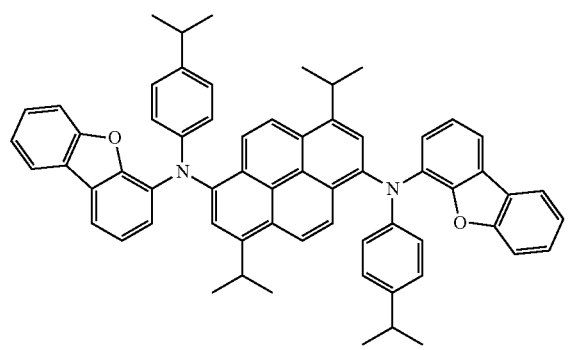
FD27
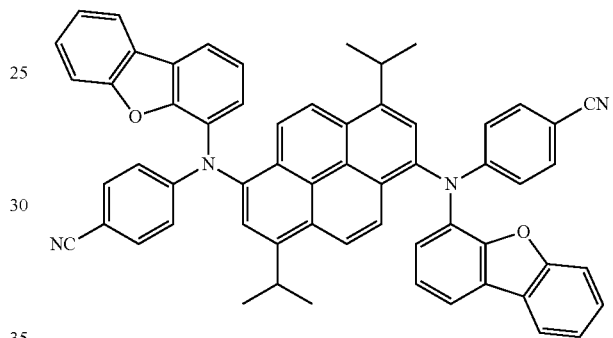
FD24
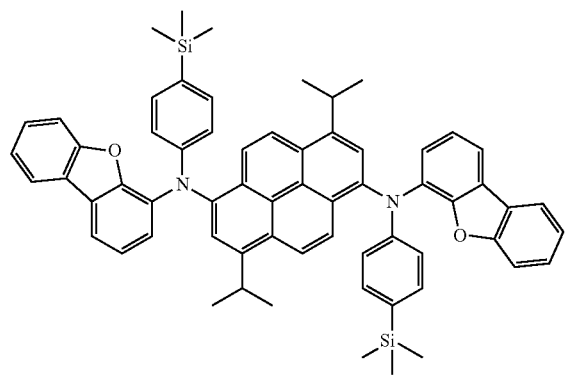
FD28
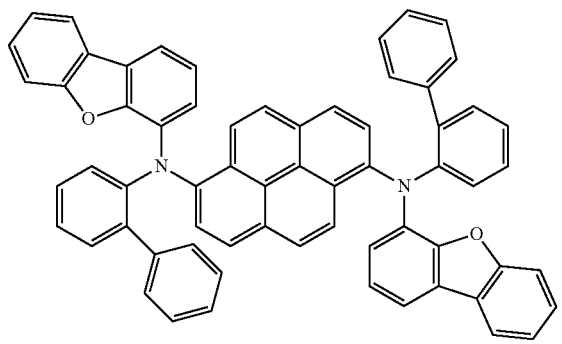
FD25
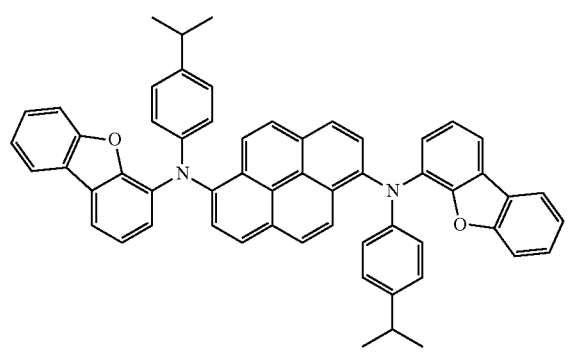
FD29
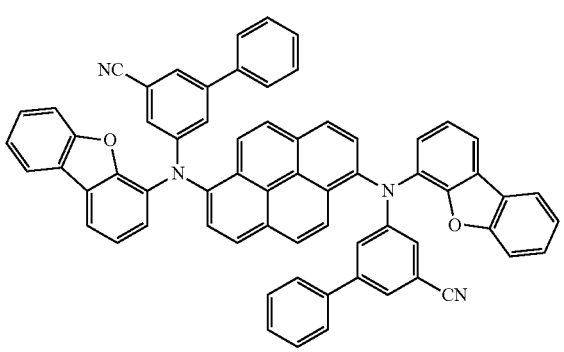

FD30
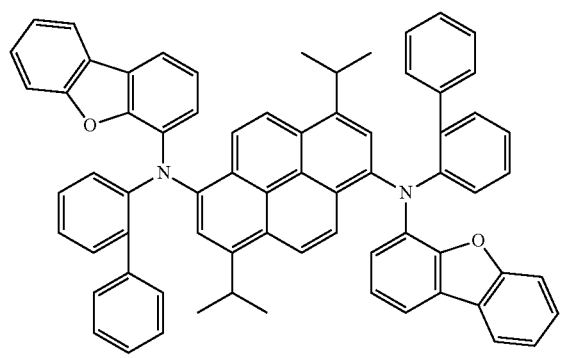
FD34
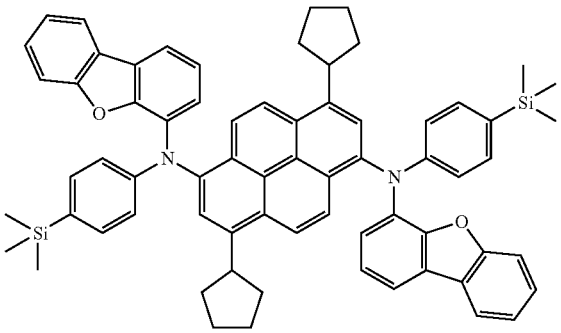
FD31
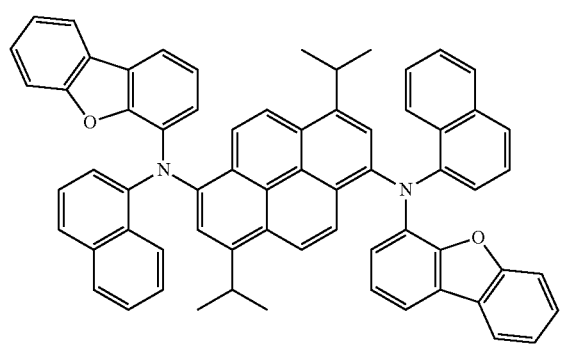
FD35
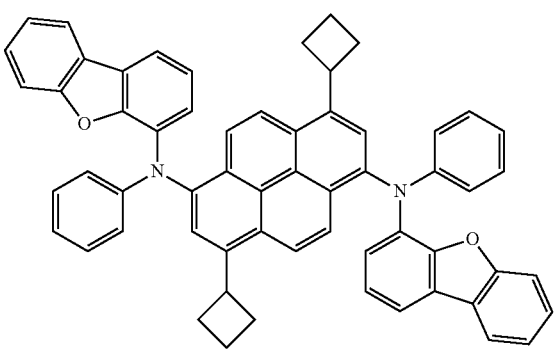
FD32
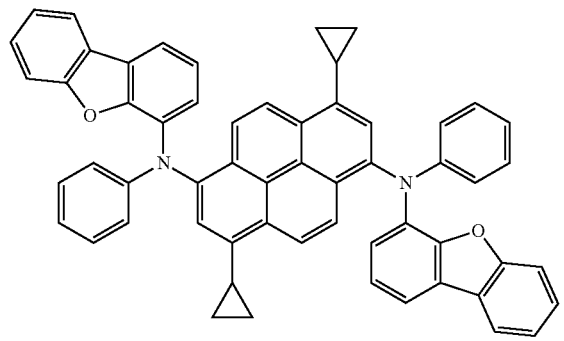
FD36
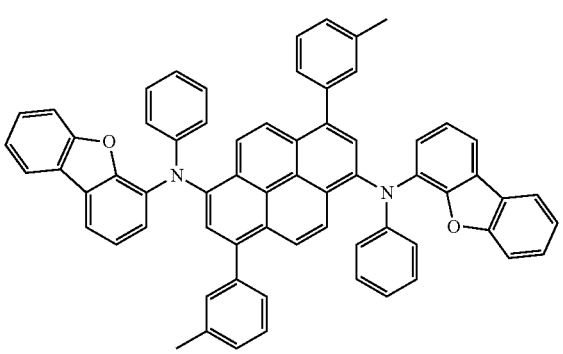
FD33
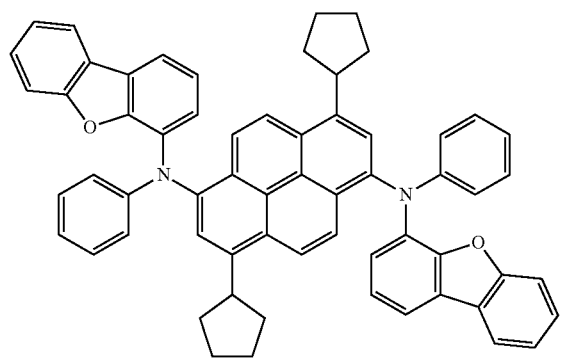
FD37
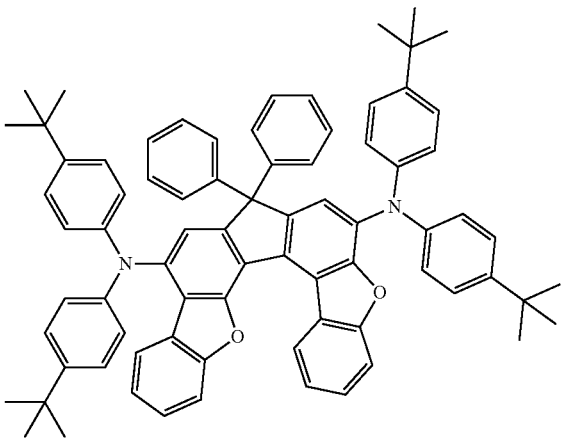

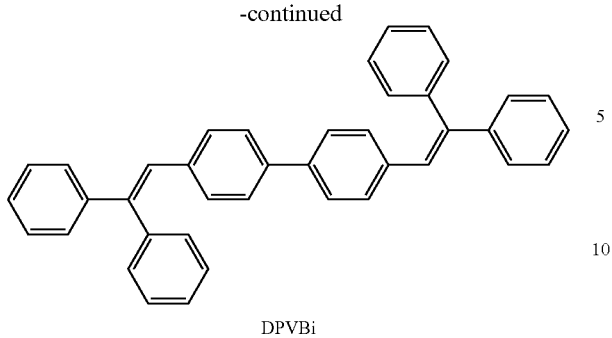

DPVBi

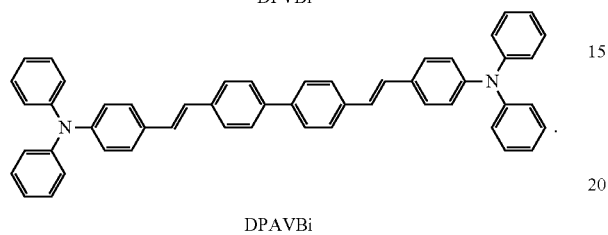

DPAVBi

Delayed Fluorescence Material

The emission layer may include a delayed fluorescence material.

In the specification, the delayed fluorescence material may be selected from among compounds capable of emitting delayed fluorescence based on a delayed fluorescence emission mechanism.

The delayed fluorescence material included in the emission layer may act as a host or a dopant depending on the type or kind of other materials included in the emission layer.

In one or more embodiments, a difference between a triplet energy level (eV) of the delayed fluorescence material and the singlet energy level (eV) of the delayed fluorescence material may be greater than or equal to 0 eV and less than or equal to 0.5 eV. When the difference between the triplet energy level (eV) of the delayed fluorescence material and the singlet energy level (eV) of the delayed fluorescence material satisfies the above-described range, up-conversion from the triplet state to the singlet state of the delayed fluorescence materials may effectively occur, and thus, the light-emitting device 10 may have improved luminescence efficiency.

For example, the delayed fluorescence material may include: i) a material including at least one electron donor (for example, a π electron-rich $C_3$-$C_{60}$ cyclic group and/or the like, such as a carbazole group) and at least one electron acceptor (for example, a sulfoxide group, a cyano group, a π electron-deficient nitrogen-containing $C_1$-$C_{60}$ cyclic group, and/or the like), ii) a material including a $C_8$-$C_{60}$ polycyclic group in which two or more cyclic groups condensed to each other while sharing boron (B), and/or the like.

Examples of the delayed fluorescence material may include at least one of (e.g., selected from among) Compounds DF1 to DF14:

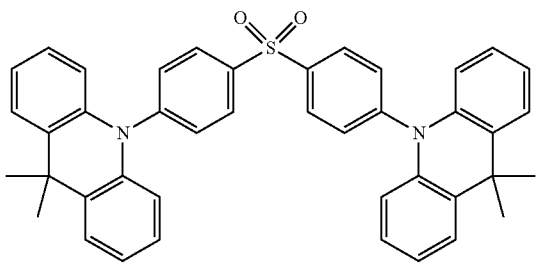

(DMAC-DPS)

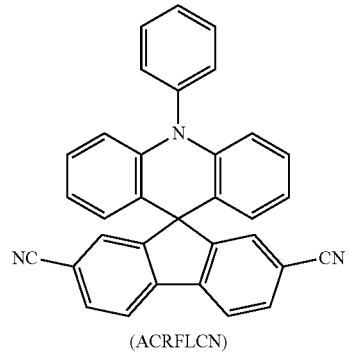

(ACRFLCN)

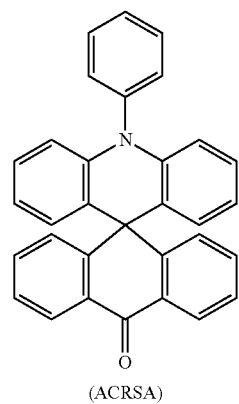

(ACRSA)

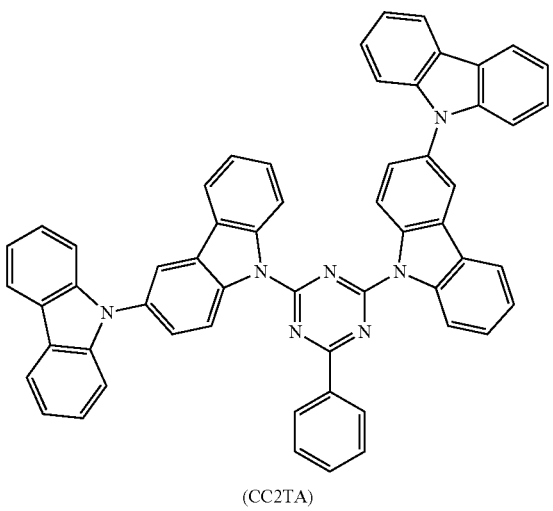

(CC2TA)

-continued
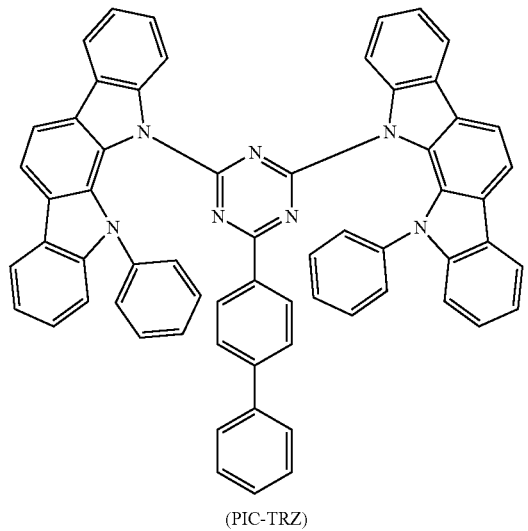
(PIC-TRZ)
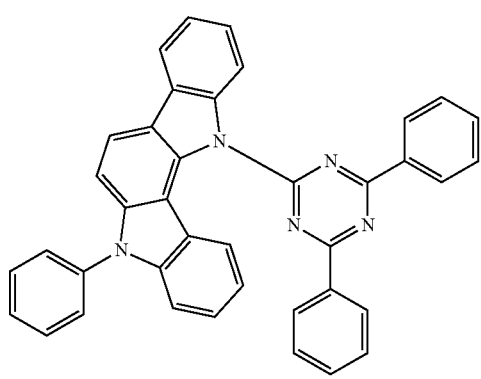
(PIC-TRZ2)
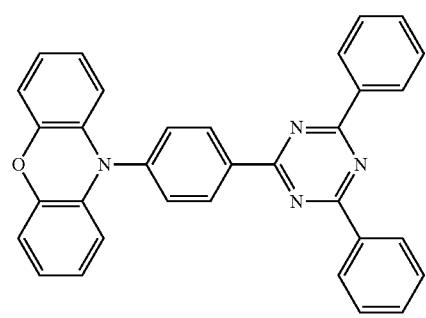
(PXZ-TRZ)
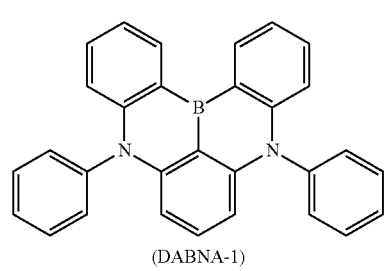
(DABNA-1)
-continued
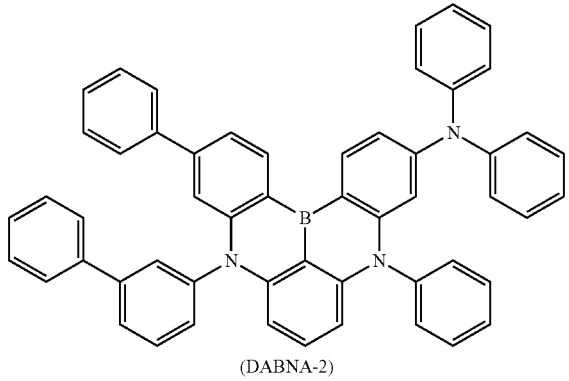
(DABNA-2)
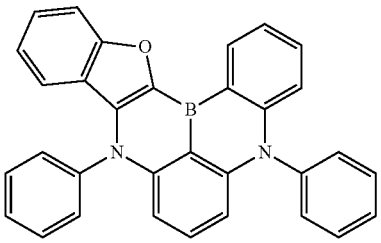
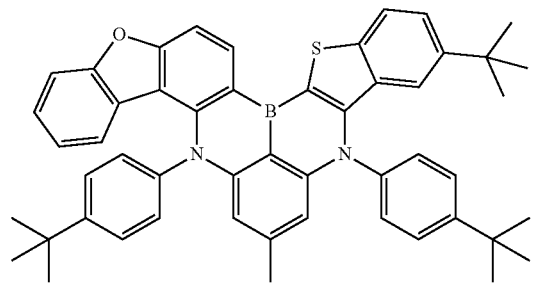
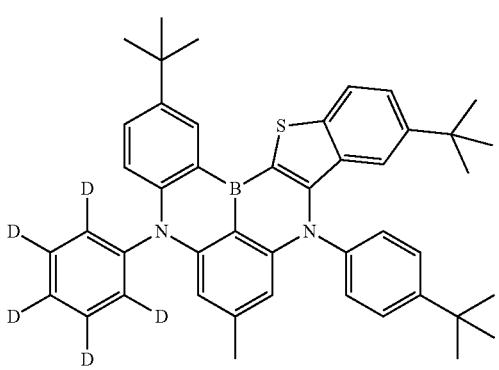

-continued

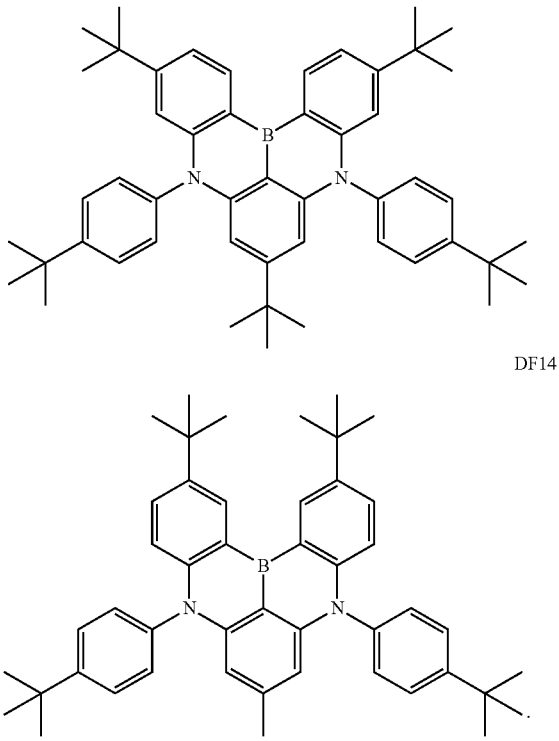

DF13

DF14

Electron Transport Region in Interlayer 130

The electron transport region 140 may have: i) a single-layer structure consisting of a single layer consisting of a single material, ii) a single-layer structure consisting of a single layer including (e.g., consisting of) multiple materials that are different from each other, or iii) a multi-layer structure including multiple layers including multiple materials that are different from each other.

The electron transport region may include a buffer layer, a hole blocking layer, an electron control layer, an electron transport layer, an electron injection layer, and/or a (e.g., any suitable) combination thereof.

For example, the electron transport region may have an electron transport layer/electron injection layer structure, a hole blocking layer/electron transport layer/electron injection layer structure, an electron control layer/electron transport layer/electron injection layer structure, or a buffer layer/electron transport layer/electron injection layer structure, wherein the constituting layers of each structure are sequentially stacked from the emission layer.

In one or more embodiments, the electron transport region (for example, the buffer layer, the hole blocking layer, the electron control layer, or the electron transport layer in the electron transport region) may include a metal-free compound including at least one IT electron-deficient nitrogen-containing $C_1$-$C_{60}$ cyclic group.

For example, the electron transport region may include a compound represented by Formula 601:

$$[Ar_{601}]_{xe11}\text{-}[(L_{601})_{xe1}\text{-}R_{601}]_{xe21}.$$

Formula 601 wherein, in Formula 601, $Ar_{601}$ and $L_{601}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$, xe11 may be 1, 2, or 3, xe1 may be 0, 1, 2, 3, 4, or 5, $R_{601}$ may be a $C_3$-$C_{60}$ carbocyclic group unsubstituted or substituted with at least one $R_{10a}$, a $C_1$-$C_{60}$ heterocyclic group unsubstituted or substituted with at least one $R_{10a}$, —Si($Q_{601}$)($Q_{602}$)($Q_{603}$), —C(=O)($Q_{601}$), —S(=O)$_2$($Q_{601}$), or —P(=O)($Q_{601}$)($Q_{602}$), $Q_{601}$ to $Q_{603}$ may each be the same as described in connection with $Q_1$, xe21 may be 1, 2, 3, 4, or 5, and at least one of $Ar_{601}$, $L_{601}$, or $R_{601}$ may each independently be a IT electron-deficient nitrogen-containing $C_1$-$C_{60}$ cyclic group unsubstituted or substituted with at least one $R_{10a}$.

In one or more embodiments, if (e.g., when) xe11 in Formula 601 is 2 or more, two or more of $Ar_{601}$ may be linked to each other via a single bond.

In one or more embodiments, $Ar_{601}$ in Formula 601 may be an anthracene group unsubstituted or substituted with at least one $R_{10a}$.

In one or more embodiments, the electron transport region may include a compound represented by Formula 601-1:

Formula 601-1

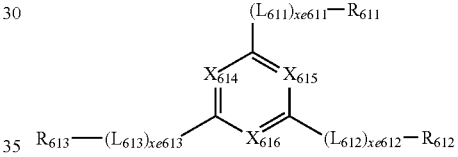

wherein, in Formula 601-1, $X_{614}$ may be N or C($R_{614}$), $X_{615}$ may be N or C($R_{615}$), $X_{616}$ may be N or C($R_{616}$), and at least one of $X_{614}$ to $X_{616}$ may be N, $L_{611}$ to $L_{613}$ may each be the same as described in connection with $L_{601}$, xe611 to xe613 may each be the same as described in connection with xe1, $R_{611}$ to $R_{613}$ may each be the same as described in connection with $R_{601}$, and $R_{614}$ to $R_{616}$ may each independently be hydrogen, deuterium, —F, —Cl, —Br, —I, a hydroxyl group, a cyano group, a nitro group, a $C_1$-$C_{20}$ alkyl group, a $C_1$-$C_{20}$ alkoxy group, a $C_3$-$C_{60}$ carbocyclic group unsubstituted or substituted with at least one $R_{10a}$, or a $C_1$-$C_{60}$ heterocyclic group unsubstituted or substituted with at least one $R_{10a}$.

For example, xe1 and xe611 to xe613 in Formulae 601 and 601-1 may each independently be 0, 1, or 2.

In one or more embodiments, the electron transport region may include: at least one of (e.g., selected from among) Compounds ET1 to ET45; 2,9-dimethyl-4,7-diphenyl-1,10-phenanthroline (BCP); 4,7-diphenyl-1,10-phenanthroline (Bphen); Alq$_3$; BAlq; TAZ; NTAZ; and/or a (e.g., any suitable) combination thereof:

ET1
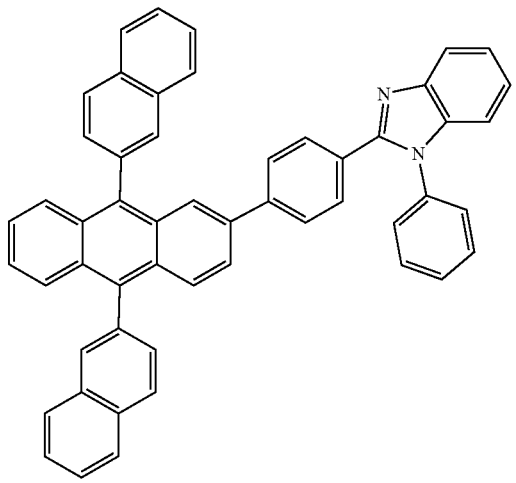
ET2
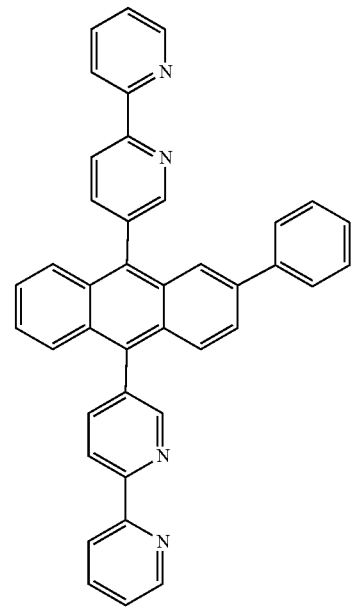
ET3
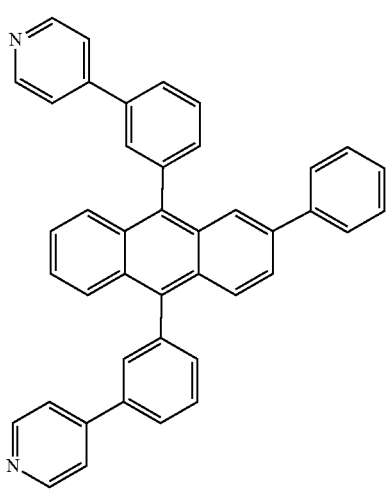
-continued
ET4
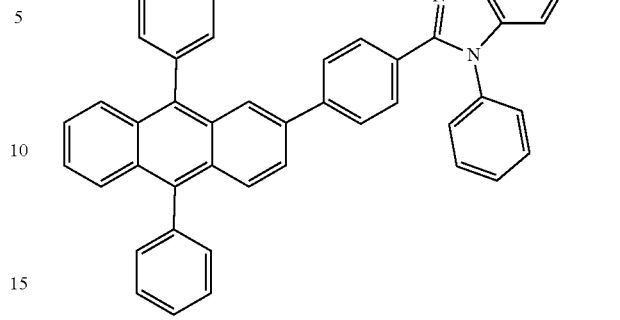
ET5
ET6
ET7
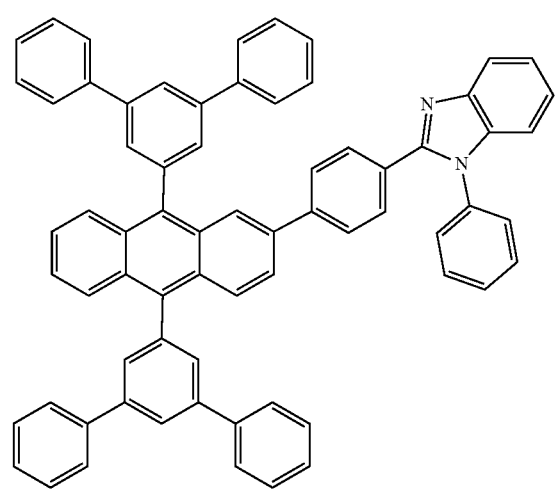

ET8
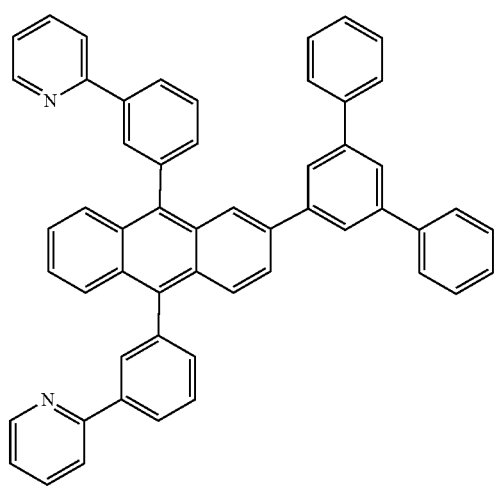
ET9
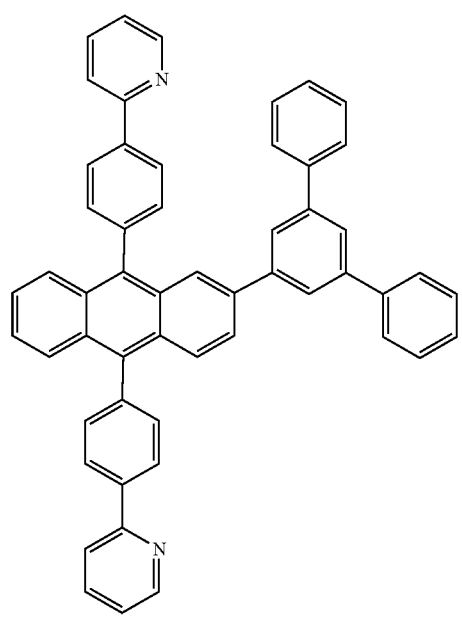
ET10
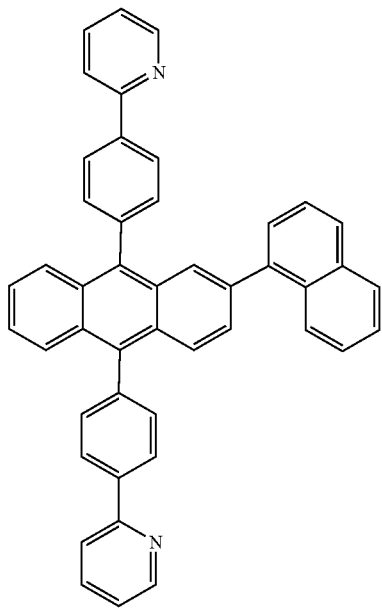
ET11
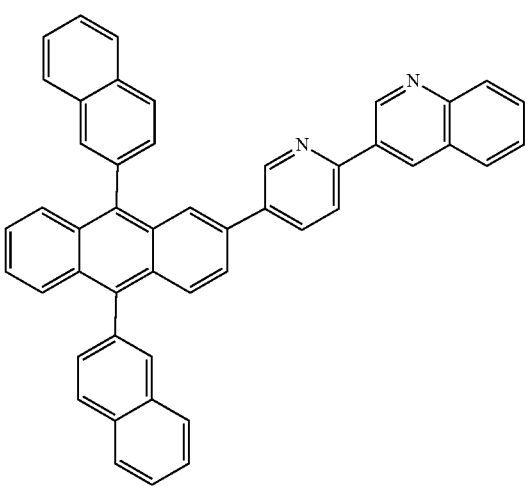
ET12
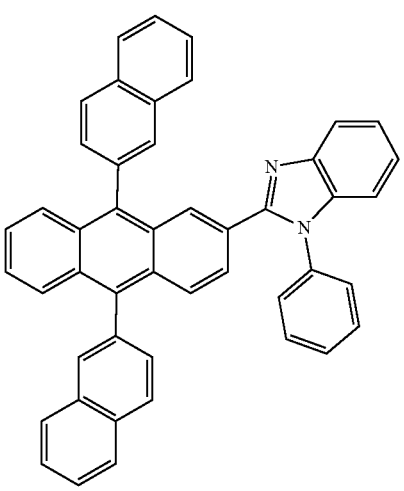

ET13
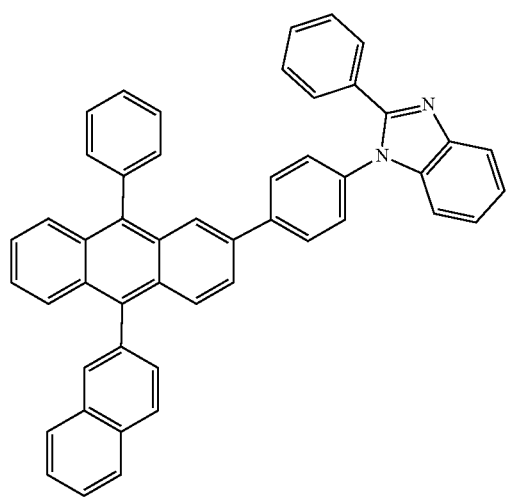
ET14
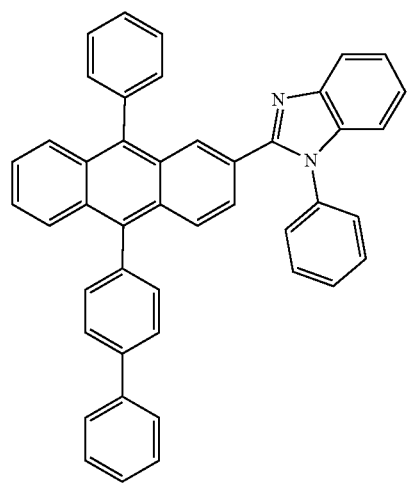
ET15
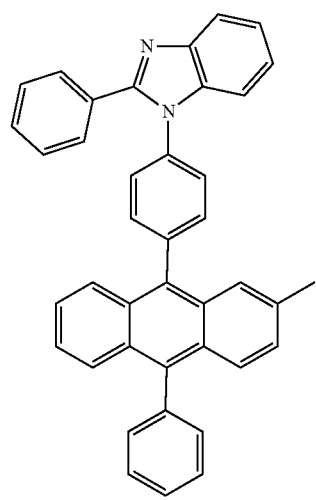
ET16
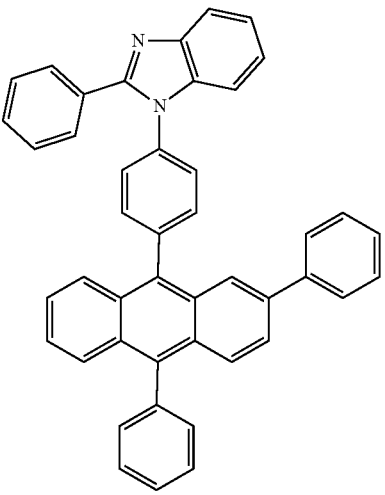
ET17
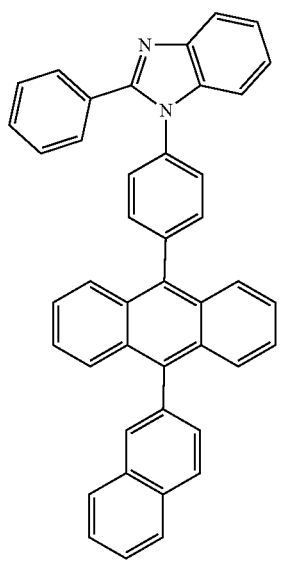
ET18
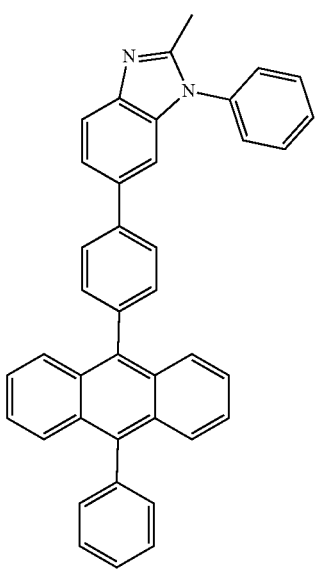

-continued
ET19
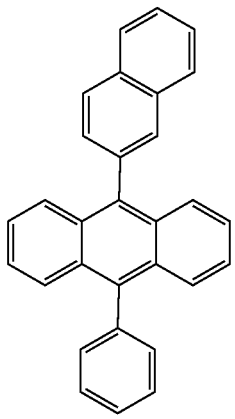
ET20
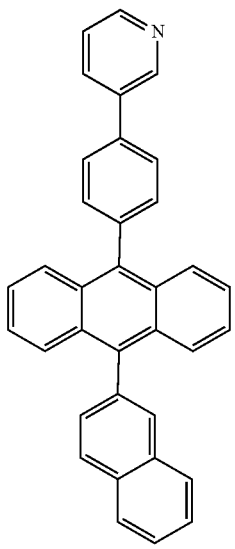
ET21
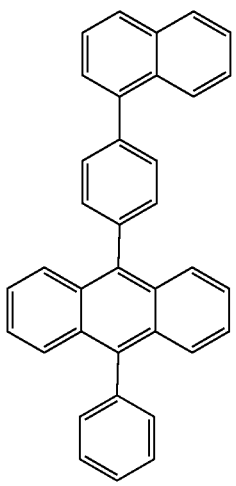
-continued
ET22
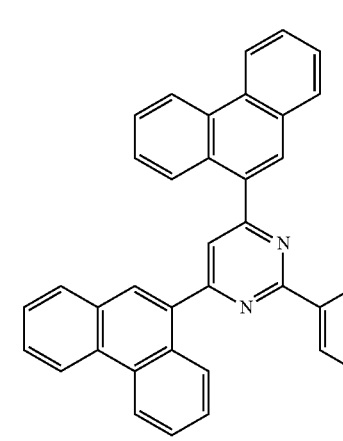
ET23
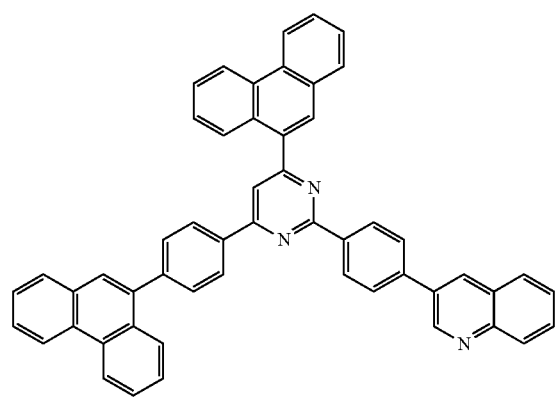
ET24
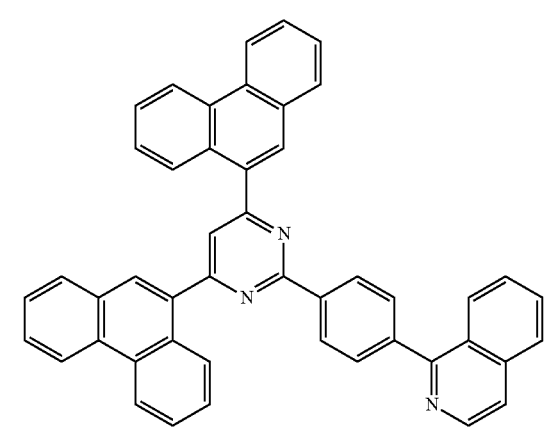

ET25
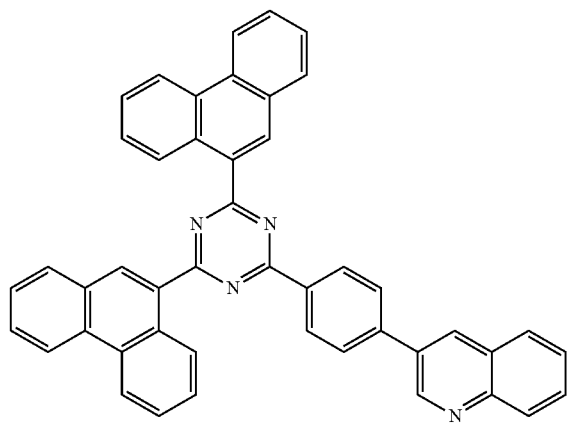
ET26
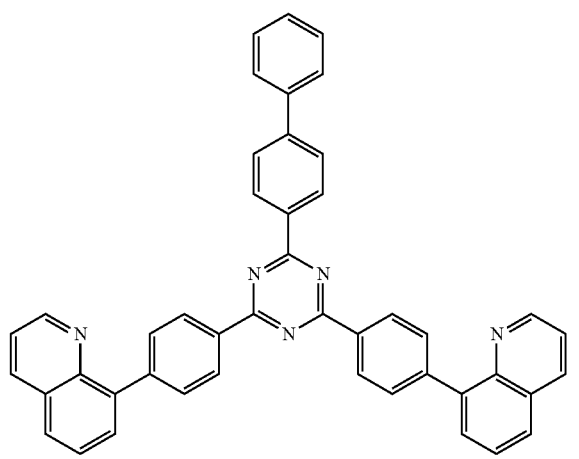
ET27
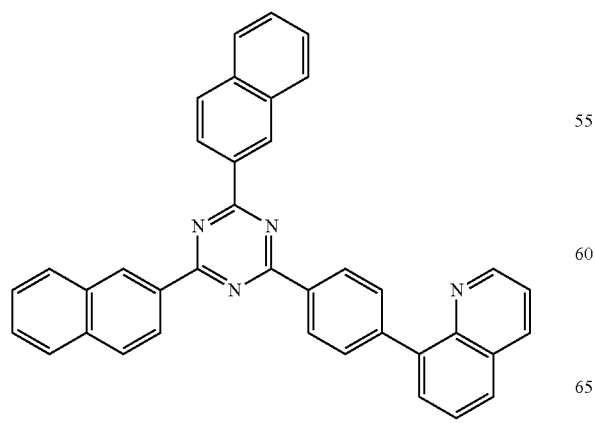
ET28
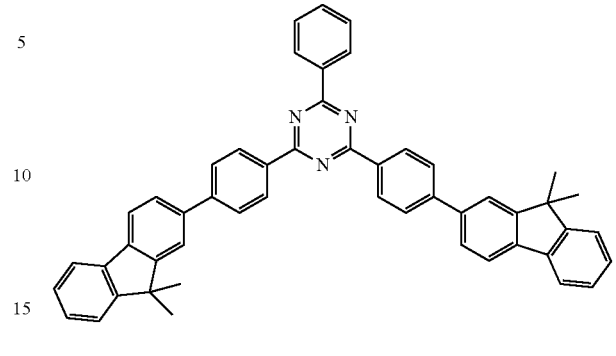
ET29
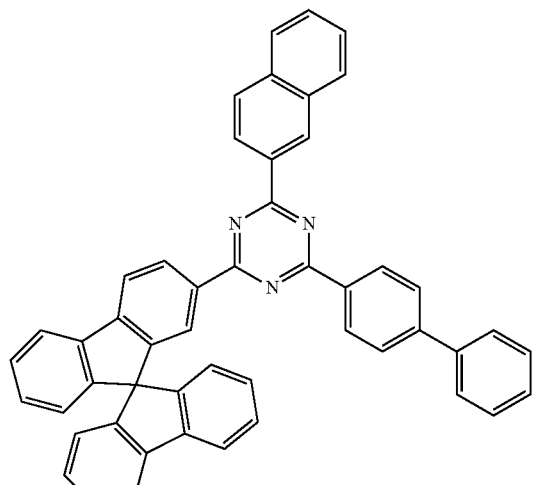
ET30
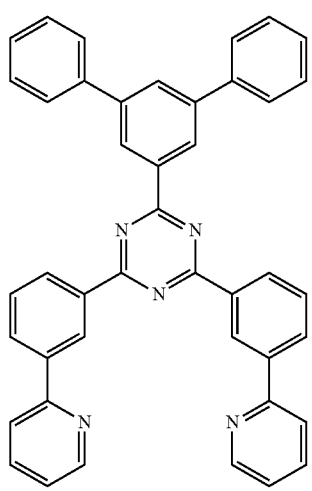

ET31
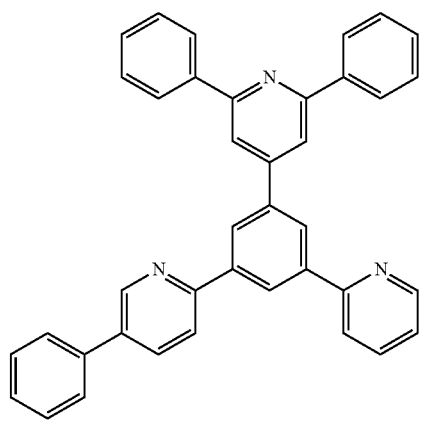
ET32
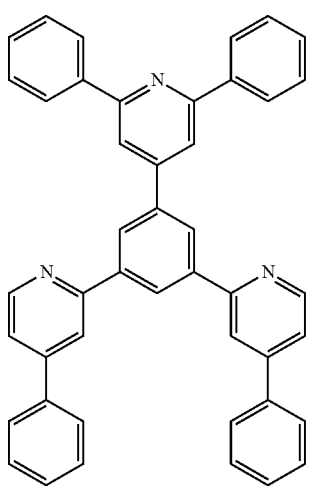
ET33
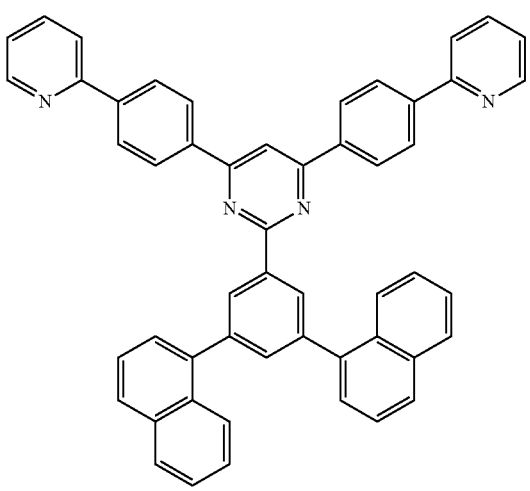
ET34
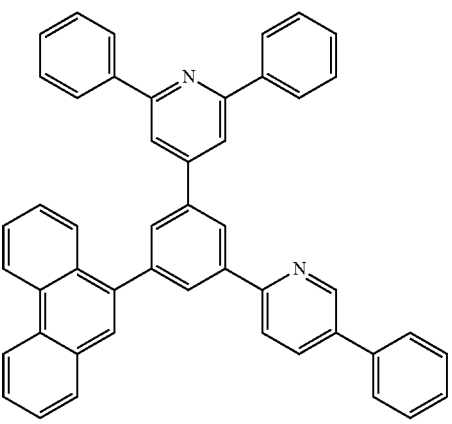
ET35
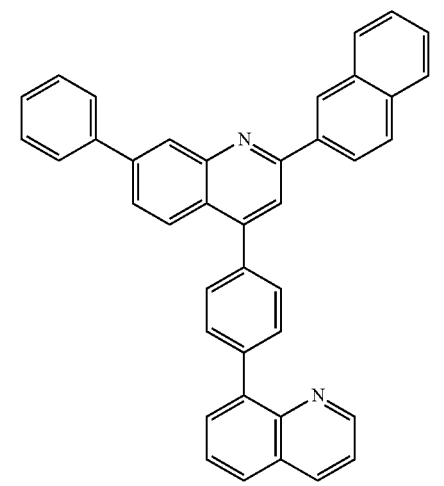
ET36
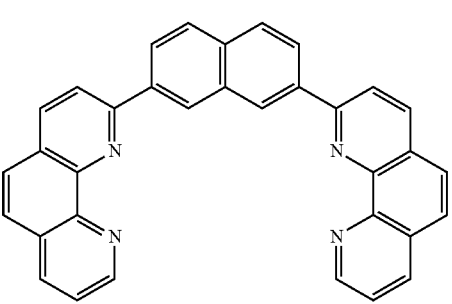
ET37
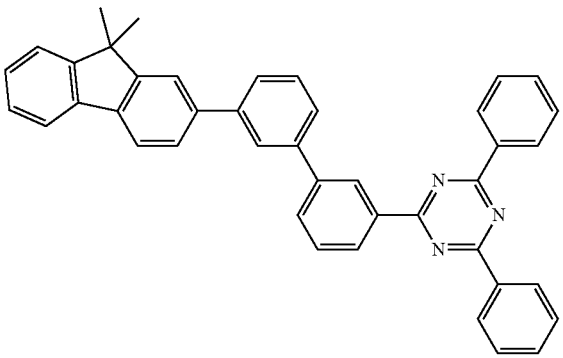

ET38
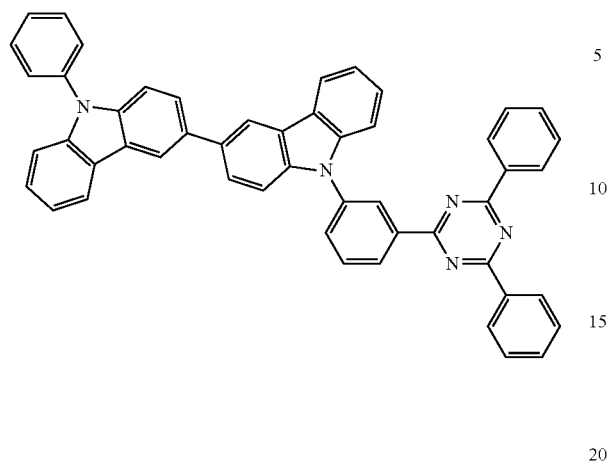
ET39
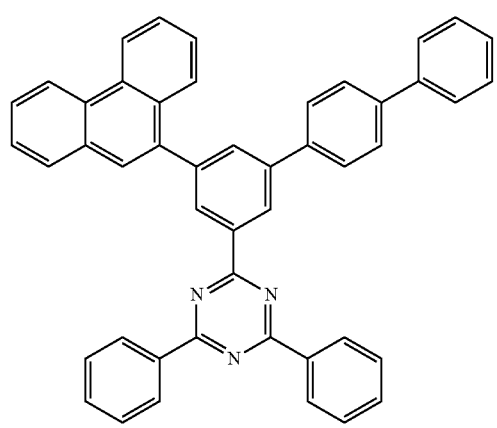
ET40
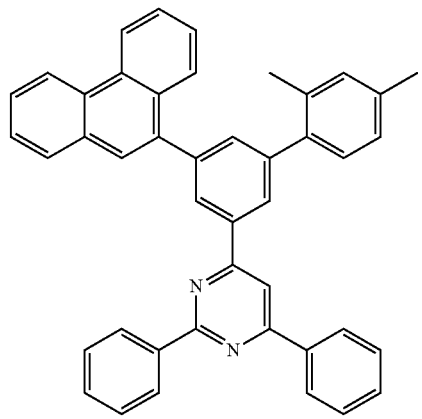
ET41
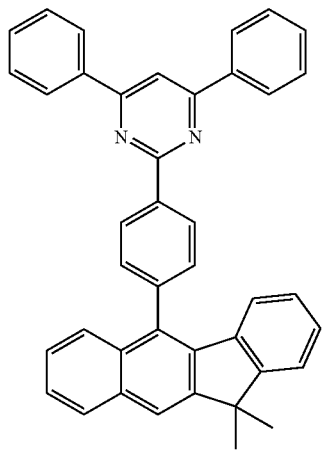
ET42
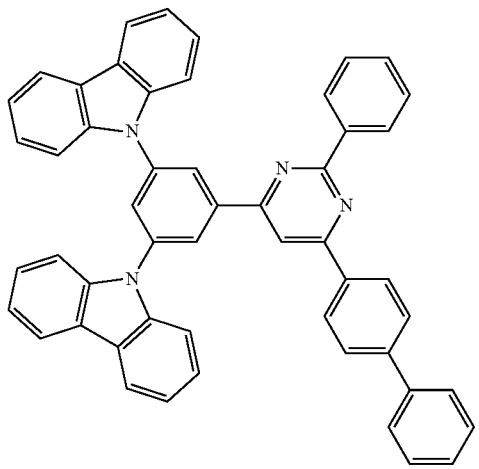
ET43
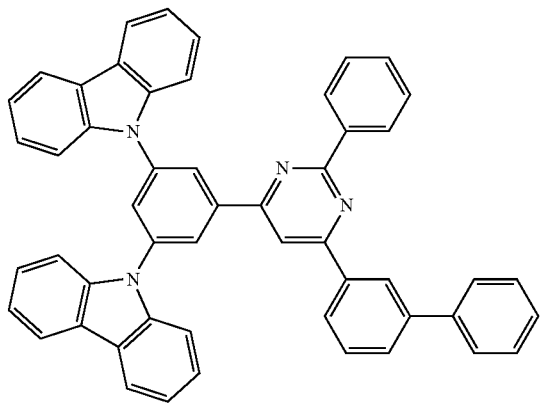

ET44

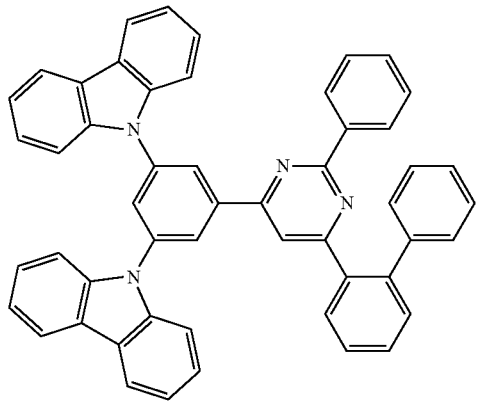

ET45

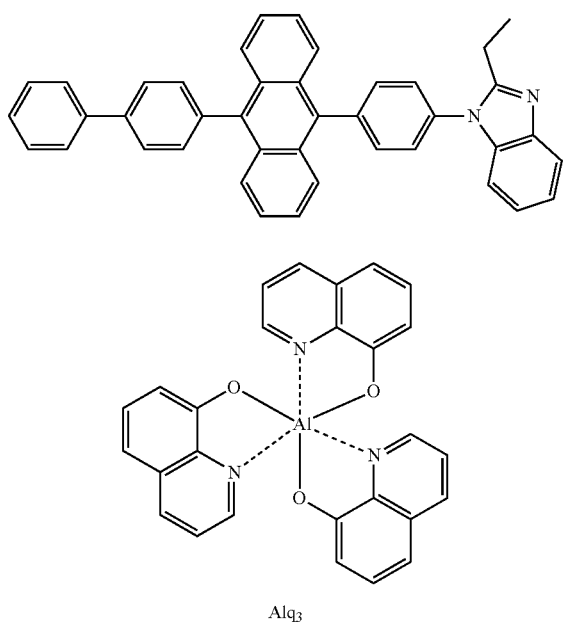

Alq₃

BAlq

TAZ

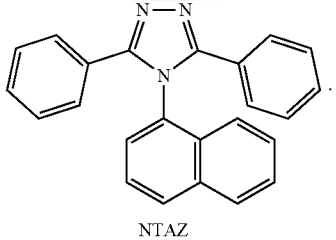

NTAZ

The thickness of the electron transport region may be in a range of about 100 Å to about 5,000 Å, for example, about 160 Å to about 4,000 Å. When the electron transport region includes a buffer layer, a hole blocking layer, an electron control layer, an electron transport layer, and/or a (e.g., any suitable) combination thereof, the thickness of the buffer layer, the hole blocking layer, or the electron control layer may be in a range of about 20 Å to about 1,000 Å, for example, about 30 Å to about 300 Å, and the thickness of the electron transport layer may be in a range of about 100 Å to about 1,000 Å, for example, about 150 Å to about 500 Å. When the thicknesses of the buffer layer, the hole blocking layer, the electron control layer, the electron transport layer, and/or the electron transport region are within these ranges, satisfactory electron transporting characteristics may be obtained without a substantial increase in driving voltage.

The electron transport region (for example, the electron transport layer in the electron transport region) may further include, in addition to the materials described above, a metal-containing material.

The metal-containing material may include an alkali metal complex, an alkaline earth metal complex, and/or a (e.g., any suitable) combination thereof. The metal ion of the alkali metal complex may be a Li ion, a Na ion, a K ion, a Rb ion, or a Cs ion, and the metal ion of the alkaline earth metal complex may be a Be ion, a Mg ion, a Ca ion, a Sr ion, or a Ba ion. A ligand coordinated with the metal ion of the alkali metal complex or the alkaline earth-metal complex may include a hydroxyquinoline, a hydroxyisoquinoline, a hydroxybenzoquinoline, a hydroxyacridine, a hydroxyphenanthridine, a hydroxyphenyloxazole, a hydroxyphenylthiazole, a hydroxyphenyloxadiazole, a hydroxyphenylthiadiazole, a hydroxyphenylpyridine, a hydroxyphenylbenzimidazole, a hydroxyphenylbenzothiazole, a bipyridine, a phenanthroline, a cyclopentadiene, and/or a (e.g., any suitable) combination thereof.

For example, the metal-containing material may include a $L_1$ complex. The $L_1$ complex may include, for example, Compound ET-D1 (LiQ) or ET-D2:

ET-D1

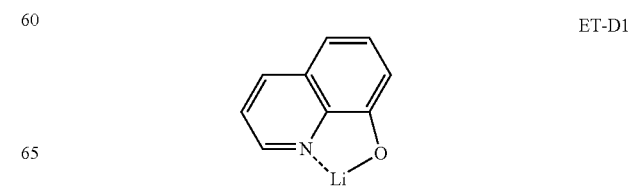

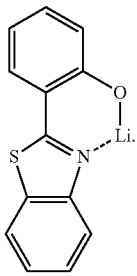
ET-D2

The electron transport region may include an electron injection layer that facilitates the injection of electrons from the second electrode 150. The electron injection layer may directly contact the second electrode 150.

The electron injection layer may have: i) a single-layered structure consisting of a single layer consisting of a single material, ii) a single-layered structure consisting of a single layer including (e.g., consisting of) multiple layers that are different from each other, or iii) a multi-layered structure including multiple layers including multiple materials that are different from each other.

The electron injection layer may include an alkali metal, an alkaline earth metal, a rare earth metal, an alkali metal-containing compound, alkaline earth metal-containing compound, a rare earth metal-containing compound, an alkali metal complex, an alkaline earth metal complex, a rare earth metal complex, and/or a (e.g., any suitable) combination thereof.

The alkali metal may include Li, Na, K, Rb, Cs, and/or a (e.g., any suitable) combination thereof. The alkaline earth metal may include Mg, Ca, Sr, Ba, and/or a (e.g., any suitable) combination thereof. The rare earth metal may include Sc, Y, Ce, Tb, Yb, Gd, and/or a (e.g., any suitable) combination thereof.

The alkali metal-containing compound, the alkaline earth metal-containing compound, and the rare earth metal-containing compound may be oxides, halides (for example, fluorides, chlorides, bromides, iodides, and/or the like), or tellurides of the alkali metal, the alkaline earth metal, and the rare earth metal, and/or a (e.g., any suitable) combination thereof.

The alkali metal-containing compound may include: an alkali metal oxide, such as $Li_2O$, $Cs_2O$, $K_2O$, and/or the like; an alkali metal halide, such as LiF, NaF, CsF, KF, LiI, NaI, CsI, KI, and/or the like; and/or a (e.g., any suitable) combination thereof. The alkaline earth metal-containing compound may include an alkaline earth metal compound, such as BaO, SrO, CaO, $Ba_xSr_{1-x}O$ (wherein x is a real number satisfying 0<x<1), $Ba_xCa_{1-x}O$ (wherein x is a real number satisfying 0<x<1), and/or the like. The rare earth metal-containing compound may include $YbF_3$, $ScF_3$, $Sc_2O_3$, $Y_2O_3$, $Ce_2O_3$, $GdF_3$, $TbF_3$, $YbI_3$, $ScI_3$, $TbI_3$, and/or a (e.g., any suitable) combination thereof. In one or more embodiments, the rare earth metal-containing compound may include lanthanide metal telluride. Examples of the lanthanide metal telluride are LaTe, CeTe, PrTe, NdTe, PmTe, SmTe, EuTe, GdTe, TbTe, DyTe, HoTe, ErTe, TmTe, YbTe, LuTe, $La_2Te_3$, $Ce_2Te_3$, $Pr_2Te_3$, $Nd_2Te_3$, $Pm_2Te_3$, $Sm_2Te_3$, $Eu_2Te_3$, $Gd_2Te_3$, $Tb_2Te_3$, $Dy_2Te_3$, $Ho_2Te_3$, $Er_2Te_3$, $Tm_2Te_3$, $Yb_2Te_3$, $Lu_2Te_3$, and/or the like.

The alkali metal complex, the alkaline earth-metal complex, and the rare earth metal complex may include i) one of ions of the alkali metal, the alkaline earth metal, and the rare earth metal and ii), as a ligand bonded to the metal ion, for example, hydroxyquinoline, hydroxyisoquinoline, hydroxybenzoquinoline, hydroxyacridine, hydroxyphenanthridine, hydroxyphenyloxazole, hydroxyphenylthiazole, hydroxyphenyloxadiazole, hydroxyphenylthiadiazole, hydroxyphenylpyridine, hydroxyphenyl benzimidazole, hydroxyphenylbenzothiazole, bipyridine, phenanthroline, cyclopentadiene, and/or a (e.g., any suitable) combination thereof.

In one or more embodiments, the electron injection layer may include (e.g., consist of) an alkali metal, an alkaline earth metal, a rare earth metal, an alkali metal-containing compound, an alkaline earth metal-containing compound, a rare earth metal-containing compound, an alkali metal complex, an alkaline earth metal complex, a rare earth metal complex, and/or a (e.g., any suitable) combination thereof, as described above. In one or more embodiments, the electron injection layer may further include an organic material (for example, a compound represented by Formula 601).

In one or more embodiments, the electron injection layer may include (e.g., consist of) i) an alkali metal-containing compound (for example, an alkali metal halide), ii) a) an alkali metal-containing compound (for example, an alkali metal halide); and b) an alkali metal, an alkaline earth metal, a rare earth metal, and/or a (e.g., any suitable) combination thereof. For example, the electron injection layer may be a KI:Yb co-deposited layer, an RbI:Yb co-deposited layer, a LiF:Yb co-deposited layer, and/or the like.

When the electron injection layer further includes an organic material, the alkali metal, the alkaline earth metal, the rare earth metal, the alkali metal-containing compound, the alkaline earth metal-containing compound, the rare earth metal-containing compound, the alkali metal complex, the alkaline earth-metal complex, the rare earth metal complex, and/or a (e.g., any suitable) combination thereof may be uniformly (e.g., substantially uniformly) or non-uniformly dispersed in a matrix including the organic material.

A thickness of the electron injection layer may be in a range of about 1 Å to about 100 Å, and, for example, about 3 Å to about 90 Å. When the thickness of the electron injection layer is within these ranges, satisfactory electron injection characteristics may be obtained without a substantial increase in driving voltage.

Second Electrode 150

The second electrode 150 is arranged on the interlayer 130 having the aforementioned structure. The second electrode 150 may be a cathode, which is an electron injection electrode, and as a material for forming the second electrode 150, a metal, an alloy, an electrically conductive compound, and/or a (e.g., any suitable) combination thereof, each having a low-work function, may be used.

The second electrode 150 may include Li, Ag, Mg, Al, Al—Li, Ca, Mg—In, Mg—Ag, Yb, Ag—Yb, ITO, IZO, and/or a (e.g., any suitable) combination thereof. The second electrode 150 may be a transmissive electrode, a semi-transmissive electrode, or a reflective electrode.

The second electrode 150 may have a single-layer structure or a multi-layer structure including multiple layers.

Capping Layer

The first capping layer may be arranged outside the first electrode 110, and/or the second capping layer may be arranged outside the second electrode 150. In particular, the light-emitting device 10 may have a structure in which the first capping layer, the first electrode 110, the interlayer 130, and the second electrode 150 are sequentially stacked in the stated order, a structure in which the first electrode 110, the interlayer 130, the second electrode 150, and the second capping layer are sequentially stacked in the stated order, or a structure in which the first capping layer, the first electrode 110, the interlayer 130, the second electrode 150, and the second capping layer are sequentially stacked in the stated order.

Light generated in the emission layer of the interlayer 130 of the light-emitting device 10 may be extracted (e.g., emitted) toward the outside through the first electrode 110 which is a semi-transmissive electrode or a transmissive electrode, and the first capping layer. Or, light generated in the emission layer of the interlayer 130 of the light-emitting device 10 may be extracted (e.g., emitted) toward the outside through the second electrode 150 which is a semi-transmissive electrode or a transmissive electrode, and the second capping layer.

The first capping layer and the second capping layer may increase external emission efficiency according to the principle of constructive interference. Accordingly, the light extraction efficiency of the light-emitting device 10 is increased, so that the luminescence efficiency of the light-emitting device 10 may be improved.

Each of the first capping layer and the second capping layer may include a material having a refractive index of greater than or equal to 1.6 (at 589 nm).

The first capping layer and the second capping layer may each independently be a capping layer including the quantum dot, an organic capping layer including an organic material, an inorganic capping layer including an inorganic material, or an organic-inorganic composite capping layer including an organic material and an inorganic material.

The first capping layer and/or the second capping layer may each independently include a carbocyclic compound, a heterocyclic compound, an amine group-containing compound, a porphine derivative, a phthalocyanine derivative, a naphthalocyanine derivative, an alkali metal complex, an alkaline earth metal complex, and/or a (e.g., any suitable) combination thereof. The carbocyclic compound, the heterocyclic compound, and the amine group-containing compound may optionally be substituted with a substituent including O, N, S, Se, Si, F, Cl, Br, I, and/or a (e.g., any suitable) combination thereof. In one or more embodiments, the first capping layer and/or the second capping layer may each independently include an amine group-containing compound.

In one or more embodiments, the first capping layer and/or the second capping layer may each independently include a compound represented by Formula 201, a compound represented by Formula 202, and/or a (e.g., any suitable) combination thereof.

In one or more embodiments, the first capping layer and/or the second capping layer may each independently include at least one of (e.g., selected from among) Compounds HT28 to HT33, at least one of (e.g., selected from among) Compounds CP1 to CP6, β-NPB, and/or a (e.g., any suitable) combination thereof:

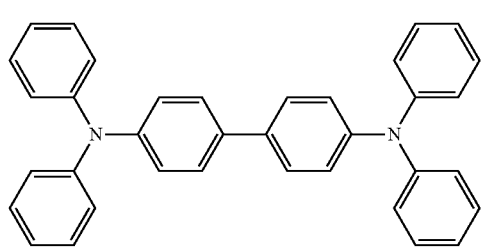

CP1

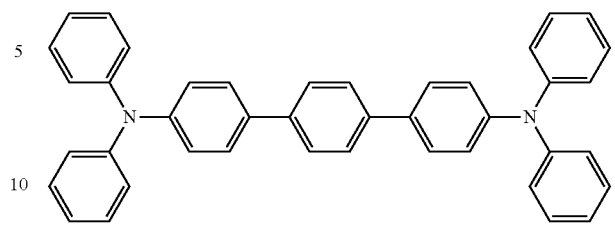

CP2

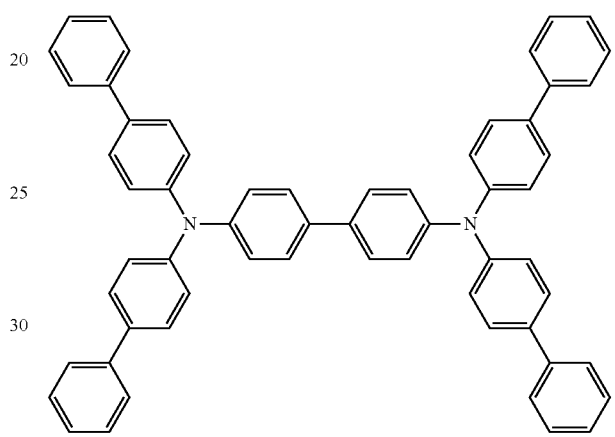

CP3

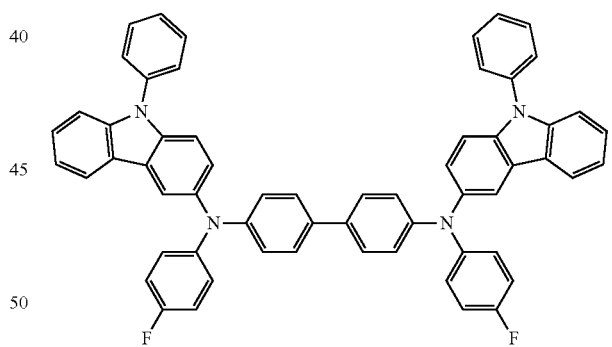

CP4

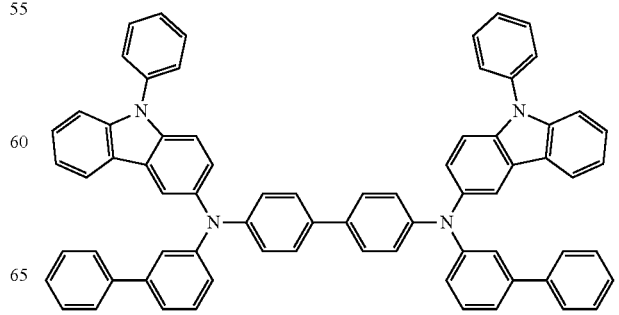

CP5

-continued

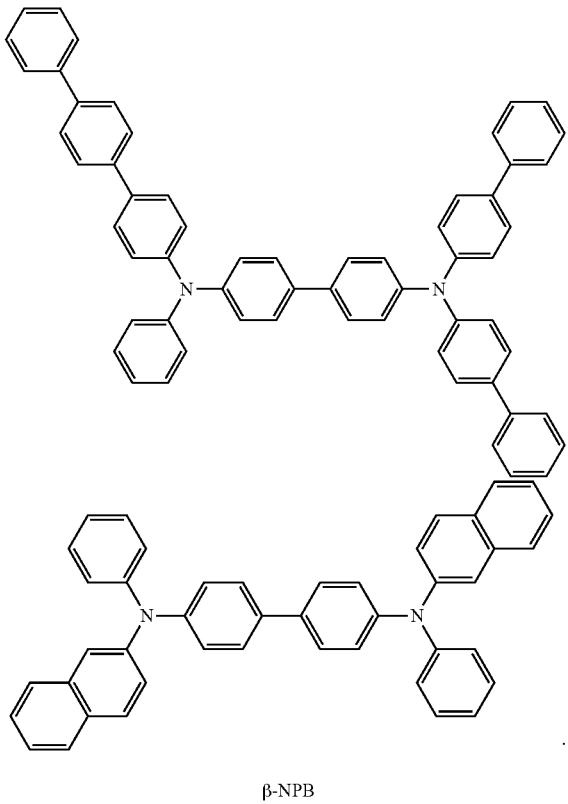

CP6

β-NPB

Film

The quantum dot may be included in one or more suitable films. Therefore, according to another aspect, a film containing the quantum dot may be provided. The film may be, for example, an optical member (or a light control refers to) (for example, a color filter, a color conversion member, a capping layer, a light extraction efficiency enhancement layer, a selective light absorbing layer, a polarizing layer, a quantum dot-containing layer, or like), a light-blocking member (for example, a light reflective layer, a light absorbing layer, and/or the like), a protective member (for example, an insulating layer, a dielectric layer, and/or the like).

Optical Member

According to one or more embodiments, an optical member including the quantum dot as described above is provided.

The optical member may be a color conversion member.

The color conversion member may include a substrate and a pattern layer (e.g., layer formed with a pattern) formed on the substrate.

The substrate may be a substrate constituting the color conversion member, or may be a region of one or more suitable apparatuses (for example, a display apparatus) in which the color conversion member is located. The substrate may be glass, silicon (Si), silicon oxide ($SiO_x$), or a polymer substrate, and the polymer substrate may be polyethersulfone (PES) or polycarbonate (PC).

The pattern layer may include the quantum dot in the form of a thin film. For example, the pattern layer may be a thin-film quantum dot.

The color conversion member including the substrate and the pattern layer may further include a partition wall or a black matrix formed between pattern layers. In one or more embodiments, the color conversion member may further include a color filter to further improve light conversion efficiency.

The color conversion member may include a red pattern layer capable of emitting red light, a green pattern layer capable of emitting green light, a blue pattern layer capable of emitting blue light, and/or a (e.g., any suitable) combination thereof. The red pattern layer, the green pattern layer and/or the blue pattern layer may be implemented by controlling the components, compositions and/or structure of the quantum dot.

According to one or more embodiments, an apparatus includes the quantum dot (or, an apparatus includes an optical member that includes the quantum dot).

The apparatus may further include a light source, and the quantum dot (or an optical member including the quantum dot) may be located in the path of light emitted from the light source.

The light source may be to emit blue light, red light, green light, or white light. For example, the light source may be to emit blue light. In one or more embodiments, light emitted from the light source may be absorbed by the quantum dot.

The light source may be an organic light-emitting device OLED or a light-emitting diode (LED).

The light emitted from the light source as described above may be photoconverted (e.g., from an original wavelength to a different wavelength) by the quantum dot while passing through the quantum dot. Accordingly, due to the quantum dot, light having a wavelength that is different from that of the light emitted from the light source, may be emitted.

For example, the quantum dot may be to absorb and convert light emitted from the light source to emit light with a maximum emission wavelength of about 400 nm to about 2500 nm.

Electronic Apparatus

The quantum dot and the light-emitting device including the quantum dot may be included in one or more suitable electronic apparatuses. For example, an electronic apparatus including (e.g., an optical member including) the quantum dot and a light-emitting device including the quantum dot may be a light-emitting apparatus, an authentication apparatus, and/or the like.

The electronic apparatus (for example, a light-emitting apparatus) may further include, in addition to the light-emitting device, i) a color filter, ii) a color conversion layer, or iii) a color filter and a color conversion layer. The color filter and/or the color conversion layer may be arranged in at least one traveling direction of light emitted from the light-emitting device. For example, the light emitted from the light-emitting device may be blue light or white light. Details on the light-emitting device may be referred to the descriptions provided herein. In one or more embodiments, the color conversion layer may include a quantum dot. The quantum dot may be, for example, the quantum dot as described herein.

The electronic apparatus may include a first substrate. The first substrate may include a plurality of subpixel areas, the color filter may include a plurality of color filter areas respectively corresponding to the plurality of subpixel areas, and the color conversion layer may include a plurality of color conversion areas respectively corresponding to the plurality of subpixel areas.

A pixel-defining film may be arranged among the plurality of subpixel areas to define each of the subpixel areas.

The color filter may further include a plurality of color filter areas and light-shielding patterns arranged among the plurality of color filter areas, and the color conversion layer may further include a plurality of color conversion areas and light-shielding patterns arranged among the plurality of color conversion areas.

The plurality of color filter areas (or the plurality of color conversion areas) may include a first area emitting a first color light, a second area emitting a second color light, and/or a third area emitting a third color light, wherein the first color light, the second color light, and/or the third color light may have different maximum emission wavelengths from one another. For example, the first color light may be red light, the second color light may be green light, and the third color light may be blue light. For example, the plurality of color filter areas (or the plurality of color conversion areas) may include quantum dots. In particular, the first area may include a red quantum dot, the second area may include a green quantum dot, and the third area may not include a (e.g., may exclude any) quantum dot. Details on the quantum dot may be referred to the descriptions provided herein. The first area, the second area, and/or the third area may each further include a scatter (e.g., scatterer).

For example, the light-emitting device may be to emit first light, the first area may be to absorb the first light to emit a first-first color light, the second area may be to absorb the first light to emit a second-first color light, and the third area may be to absorb the first light to emit a third-first color light. Here, the first-first color light, the second-first color light, and the third-first color light may have different maximum emission wavelengths. In particular, the first light may be blue light, the first-first color light may be red light, the second-first color light may be green light, and the third-first color light may be blue light.

The electronic apparatus may further include a thin-film transistor, in addition to the light-emitting device as described above. The thin-film transistor may include a source electrode, a drain electrode, and an activation layer, wherein the source electrode or the drain electrode may be electrically connected to the first electrode or the second electrode of the light-emitting device.

The thin-film transistor may further include a gate electrode, a gate insulating film, and/or the like.

The activation layer may include crystalline silicon, amorphous silicon, an organic semiconductor, an oxide semiconductor, and/or the like.

The electronic apparatus may further include a sealing portion for sealing the light-emitting device. The sealing portion may be arranged between the color filter and/or the color conversion layer and the light-emitting device. The sealing portion allows light from the light-emitting device to be extracted (e.g., emitted) to the outside, and concurrently (e.g., simultaneously) prevents or substantially prevents ambient air and moisture from penetrating into the light-emitting device. The sealing portion may be a sealing substrate including a transparent glass substrate or a plastic substrate. The sealing portion may be a thin-film encapsulation layer including at least one layer of an organic layer and/or an inorganic layer. When the sealing portion is a thin film encapsulation layer, the electronic apparatus may be flexible.

Various suitable functional layers may be additionally arranged on the sealing portion, in addition to the color filter and/or the color conversion layer, according to the use of the electronic apparatus. Examples of the functional layers may include a touch screen layer, a polarizing layer, and/or the like. The touch screen layer may be a pressure-sensitive touch screen layer, a capacitive touch screen layer, or an infrared touch screen layer. The authentication apparatus may be, for example, a biometric authentication apparatus that authenticates an individual by using biometric information of a living body (for example, fingertips, pupils, and/or the like).

The authentication apparatus may further include, in addition to the light-emitting device as described above, a biometric information collector.

The electronic apparatus may be applied to one or more suitable displays, light sources, lighting, personal computers (for example, a mobile personal computer), mobile phones, digital cameras, electronic organizers, electronic dictionaries, electronic game machines, medical instruments (for example, electronic thermometers, sphygmomanometers, blood glucose meters, pulse measurement devices, pulse wave measurement devices, electrocardiogram displays, ultrasonic diagnostic devices, or endoscope displays), fish finders, one or more suitable measuring instruments, meters (for example, meters for a vehicle, an aircraft, and a vessel), projectors, and/or the like.

Electronic Device

The quantum dot and the light-emitting device including the quantum dot may be included in one or more suitable electronic device.

For example, the electronic device including the light-emitting device may be a flat panel display, a curved display, a computer monitor, a medical monitor, a television, a billboard, a light for indoor or outdoor lighting and/or signaling, a head-up display, a fully or partially transparent display, a flexible display, a rollable display, a foldable display, a stretchable display, a laser printer, a telephone, a mobile phone, a tablet, a phablet, a personal digital assistant (PDA), a wearable device, a laptop computer, a digital camera, a camcorder, a viewfinder, a micro display, a 3D display, a virtual or augmented-reality display, a vehicle, a video wall including multiple displays tiled together, a theater or stadium screen, a phototherapy device, and/or a signboard.

Because the light-emitting device has excellent or suitable effects in terms of luminescence efficiency long lifespan, the electronic device including the light-emitting device may have characteristics of high luminance, high resolution, and low power consumption.

Figure 2:
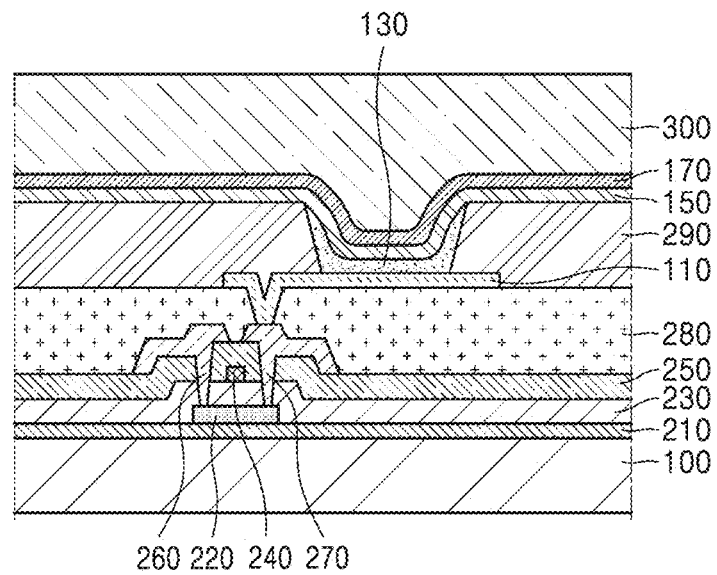
FIG. 2 is a schematic view of a structure of an electronic apparatus according to one or more embodiments.
Figure 3:
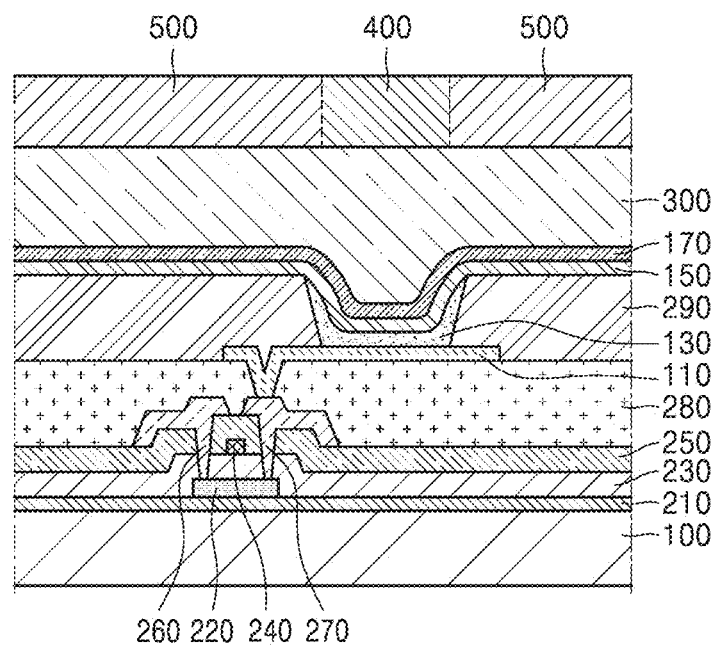
FIG. 3 is a schematic view of a structure of an electronic apparatus according to one or more embodiments.

Description of FIGS. 2 and 3

FIG. 2 is a cross-sectional view showing a light-emitting apparatus according to one or more embodiments.

The light-emitting apparatus of FIG. 2 includes a substrate 100, a thin-film transistor (TFT), a light-emitting device, and an encapsulation portion 300 that seals the light-emitting device.

The substrate 100 may be a flexible substrate, a glass substrate, or a metal substrate. A buffer layer 210 may be arranged on the substrate 100. The buffer layer 210 may prevent or reduce penetration of impurities through the substrate 100 and may provide a flat surface on the substrate 100.

A TFT may be arranged on the buffer layer 210. The TFT may include an activation layer 220, a gate electrode 240, a source electrode 260, and a drain electrode 270.

The activation layer 220 may include an inorganic semiconductor, such as silicon and/or polysilicon, an organic semiconductor, and/or an oxide semiconductor, and may include a source region, a drain region, and a channel region.

A gate insulating film 230 for insulating the activation layer 220 from the gate electrode 240 may be arranged on the activation layer 220, and the gate electrode 240 may be arranged on the gate insulating film 230.

An interlayer insulating film 250 may be arranged on the gate electrode 240. The interlayer insulating film 250 may be arranged between the gate electrode 240 and the source electrode 260, e.g., to insulate the gate electrode 240 from the source electrode 260 and between the gate electrode 240 and the drain electrode 270, e.g., to insulate the gate electrode 240 from the drain electrode 270. That is, the interlayer insulating film 250 is arranged to be positioned between the gate electrode 240 and the source electrode 260, as well as between the gate electrode 240 and the drain electrode 270, serving the purpose of electrical insulation between these components.

The source electrode 260 and the drain electrode 270 may be arranged on the interlayer insulating film 250. The interlayer insulating film 250 and the gate insulating film 230 may be formed to expose the source region and the drain region of the activation layer 220, and the source electrode 260 and the drain electrode 270 may be arranged in contact with the exposed portions of the source region and the drain region of the activation layer 220.

The TFT may be electrically connected to a light-emitting device to drive the light-emitting device, and may be covered and protected by a passivation layer 280. The passivation layer 280 may include an inorganic insulating film, an organic insulating film, and/or a (e.g., any suitable) combination thereof. A light-emitting device may be provided on the passivation layer 280. The light-emitting device may include the first electrode 110, the interlayer 130, and the second electrode 150.

The first electrode 110 may be arranged on the passivation layer 280. The passivation layer 280 may be arranged to expose a portion of the drain electrode 270, not fully covering the drain electrode 270, and the first electrode 110 may be arranged to be connected to the exposed portion of the drain electrode 270.

A pixel defining layer 290 including an insulating material may be arranged on the first electrode 110. The pixel defining layer 290 may expose a certain region of the first electrode 110, and an interlayer 130 may be formed in the exposed region of the first electrode 110. The pixel defining layer 290 may be a polyimide-based organic film or a polyacrylic-based organic film. In some embodiments, at least some layers of the interlayer 130 may extend beyond the upper portion of the pixel defining layer 290 to be arranged in the form of a common layer.

The second electrode 150 may be arranged on the interlayer 130, and a capping layer 170 may be additionally formed on the second electrode 150. The capping layer 170 may be formed to cover the second electrode 150.

The encapsulation portion 300 may be arranged on the capping layer 170. The encapsulation portion 300 may be arranged on a light-emitting device to protect the light-emitting device from moisture and/or oxygen. The encapsulation portion 300 may include: an inorganic film including silicon nitride (SiNx), silicon oxide (SiOx), indium tin oxide, indium zinc oxide, and/or a (e.g., any suitable) combination thereof; an organic film including polyethylene terephthalate, polyethylene naphthalate, polycarbonate, polyimide, polyethylene sulfonate, polyoxymethylene, polyarylate, hexamethyldisiloxane, an acrylic resin (for example, polymethyl methacrylate, polyacrylic acid, and/or the like), an epoxy-based resin (for example, aliphatic glycidyl ether (AGE), and/or the like), and/or a (e.g., any suitable) combination thereof; and/or a (e.g., any suitable) combination of the inorganic films and the organic films.

FIG. 3 shows a cross-sectional view showing a light-emitting apparatus according to one or more embodiments.

The light-emitting apparatus of FIG. 3 is the same as the light-emitting apparatus of FIG. 2, except that a light-shielding pattern 500 and a functional region 400 are additionally arranged on the encapsulation portion 300. The functional region 400 may be i) a color filter area, ii) a color conversion area, or iii) a combination of the color filter area and the color conversion area. In one or more embodiments, the light-emitting device included in the light-emitting apparatus of FIG. 3 may be a tandem light-emitting device.

Figure 4:
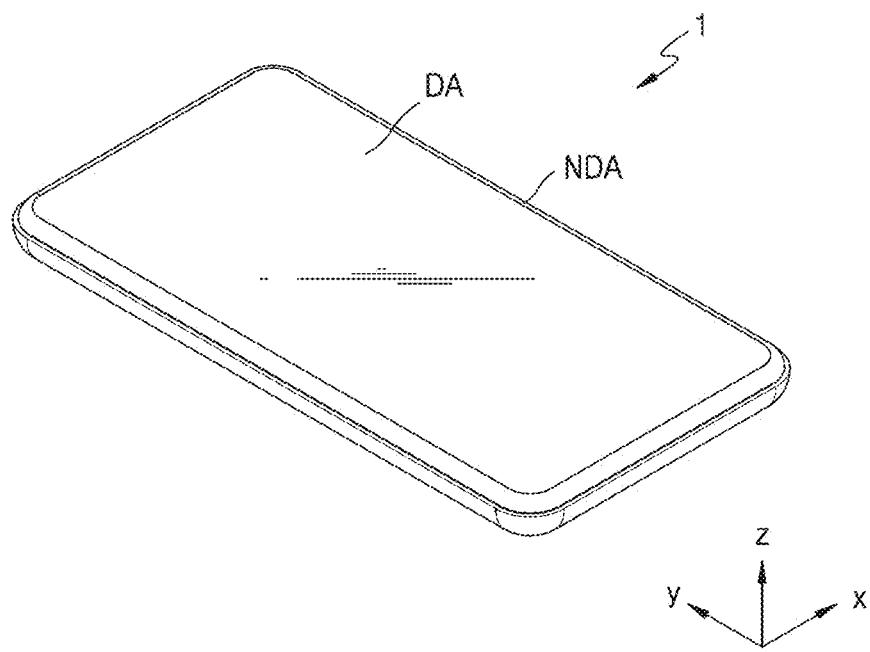
FIG. 4 is a schematic perspective view of electronic device including a light-emitting device according to one or more embodiments.

Description of FIG. 4

FIG. 4 is a schematic perspective view of electronic device 1 including a light-emitting device according to one or more embodiments. The electronic device 1 may be, as a device apparatus that displays a moving image and/or still image, a portable electronic device, such as a mobile phone, a smart phone, a tablet personal computer (PC), a mobile communication terminal, an electronic notebook, an electronic book, a portable multimedia player (PMP), a navigation, and/or an ultra-mobile PC (UMPC), as well as one or more suitable products, such as a television, a laptop, a monitor, a billboards, and/or an Internet of things (IoT). The electronic device 1 may be such a product above or a part thereof. In addition, the electronic device 1 may be a wearable device, such as a smart watch, a watch phone, a glasses-type or kind display, and/or a head mounted display (HMD), and/or a part of the wearable device. However, embodiments are not limited thereto. For example, the electronic device 1 may include a dashboard of a vehicle, a center fascia of a vehicle, a center information display arranged on a dashboard of a vehicle, a room mirror display replacing a side mirror of a vehicle, an entertainment display for the rear seat of a vehicle or a display arranged on the back of the front seat, a head up display (HUD) installed in the front of a vehicle or projected on a front window glass, and/or a computer generated hologram augmented reality head up display (CGH AR HUD). FIG. 4 illustrates a case in which the electronic device 1 is a smart phone for convenience of explanation.

The electronic device 1 may include a display area DA and a non-display area NDA outside the display area DA. A display apparatus may implement an image through an array of a plurality of pixels that are two-dimensionally arranged in the display area DA.

The non-display area NDA is an area that does not display an image, and may be around (e.g., entirely surround) the display area DA. On the non-display area NDA, a driver for providing electrical signals and/or power to display apparatuses arranged on the display area DA may be arranged. On the non-display area NDA, a pad, which is an area to which an electronic element and/or a printing circuit board may be electrically connected, may be arranged.

In the electronic device 1, a length in the x-axis direction and a length in the y-axis direction may be different from each other. In one or more embodiments, as shown in FIG. 4, the length in the x-axis direction may be shorter than the length in the y-axis direction. In one or more embodiments, the length in the x-axis direction may be the same as the length in the y-axis direction. In one or more embodiments, the length in the x-axis direction may be longer than the length in the y-axis direction.

Descriptions of FIGS. 5 and 6A to 6C

Figure 5:
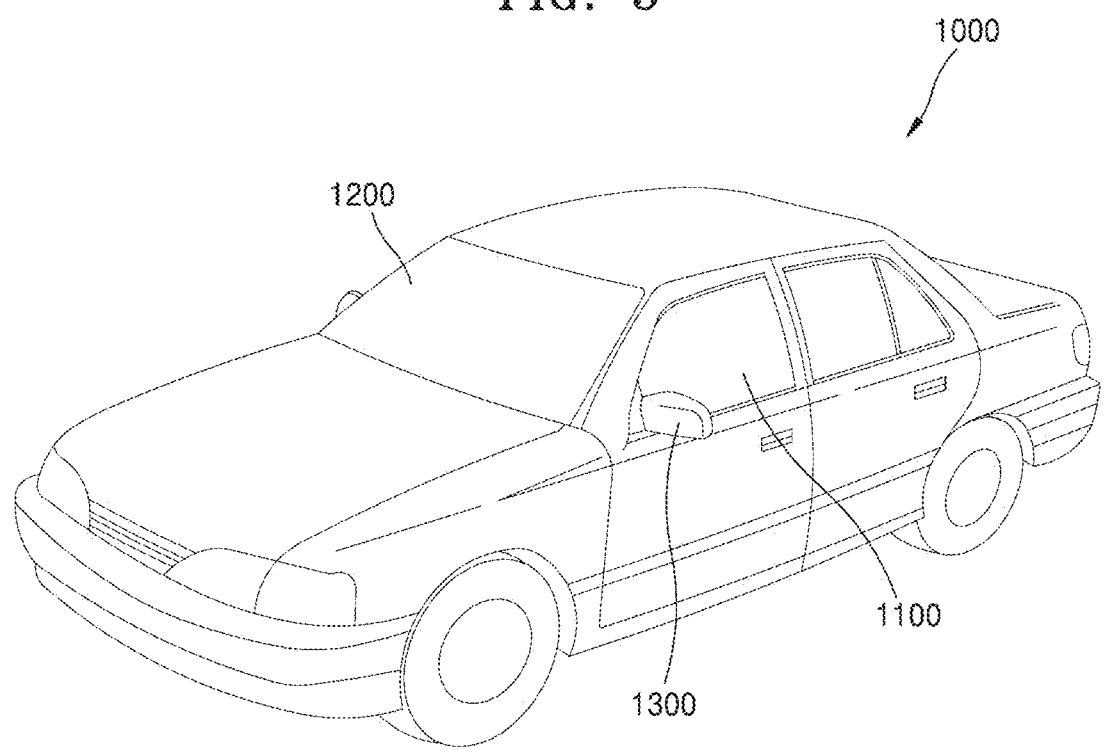
FIG. 5 is a diagram illustrating the exterior of a vehicle as an electronic device including a light-emitting device according to one or more embodiments.
Figure 6A:
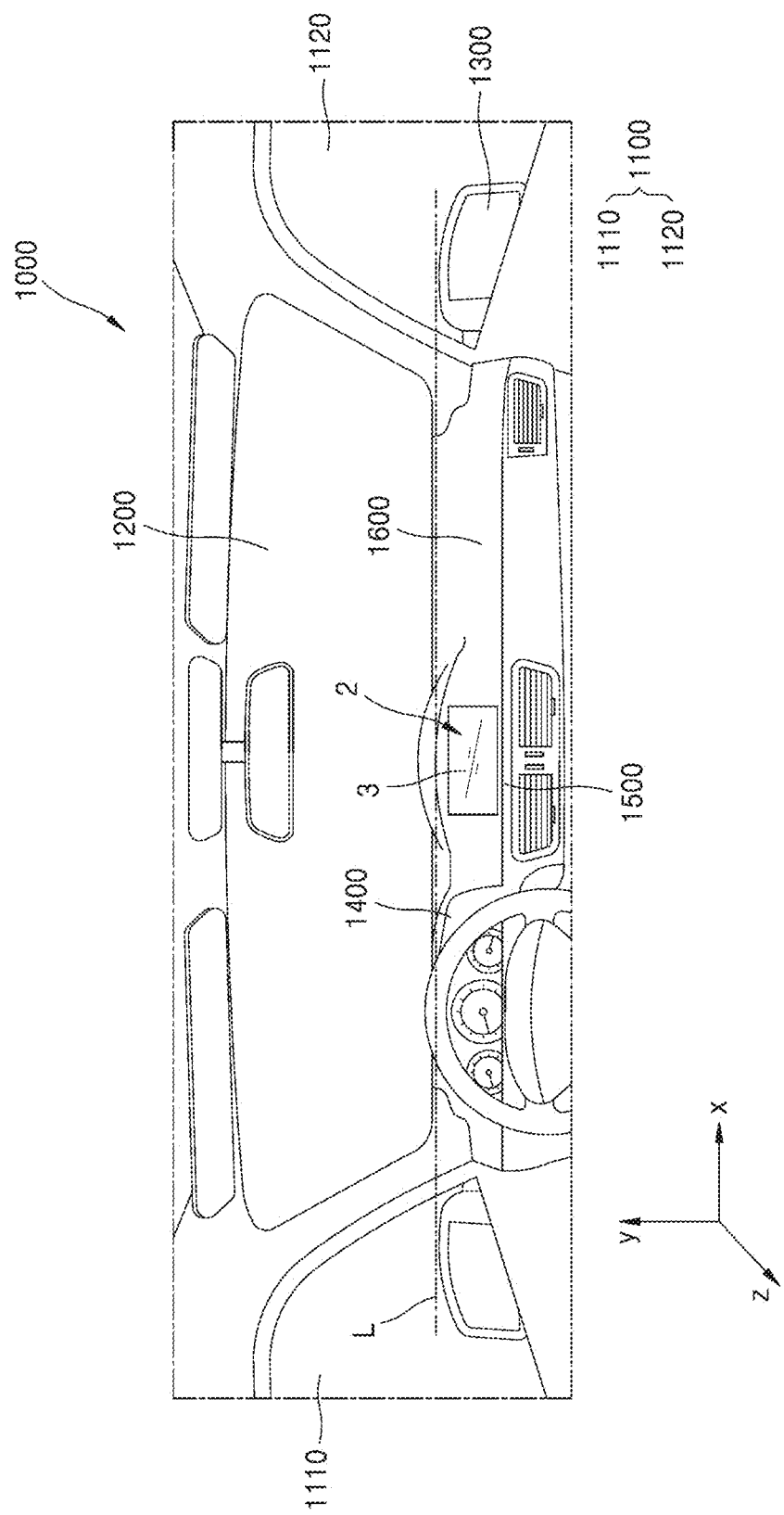
FIGS. 6A to 6C are each a diagram schematically illustrating the interior of a vehicle according to one or more embodiments.
Figure 6B:
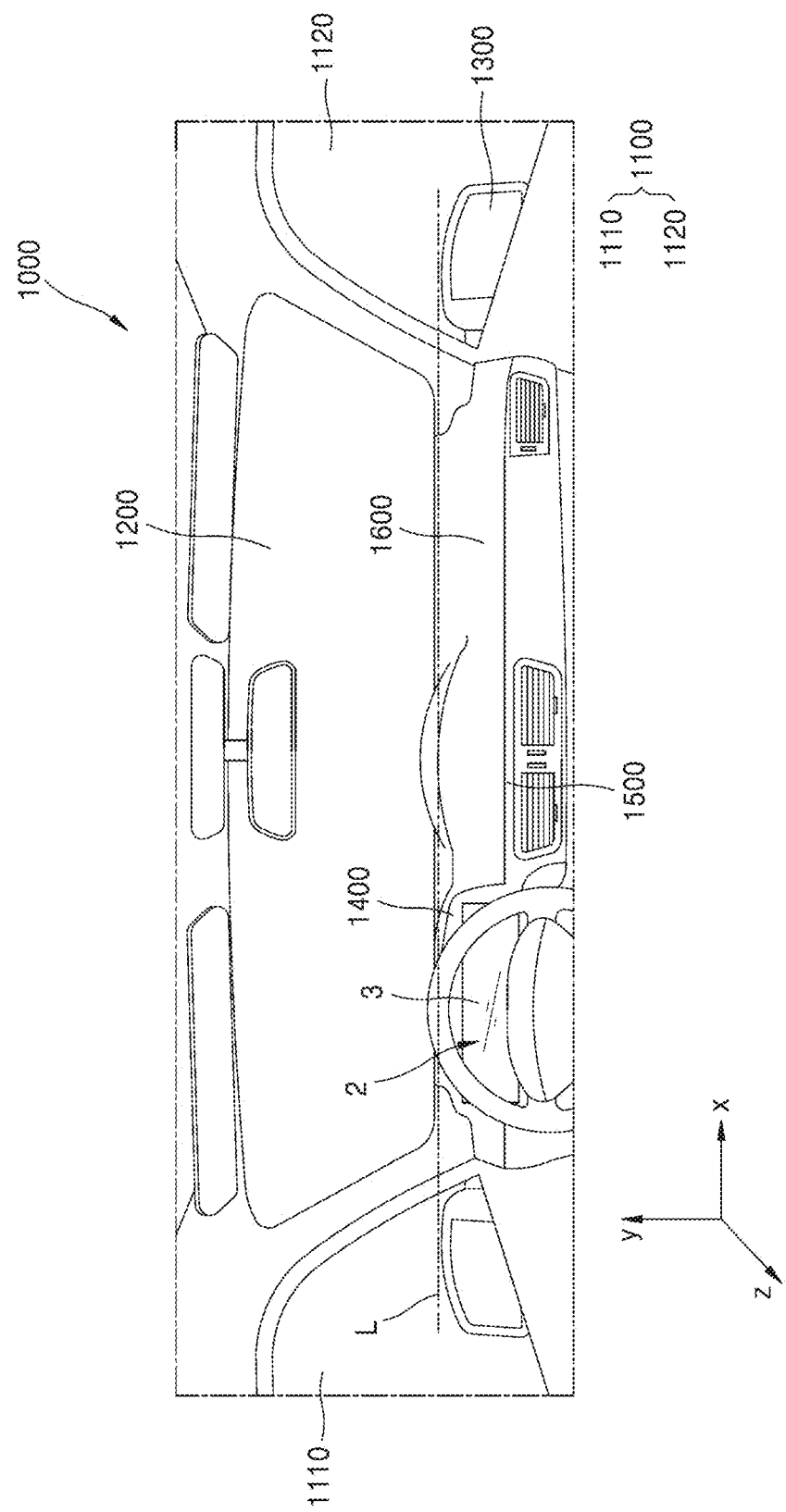
Figure 6C:
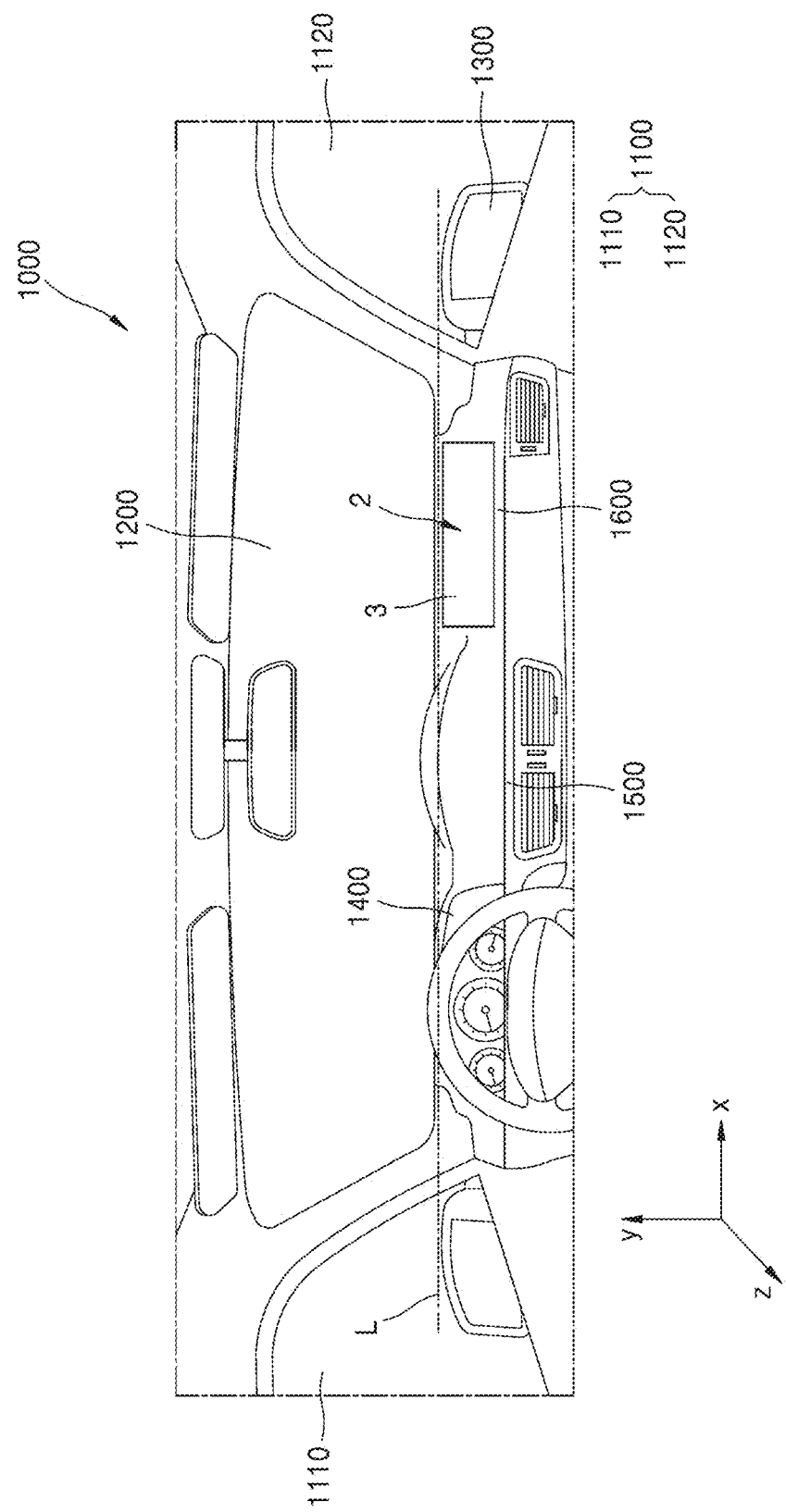

FIG. 5 is a schematic view of the exterior of a vehicle 1000 as an electronic apparatus including a light-emitting device according to one or more embodiments. FIGS. 6A to 6C are each a schematic view of the interior of the vehicle 1000 according to one or more embodiments.

Referring to FIGS. 5, 6A, 6B, and 6C, the vehicle 1000 may refer to one or more suitable apparatuses for moving a subject to be transported, such as a human, an object, and/or an animal, from a departure point to a destination point. The vehicle 1000 may include a vehicle traveling on a road or track, a vessel moving over the sea or river, an airplane flying in the sky using the action of air, and/or the like.

The vehicle 1000 may travel on a road or a track. The vehicle 1000 may move in a set or predetermined direction according to the rotation of at least one wheel. For example, the vehicle 1000 may include a three-wheeled or four-wheeled vehicle, a construction machine, a two-wheeled vehicle, a prime mover device, a bicycle, and/or a train running on a track.

The vehicle 1000 may include a body having an interior and an exterior, and a chassis in which mechanical apparatuses necessary for driving are installed as other parts except for the body. The exterior of the body may include a front panel, a bonnet, a roof panel, a rear panel, a trunk, a pillar provided at a boundary between doors, and/or the like. The chassis of the vehicle 1000 may include a power generating device, a power transmitting device, a driving device, a steering device, a braking device, a suspension device, a transmission device, a fuel device, front and rear wheels including left and right wheels, and/or the like.

The vehicle 1000 may include a side window glass 1100, a front window glass 1200, a side mirror 1300, a cluster 1400, a center fascia 1500, a passenger seat dashboard 1600, and a display apparatus 2.

The side window glass 1100 and the front window glass 1200 may be partitioned by a pillar arranged between the side window glass 1100 and the front window glass 1200.

The side window glass 1100 may be installed on the side of the vehicle 1000. In one or more embodiments, the side window glass 1100 may be installed on a door of the vehicle 1000. A plurality of side window glasses 1100 may be provided and may face each other. In one or more embodiments, the side window glass 1100 may include a first side window glass 1110 and a second side window glass 1120. In one or more embodiments, the first side window glass 1110 may be arranged adjacent to the cluster 1400. The second side window glass 1120 may be arranged adjacent to the passenger seat dashboard 1600.

In one or more embodiments, the side window glasses 1100 may be spaced and/or apart (e.g., spaced apart or separated) from each other in the x-direction or the −x-direction. For example, the first side window glass 1110 and the second side window glass 1120 may be spaced and/or apart (e.g., spaced apart or separated) from each other in the x direction or the −x direction. For example, an imaginary straight line L connecting the side window glasses 1100 may extend in the x-direction or the −x-direction. For example, an imaginary straight line L connecting the first side window glass 1110 and the second side window glass 1120 to each other may extend in the x direction or the −x direction.

The front window glass 1200 may be installed in the front of the vehicle 1000. The front window glass 1200 may be arranged between the side window glasses 1100 opposite to (e.g., facing) each other.

The side mirror 1300 may provide a rear view of the vehicle 1000. The side mirror 1300 may be installed on the exterior of the vehicle body. In one or more embodiments, a plurality of side mirrors 1300 may be provided. Any one of the plurality of side mirrors 1300 may be arranged outside the first side window glass 1110. The other one of the plurality of side mirrors 1300 may be arranged outside the second side window glass 1120.

The cluster 1400 may be arranged in front of the steering wheel. The cluster 1400 may include a tachometer, a speedometer, a coolant thermometer, a fuel gauge turn indicator, a high beam indicator, a warning lamp, a seat belt warning lamp, an odometer, a tachograph, an automatic shift selector indicator lamp, a door open warning lamp, an engine oil warning lamp, and/or a low fuel warning light.

The center fascia 1500 may include a control panel on which a plurality of buttons for adjusting an audio device, an air conditioning device, and a heater of a seat are arranged. The center fascia 1500 may be arranged on one side of the cluster 1400.

A passenger seat dashboard 1600 may be spaced and/or apart (e.g., spaced apart or separated) from the cluster 1400 with the center fascia 1500 arranged therebetween. In one or more embodiments, the cluster 1400 may be arranged to correspond to a driver seat, and the passenger seat dashboard 1600 may be arranged to correspond to a passenger seat. In one or more embodiments, the cluster 1400 may be adjacent to the first side window glass 1110, and the passenger seat dashboard 1600 may be adjacent to the second side window glass 1120.

In one or more embodiments, the display apparatus 2 may include a display panel 3, and the display panel 3 may display an image. The display apparatus 2 may be arranged inside the vehicle 1000. In one or more embodiments, the display apparatus 2 may be arranged between the side window glasses 1100 opposite to (e.g., facing) each other. The display apparatus 2 may be arranged on at least one of the cluster 1400, the center fascia 1500, or the passenger seat dashboard 1600.

The display apparatus 2 may include an organic light-emitting display apparatus, an inorganic EL display apparatus, a quantum dot display apparatus, and/or the like. Hereinafter, as the display apparatus 2 according to one or more embodiments of the disclosure, an organic light-emitting display apparatus display including the light-emitting device according to the disclosure will be described as an example, but one or more suitable types (kinds) of display apparatuses as described above may be used in embodiments of the disclosure.

Referring to FIG. 6A, the display apparatus 2 may be arranged on the center fascia 1500. In one or more embodiments, the display apparatus 2 may display navigation information. In one or more embodiments, the display apparatus 2 may display audio, video, or information regarding vehicle settings.

Referring to FIG. 6B, the display apparatus 2 may be arranged on the cluster 1400. When the display apparatus 2 is arranged on the cluster 1400, the cluster 1400 may display driving information and/or the like through the display apparatus 2. For example, the cluster 1400 may be implemented digitally. The digital cluster 1400 may display vehicle information and driving information as images. For example, a needle and a gauge of a tachometer and one or more suitable warning light icons may be displayed by a digital signal.

Referring to FIG. 6C, the display apparatus 2 may be arranged on the dashboard 1600 facing the passenger seat. The display apparatus 2 may be embedded in the passenger seat dashboard 1600 or arranged on the passenger seat dashboard 1600. In one or more embodiments, the display apparatus 2 arranged on the passenger seat dashboard 1600 seat may display an image related to information displayed on the cluster 1400 and/or information displayed on the center fascia 1500. In one or more embodiments, the display apparatus 2 arranged on the dashboard 1600 facing the passenger seat may display information different from information displayed on the cluster 1400 and/or information displayed on the center fascia 1500.

Manufacturing Method

The layers constituting the hole transport region, the emission layer, and the layers constituting the electron transport region may be formed in a certain region by using one or more suitable methods such as vacuum deposition, spin coating, casting, Langmuir-Blodgett (LB) deposition, ink-jet printing, laser-printing, laser-induced thermal imaging, and/or the like.

When the layers constituting the hole transport region, the emission layer, and the layers constituting the electron transport region are formed by vacuum deposition, the deposition may be performed at a deposition temperature in a range of about 100° C. to about 500° C., at a vacuum degree in a range of about $10^{-8}$ torr to about $10^{-3}$ torr, and at a deposition speed in a range of about 0.01 Å/see to about 100 Å/see, depending on a material to be included in a layer to be formed and the structure of a layer to be formed.

Definition of Terms

The term "$C_3$-$C_{60}$ carbocyclic group" as used herein refers to a cyclic group consisting only carbon atoms as ring-forming atoms and having three to sixty carbon atoms, and the term "$C_1$-$C_{60}$ heterocyclic group" as used herein refers to a cyclic group that has, in addition to one to sixty carbon atoms, a heteroatom as a ring-forming atom. The $C_3$-$C_{60}$ carbocyclic group and the $C_1$-$C_{60}$ heterocyclic group may each be a monocyclic group consisting of one ring or a polycyclic group in which two or more rings are condensed with each other. For example, the number of ring-forming atoms of the $C_1$-$C_{60}$ heterocyclic group may be from 3 to 61.

The term "cyclic group" as used herein may include both the $C_3$-$C_{60}$ carbocyclic group and the $C_1$-$C_{60}$ heterocyclic group.

The term "π electron-rich $C_5$-$C_{60}$ cyclic group" as used herein refers to a cyclic group that has three to sixty carbon atoms and does not include *—N=*' as a ring-forming moiety, and the term "π electron-deficient nitrogen-containing $C_1$-$C_{60}$ cyclic group" as used herein refers to a heterocyclic group that has one to sixty carbon atoms and includes *—N=*' as a ring-forming moiety.

For example, the $C_8$-$C_{60}$ carbocyclic group may be i) Group $T_1$ or ii) a condensed cyclic group in which two or more of Group $T_1$ are condensed with each other (for example, the $C_3$-$C_{60}$ carbocyclic group may be a cyclopentadiene group, an adamantane group, a norbornane group, a benzene group, a pentalene group, a naphthalene group, an azulene group, an indacene group, an acenaphthylene group, a phenalene group, a phenanthrene group, an anthracene group, a fluoranthene group, a triphenylene group, a pyrene group, a chrysene group, a perylene group, a pentaphene group, a heptalene group, a naphthacene group, a picene group, a hexacene group, a pentacene group, a rubicene group, a coronene group, an ovalene group, an indene group, a fluorene group, a spiro-bifluorene group, a benzofluorene group, an indenophenanthrene group, or an indenoanthracene group), the $C_1$-$C_{60}$ heterocyclic group may be i) Group $T_2$, ii) a condensed cyclic group in which two or more Groups $T_2$ are condensed with each other, or iii) a condensed cyclic group in which at least one Group $T_2$ and at least one Group $T_1$ are condensed with each other (for example, the $C_1$-$C_{60}$ heterocyclic group may be a pyrrole group, a thiophene group, a furan group, an indole group, a benzoindole group, a naphthoindole group, an isoindole group, a benzoisoindole group, a naphthoisoindole group, a benzosilole group, a benzothiophene group, a benzofuran group, a carbazole group, a dibenzosilole group, a dibenzothiophene group, a dibenzofuran group, an indenocarbazole group, an indolocarbazole group, a benzofurocarbazole group, a benzothienocarbazole group, a benzosilolocarbazole group, a benzoindolocarbazole group, a benzocarbazole group, a benzonaphthofuran group, a benzonaphthothiophene group, a benzonaphthosilole group, a benzofurodibenzofuran group, a benzofurodibenzothiophene group, a benzothienodibenzothiophene group, a pyrazole group, an imidazole group, a triazole group, an oxazole group, an isoxazole group, an oxadiazole group, a thiazole group, an isothiazole group, a thiadiazole group, a benzopyrazole group, a benzimidazole group, a benzoxazole group, a benzoisoxazole group, a benzothiazole group, a benzoisothiazole group, a pyridine group, a pyrimidine group, a pyrazine group, a pyridazine group, a triazine group, a quinoline group, an isoquinoline group, a benzoquinoline group, a benzoisoquinoline group, a quinoxaline group, a benzoquinoxaline group, a quinazoline group, a benzoquinazoline group, a phenanthroline group, a cinnoline group, a phthalazine group, a naphthyridine group, an imidazopyridine group, an imidazopyrimidine group, an imidazotriazine group, an imidazopyrazine group, an imidazopyridazine group, an azacarbazole group, an azafluorene group, an azadibenzosilole group, an azadibenzothiophene group, an azadibenzofuran group, and/or the like), the π electron-rich $C_3$-$C_{60}$ cyclic group may be i) Group $T_1$, ii) a condensed cyclic group in which two or more of Groups $T_1$ are condensed with each other, iii) Group $T_3$, iv) a condensed cyclic group in which two or more of Groups $T_3$ are condensed with each other, or v) a condensed cyclic group in which at least one Group $T_3$ and at least one Group $T_1$ are condensed with each other (for example, the π electron-rich $C_3$-$C_{60}$ cyclic group may be $C_3$-$C_{60}$ carbocyclic group, a 1H-pyrrole group, a silole group, a borole group, a 2H-pyrrole group, a 3H-pyrrole group, a thiophene group, a furan group, an indole group, a benzoindole group, a naphthoindole group, an isoindole group, a benzoisoindole group, a naphthoisoindole group, a benzosilole group, a benzothiophene group, a benzofuran group, a carbazole group, a dibenzosilole group, a dibenzothiophene group, a dibenzofuran group, an indenocarbazole group, an indolocarbazole group, a benzofurocarbazole group, a benzothienocarbazole group, a benzosilolocarbazole group, a benzoindolocarbazole group, a benzocarbazole group, a benzonaphthofuran group, a benzonaphthothiophene group, a benzonaphthosilole group, a benzofurodibenzofuran group, a benzofurodibenzothiophene group, a benzothienodibenzothiophene group, and/or the like), the π electron-deficient nitrogen-containing $C_1$-$C_{60}$ cyclic group may be i) Group $T_4$, ii) a condensed cyclic group in which two or more of Groups $T_4$ are condensed with each other, iii) a condensed cyclic group in which at least one Group $T_4$ and at least one Group $T_1$ are condensed with each other, iv) a condensed cyclic group in which at least one Group $T_4$ and at least one Group $T_3$ are condensed with each other, or v) a condensed cyclic group in which at least one Group $T_4$, at least one Group $T_1$, and at least one Group $T_3$ are condensed with one another (for example, the π electron-deficient nitrogen-containing $C_1$-$C_{60}$ cyclic group may be a pyrazole group, an imidazole group, a triazole group, an oxazole group, an isoxazole group, an oxadiazole group, a thiazole group, an isothiazole group, a thiadiazole group, a benzopyrazole group, a benzimidazole group, a benzoxazole group, a benzoisoxazole group, a benzothiazole group, a benzoisothiazole group, a pyridine group, a pyrimidine group, a pyrazine group, a pyridazine group, a triazine group, a quinoline group, an isoquinoline group, a benzoquinoline group, a benzoisoquinoline group, a quinoxaline group, a benzoquinoxaline group, a quinazoline group, a benzoquinazoline group, a phenanthroline group, a cinnoline group, a phthalazine group, a naphthyridine group, an imidazopyridine group, an imidazopyrimidine group, an imidazotriazine group, an imidazopyrazine group, an imidazopyridazine group, an azacarbazole group, an azafluorene group, an azadibenzosilole group, an azadibenzothiophene group, an azadibenzofuran group, and/or the like), Group T1 may be a cyclopropane group, a cyclobutane group, a cyclopentane group, a cyclohexane group, a cycloheptane group, a cyclooctane group, a cyclobutene group, a cyclopentene group, a cyclopentadiene group, a cyclohexene group, a cyclohexadiene group, a cycloheptene group, an adamantane group, a norbornane (or a bicyclo[2.2.1]heptane) group, a norbornene group, a bicyclo[1.1.1]pentane group, a bicyclo[2.1.1]hexane group, a bicyclo[2.2.2]octane group, or a benzene group, Group T2 may be a furan group, a thiophene group, a 1H-pyrrole group, a silole group, a borole group, a 2H-pyrrole group, a 3H-pyrrole group, an imidazole group, a pyrazole group, a triazole group, a tetrazole group, an oxazole group, an isoxazole group, an oxadiazole group, a thiazole group, an isothiazole group, a thiadiazole group, an azasilole group, an azaborole group, a pyridine group, a pyrimidine group, a pyrazine group, a pyridazine group, a triazine group, a tetrazine group, a pyrrolidine group, an imidazolidine group, a dihydropyrrole group, a piperidine group, a tetrahydropyridine group, a dihydropyridine group, a hexahydropyrimidine group, a tetrahydropyrimidine group, a dihydropyrimidine group, a piperazine group, a tetrahydropyrazine group, a dihydropyrazine group, a tetrahydropyridazine group, or a dihydropyridazine group, Group T3 may be a furan group, a thiophene group, a 1H-pyrrole group, a silole group, or a borole group, and Group T4 may be a 2H-pyrrole group, a 3H-pyrrole group, an imidazole group, a pyrazole group, a triazole group, a tetrazole group, an oxazole group, an isoxazole group, an oxadiazole group, a thiazole group, an isothiazole group, a thiadiazole group, an azasilole group, an azaborole group, a pyridine group, a pyrimidine group, a pyrazine group, a pyridazine group, a triazine group, or a tetrazine group.

The terms "the cyclic group," "the $C_3$-$C_{60}$ carbocyclic group," "the $C_1$-$C_{60}$ heterocyclic group," "the π electron-rich $C_3$-$C_{60}$ cyclic group," or "the π electron-deficient nitrogen-containing $C_1$-$C_{60}$ cyclic group" as used herein each refer to a group condensed to any cyclic group, a monovalent group, or a polyvalent group (for example, a divalent group, a trivalent group, a tetravalent group, and/or the like.) according to the structure of a formula for which the corresponding term is used. For example, the "benzene group" may be a benzo group, a phenyl group, a phenylene group, and/or the like, which may be easily understood by one of ordinary skill in the art according to the structure of a formula including the "benzene group."

Examples of the monovalent $C_5$-$C_{60}$ carbocyclic group and the monovalent $C_1$-$C_{60}$ heterocyclic group are a $C_5$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_1$-$C_{60}$ heteroaryl group, a monovalent non-aromatic condensed polycyclic group, and a monovalent non-aromatic condensed heteropolycyclic group, and examples of the divalent $C_3$-$C_{60}$ carbocyclic group and the monovalent $C_1$-$C_{60}$ heterocyclic group may include a $C_3$-$C_{10}$ cycloalkylene group, a $C_1$-$C_{10}$ heterocycloalkylene group, a $C_3$-$C_{10}$ cycloalkenylene group, a $C_1$-$C_{10}$ heterocycloalkenylene group, a $C_6$-$C_{60}$ arylene group, a $C_1$-$C_{60}$ heteroarylene group, a divalent non-aromatic condensed polycyclic group, and a substituted or unsubstituted divalent non-aromatic condensed heteropolycyclic group.

The term "$C_1$-$C_{60}$ alkyl group" as used herein refers to a linear or branched aliphatic hydrocarbon monovalent group that has one to sixty carbon atoms, and specific examples thereof are a methyl group, an ethyl group, an n-propyl group, an isopropyl group, an n-butyl group, a sec-butyl group, an isobutyl group, a tert-butyl group, an n-pentyl group, a tert-pentyl group, a neopentyl group, an isopentyl group, a sec-pentyl group, a 3-pentyl group, a sec-isopentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, and a tert-decyl group. The term "$C_1$-$C_{60}$ alkylene group" as used herein refers to a divalent group having substantially the same structure as the $C_1$-$C_{60}$ alkyl group.

The term "$C_2$-$C_{60}$ alkenyl group" as used herein refers to a monovalent hydrocarbon group having at least one carbon-carbon double bond in the middle and/or at a terminal end (e.g., the terminus) of the $C_2$-$C_{60}$ alkyl group, and examples thereof are an ethenyl group, a propenyl group, a butenyl group, and/or the like. The term "$C_2$-$C_{60}$ alkenylene group" as used herein refers to a divalent group having the same structure as the $C_2$-$C_{60}$ alkenyl group.

The term "$C_2$-$C_{60}$ alkynyl group" as used herein refers to a monovalent hydrocarbon group having at least one carbon-carbon triple bond in the middle and/or at a terminal end (e.g., the terminus) of the $C_2$-$C_{60}$ alkyl group, and examples thereof are an ethynyl group, a propynyl group, and/or the like. The term "$C_2$-$C_{60}$ alkynylene group" as used herein refers to a divalent group having substantially the same structure as the $C_2$-$C_{60}$ alkynyl group.

The term "$C_1$-$C_{60}$ alkoxy group" as used herein refers to a monovalent group represented by —$OA_{101}$ (wherein $A_{101}$ is the $C_1$-$C_{60}$ alkyl group), and examples thereof are a methoxy group, an ethoxy group, an isopropyloxy group, and/or the like.

The term "$C_3$-$C_{10}$ cycloalkyl group" as used herein refers to a monovalent saturated hydrocarbon cyclic group having 3 to 10 carbon atoms, and examples thereof are a cyclopropyl group, a cyclobutyl group, a cyclopentyl group, a cyclohexyl group, a cycloheptyl group, a cyclooctyl group, an adamantanyl group, a norbornanyl group (or bicyclo[2.2.1]heptyl group), a bicyclo[1.1.1]pentyl group, a bicyclo[2.1.1]hexyl group, a bicyclo[2.2.2]octyl group, and/or the like. The term "$C_3$-$C_{10}$ cycloalkylene group" as used herein refers to a divalent group having substantially the same structure as the $C_3$-$C_{10}$ cycloalkyl group.

The term "$C_1$-$C_{10}$ heterocycloalkyl group" as used herein refers to a monovalent cyclic group that has, in addition to 1 to 10 carbon atoms, at least one heteroatom, as ring-forming atoms, and examples thereof are a 1,2,3,4-oxatriazolidinyl group, a tetrahydrofuranyl group, a tetrahydrothiophenyl group, and/or the like. The term "$C_1$-$C_{10}$ heterocycloalkylene group" as used herein refers to a divalent group having substantially the same structure as the $C_1$-$C_{10}$ heterocycloalkyl group.

The term "$C_3$-$C_{10}$ cycloalkenyl group" as used herein refers to a monovalent cyclic group that has three to ten carbon atoms and at least one carbon-carbon double bond in the ring thereof and no aromaticity, and examples thereof are a cyclopentenyl group, a cyclohexenyl group, a cycloheptenyl group, and/or the like. The term "$C_3$-$C_{10}$ cycloalkenylene group" as used herein refers to a divalent group having substantially the same structure as the $C_3$-$C_{10}$ cycloalkenyl group.

The term "$C_1$-$C_{10}$ heterocycloalkenyl group" as used herein refers to a monovalent cyclic group that has, in addition to 1 to 10 carbon atoms, at least one heteroatom, as ring-forming atoms, and having at least one carbon-carbon double bond in the cyclic structure thereof. Examples of the $C_1$-$C_{10}$ heterocycloalkenyl group are a 4,5-dihydro-1,2,3,4-oxatriazolyl group, a 2,3-dihydrofuranyl group, a 2,3-dihydrothiophenyl group, and/or the like. The term "$C_1$-$C_{10}$ heterocycloalkenylene group" as used herein refers to a divalent group having substantially the same structure as the $C_1$-$C_{10}$ heterocycloalkenyl group.

The term "$C_6$-$C_{60}$ aryl group" as used herein refers to a monovalent group having a carbocyclic aromatic system of 6 to 60 carbon atoms, and the term "$C_6$-$C_{60}$ arylene group" as used herein refers to a divalent group having a carbocyclic aromatic system of 6 to 60 carbon atoms. Examples of the $C_6$-$C_{60}$ aryl group are a phenyl group, a pentalenyl group, a naphthyl group, an azulenyl group, an indacenyl group, an acenaphthyl group, a phenalenyl group, a phenanthrenyl group, an anthracenyl group, a fluoranthenyl group, a triphenylenyl group, a pyrenyl group, a chrysenyl group, a perylenyl group, a pentaphenyl group, a heptalenyl group, a naphthacenyl group, a picenyl group, a hexacenyl group, a pentacenyl group, a rubicenyl group, a coronenyl group, an ovalenyl group, and/or the like. When the $C_6$-$C_{60}$ aryl group and the $C_6$-$C_{60}$ arylene group each include two or more rings, the rings may be condensed with each other.

The term "$C_1$-$C_{60}$ heteroaryl group" as used herein refers to a monovalent group having a heterocyclic aromatic system that has, in addition to 1 to 60 carbon atoms, at least one heteroatom, as ring-forming atoms. The term "$C_1$-$C_{60}$ heteroarylene group" as used herein refers to a divalent group having a heterocyclic aromatic system that has, in addition to 1 to 60 carbon atoms, at least one heteroatom, as ring-forming atoms. Examples of the $C_1$-$C_{60}$ heteroaryl group are a pyridinyl group, a pyrimidinyl group, a pyrazinyl group, a pyridazinyl group, a triazinyl group, a quinolinyl group, a benzoquinolinyl group, an isoquinolinyl group, a benzoisoquinolinyl group, a quinoxalinyl group, a benzoquinoxalinyl group, a quinazolinyl group, a benzoquinazolinyl group, a cinnolinyl group, a phenanthrolinyl group, a phthalazinyl group, a carbazolyl group, a dibenzofuranyl group, a dibenzothiofuranyl group, and a naphthyridinyl group. When the $C_1$-$C_{60}$ heteroaryl group and the $C_1$-$C_{60}$ heteroarylene group each include two or more rings, the two or more rings may be condensed with each other.

The term "monovalent non-aromatic condensed polycyclic group" as used herein refers to a monovalent group (for example, having 8 to 60 carbon atoms) having two or more rings condensed to each other, only carbon atoms as ring-forming atoms, and no aromaticity in its entire molecular structure (e.g., is not aromatic when considered as a whole). Examples of the monovalent non-aromatic condensed polycyclic group are an indenyl group, a fluorenyl group, a spiro-bifluorenyl group, a benzofluorenyl group, an indenophenanthrenyl group, an indeno anthracenyl group, an adamantyl group, and/or the like. The term "divalent non-aromatic condensed polycyclic group" as used herein refers to a polyvalent (e.g., divalent) group having substantially the same structure as the monovalent non-aromatic condensed polycyclic group described above.

The term "monovalent non-aromatic condensed heteropolycyclic group" as used herein refers to a monovalent group that has two or more rings condensed to each other, in addition to 1 to 60 carbon atoms, at least one heteroatom, as ring-forming atoms, and having non-aromaticity in its entire molecular structure (e.g., is not aromatic when considered as a whole). Examples of the monovalent non-aromatic condensed heteropolycyclic group include a pyrrolyl group, a thiophenyl group, a furanyl group, an indolyl group, a benzoindolyl group, a naphtho indolyl group, an isoindolyl group, a benzoisoindolyl group, a naphthoisoindolyl group, a benzosilolyl group, a benzothiophenyl group, a benzofuranyl group, a carbazolyl group, a dibenzosilolyl group, a dibenzothiophenyl group, a dibenzofuranyl group, an azacarbazolyl group, an azafluorenyl group, an azadibenzosilolyl group, an azadibenzothiophenyl group, an azadibenzofuranyl group, a pyrazolyl group, an imidazolyl group, a triazolyl group, a tetrazolyl group, an oxazolyl group, an isoxazolyl group, a thiazolyl group, an isothiazolyl group, an oxadiazolyl group, a thiadiazolyl group, a benzopyrazolyl group, a benzimidazolyl group, a benzoxazolyl group, a benzothiazolyl group, a benzoxadiazolyl group, a benzothiadiazolyl group, an imidazopyridinyl group, an imidazopyrimidinyl group, an imidazotriazinyl group, an imidazopyrazinyl group, an imidazopyridazinyl group, an indenocarbazolyl group, an indolocarbazolyl group, a benzofurocarbazolyl group, a benzothienocarbazolyl group, a benzosilolocarbazolyl group, a benzoindolocarbazolyl group, a benzocarbazolyl group, a benzonaphthofuranyl group, a benzonaphthothiophenyl group, a benzonaphthosilolyl group, a benzofurodibenzofuranyl group, a benzofurodibenzothiophenyl group, an azaadamantyl group, and a benzothienodibenzothiophenyl group. The term "polyvalent (e.g., divalent) non-aromatic condensed heteropolycyclic group" as used herein refers to a polyvalent (e.g., divalent) group having substantially the same structure as the monovalent non-aromatic condensed heteropolycyclic group described above.

The term "$C_6$-$C_{60}$ aryloxy group" as used herein refers to a monovalent group represented by —$OA_{102}$ (wherein $A_{102}$ is the $C_6$-$C_{60}$ aryl group), and the term "$C_6$-$C_{60}$ arylthio group" as used herein refers to a monovalent group represented by —$SA_{103}$ (wherein $A_{103}$ is the $C_6$-$C_{60}$ aryl group).

The term "$C_7$-$C_{60}$ arylalkyl group" as used herein refers to a monovalent group represented by -$A_{104}A_{105}$ (wherein $A_{104}$ is a $C_1$-$C_{54}$ alkylene group, and $A_{105}$ is a $C_6$-$C_{59}$ aryl group), and the term "$C_2$-$C_{60}$ heteroarylalkyl group" as used herein refers to a monovalent group represented by -$A_{106}A_{107}$ (wherein $A_{106}$ is a $C_1$-$C_{59}$ alkylene group, and $A_{107}$ is a $C_1$-$C_{59}$ heteroaryl group).

The term "$R_{10a}$" as used herein may be:

deuterium, —F, —Cl, —Br, —I, a hydroxyl group, a cyano group, or a nitro group;

a $C_1$-$C_{60}$ alkyl group, a $C_2$-$C_{60}$ alkenyl group, a $C_2$-$C_{60}$ alkynyl group, or a $C_1$-$C_{60}$ alkoxy group, each unsubstituted or substituted with deuterium, —F, —Cl, —Br, —I, a hydroxyl group, a cyano group, a nitro group, a $C_5$-$C_{60}$ carbocyclic group, a $C_1$-$C_{60}$ heterocyclic group, a $C_6$-$C_{60}$ aryloxy group, a $C_6$-$C_{60}$ arylthio group, a $C_7$-$C_{60}$ arylalkyl group, a $C_2$-$C_{60}$ heteroarylalkyl group, —Si($Q_{11}$)($Q_{12}$)($Q_{13}$), —N($Q_{11}$)($Q_{12}$), —B($Q_{11}$)($Q_{12}$), —C(=O)($Q_{11}$), —S(=O)$_2$($Q_{11}$), —P(=O)($Q_{11}$)($Q_{12}$), and/or a (e.g., any suitable) combination thereof;

a $C_3$-$C_{60}$ carbocyclic group, a $C_1$-$C_{60}$ heterocyclic group, a $C_6$-$C_{60}$ aryloxy group, a $C_6$-$C_{60}$ arylthio group, a $C_7$-$C_{60}$ aryl alkyl group, or a $C_2$-$C_{60}$ heteroaryl alkyl group, each unsubstituted or substituted with deuterium, —F, —Cl, —Br, —I, a hydroxyl group, a cyano group, a nitro group, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{60}$ carbocyclic group, a $C_1$-$C_{60}$ heterocyclic group, a $C_6$-$C_{60}$ aryloxy group, a $C_6$-$C_{60}$ arylthio group, a $C_7$-$C_{60}$ aryl alkyl group, a $C_2$-$C_{60}$ heteroaryl alkyl group, —Si($Q_{21}$)($Q_{22}$)($Q_{23}$), —N($Q_{21}$)($Q_{22}$), —B($Q_{21}$)($Q_{22}$), —C(=O)($Q_{21}$), —S(=O)$_2$($Q_{21}$), —P(=O)($Q_{21}$)($Q_{22}$), and/or a (e.g., any suitable) combination thereof; or —Si($Q_{31}$)($Q_{32}$)($Q_{33}$), —N($Q_{31}$)($Q_{32}$), —B($Q_{31}$)($Q_{32}$), —C(=O)($Q_{31}$), —S(=O)$_2$($Q_{31}$), or —P(=O)($Q_{31}$)($Q_{32}$).

$Q_1$ to $Q_3$, $Q_{11}$ to $Q_{13}$, $Q_{21}$ to $Q_{23}$, and $Q_{31}$ to $Q_{33}$ as used herein may each independently be: hydrogen; deuterium; —F; —Cl; —Br; —I; a hydroxyl group; a cyano group; a nitro group; a $C_1$-$C_{60}$ alkyl group; a $C_2$-$C_{60}$ alkenyl group; a $C_2$-$C_{60}$ alkynyl group; a $C_1$-$C_{60}$ alkoxy group; a $C_8$-$C_{60}$ carbocyclic group or a $C_1$-$C_{60}$ heterocyclic group, each unsubstituted or substituted with deuterium, —F, a cyano group, a $C_1$-$C_{60}$ alkyl group, a $C_1$-$C_{60}$ alkoxy group, a phenyl group, a biphenyl group, and/or a (e.g., any suitable) combination thereof; a $C_7$-$C_{60}$ arylalkyl group; or a $C_2$-$C_{60}$ heteroarylalkyl group.

The term "heteroatom" as used herein refers to any atom other than a carbon atom. Examples of the heteroatom are O, S, N, P, Si, B, Ge, Se, and/or a (e.g., any suitable) combination thereof.

The term "third-row transition metal" as used herein includes hafnium (Hf), tantalum (Ta), tungsten (W), rhenium (Re), osmium (Os), iridium (Ir), platinum (Pt), gold (Au), and/or the like.

In the specification, "Ph" refers to a phenyl group, "Me" refers to a methyl group, "Et" refers to an ethyl group, "tert-Bu" or "Bu$^t$" refers to a tert-butyl group, and "OMe" refers to a methoxy group.

The term "biphenyl group" as used herein refers to "a phenyl group substituted with a phenyl group." For example, the "biphenyl group" may be a substituted phenyl group having a $C_6$-$C_{60}$ aryl group as a substituent.

The term "terphenyl group" as used herein refers to "a phenyl group substituted with a biphenyl group." For example, the "terphenyl group" may be a substituted phenyl group having, as a substituent, a $C_6$-$C_{60}$ aryl group substituted with a $C_6$-$C_{60}$ aryl group.

* and *' as used herein, unless defined otherwise, each refer to a binding site to a neighboring atom in a corresponding formula or moiety.

In the specification, the x-axis, y-axis, and z-axis are not limited to three axes in an orthogonal coordinate system, and may be interpreted in a broad sense including these axes. For example, the x-axis, y-axis, and z-axis may refer to those orthogonal to each other, or may refer to those in different directions that are not orthogonal to each other.

Hereinafter, compounds according to one or more embodiments and light-emitting devices according to one or more embodiments will be described in more detail with reference to the following synthesis examples and examples. The wording "B was used instead of A" used in describing Synthesis Examples refers to that a substantially identical molar equivalent of B was used in place of A.

EXAMPLES

Comparative Synthesis Example 1 (Synthesis of Comparative Quantum Dot 1)

Core Synthesis 4 mmol indium acetate and 12 mmol palmitic acid (PA) were loaded into a 250 mL three-neck flask together with 100 mL of octadecene, the resultant mixture was heated at a temperature of 120° C. for 1 hour in a vacuum atmosphere, and then, the atmosphere was switched to an argon atmosphere, thereby preparing an In(PA)$_3$ solution. After the temperature of the In(PA)$_3$ solution was raised to 280° C., the resultant solution was maintained for 1 hour, 10 mL of 0.2 M tris(trimethylsilyl)phosphine/trioctylphosphine was rapidly loaded thereto using a syringe, and then, crystals were grown at a temperature of 260° C. for 30 minutes. Afterwards, 52 mL of a 0.2 M In(PA)$_3$ solution and 26 mL of 0.2 M tris(trimethylsilyl)phosphine/trioctylphosphine were loaded thereto at rates of 1.5 mL/min and 0.75 mL/min, respectively, for 35 minutes. Afterwards, after 10 minutes of stabilization time, the temperature of the reactor was lowered to room temperature by removing the heat source, thereby synthesizing an InP core.

Shell Formation

The synthesized InP core underwent a purification process in which 40 mL of acetone and 10 mL of ethanol were mixed per 10 mL of an InP core solution, the reaction solution was centrifuged at 9,000 rpm, the supernatant was removed therefrom, and then, the precipitate was dispersed in toluene. For shell formation, the synthesized InP core was subjected to surface-treatment. 1.6 mmol zinc acetate, 3.2 mmol oleic acid (OA), and 80 mL of trioctylamine were mixed together, and then, the reaction solution was mixed in a vacuum atmosphere at a temperature of 120° C. for 1 hour. After the atmosphere was switched to an argon atmosphere, the reaction solution was maintained at a temperature of 280° C. for 1 hour, the temperature was lowered to 180° C., and then, 12 mL of the InP core solution dispersed in toluene was rapidly loaded thereto using a syringe. After 5 minutes, 0.2 mL of a HF solution (10 wt % in acetone) was loaded thereto, and then, the reaction solution was maintained for 10 minutes, thereby preparing a surface-treated InP core solution. The temperature of the reactor was raised to 320° C. 15 mmol 0.4 M Zn(OA)$_2$ was added thereinto, followed by injection of 4.0 mmol Se/trioctylphosphine, and then, a ZnSe shell was grown for 1 hour. Afterwards, 3.0 mmol of S/trioctylphosphine was loaded thereto, and then, ZnS was grown for 1 hour, followed by purification.

Ligand Formation

Comparative Quantum Dot 1 was synthesized by mixing purified quantum dots and 1-dodecanethiol (2 mmol) and reacting the same at room temperature for 30 minutes.

Comparative Synthesis Example 2 (Synthesis of Comparative Quantum Dot 2)

Comparative Quantum Dot 2 was synthesized in substantially the same manner as Comparative Synthesis Example 1, except that, in forming a ligand, the purified quantum dots were mixed with 1-dodecanethiol (2 mmol) and reacted for 30 min at room temperature.

Comparative Synthesis Example 3 (Synthesis of Comparative Quantum Dot 3)

Comparative Quantum Dot 3 was synthesized in substantially the same manner as Comparative Synthesis Example 1, except that, in forming a ligand, the purified quantum dots were mixed with 2-ethylhexane thiol (2 mmol) and reacted for 30 min at room temperature.

Comparative Synthesis Example 4 (Synthesis of Comparative Quantum Dot 4)

Comparative Quantum Dot 4 was synthesized in substantially the same manner as Comparative Synthesis Example 1, except that, in forming a ligand, the purified quantum dots were mixed with 2-ethylhexane thiol (2 mmol) and reacted for 30 min at room temperature.

Comparative Synthesis Example 5 (Synthesis of Comparative Quantum Dot 5)

Core Synthesis 2 mmol Zn acetate was mixed with 2 mL of oleic acid and 15 mL of trioctylamine in a 100 mL 3-neck flask and then, continuously subjected to a vacuum state at 120° C. for 30 minutes. The flask was evacuated to an $N_2$ atmosphere and the temperature therein was raised to 210° C. Once the temperature reached the corresponding temperature, 0.5 mL of 2 M Se/diphenylphosphine solution and 0.9 mL of 0.047 M Te/trioctylphosphine solution were sequentially loaded thereinto. Then, the resulting mixture was maintained at a constant temperature of 210° C. for 30 minutes and then heated to 300° C. and reacted for one hour to synthesize a ZnSeTe core. The synthesized ZnSeTe core solution was cooled to room temperature and then, ethanol was added to the reaction solution, followed by centrifuging to obtain a ZnSeTe core quantum dot. The ZnSeTe core quantum dot was dispersed in 3 mL of hexane, for use in a shell formation process.

Shell Formation 9 mmol Zn oleate was mixed with 45 mL of trioctylamine in a 500 mL 3-neck flask, and then, continuously subjected to a vacuum state at 120° C. for 30 minutes. The flask was evacuated to an $N_2$ atmosphere and then, 3 mL of the prepared ZnSeTe core quantum dot solution was loaded thereto. Thereafter, the temperature was raised to 300° C. and, for the formation of a ZnSe shell, 12 mL of 0.5 M Zn oleate solution (a mixed solution including Zn acetate, oleic acid, and trioctylamine) and 1.8 mL of 2 M Se/trioctylphosphine solution were added thereto and reacted for 30 minutes. Immediately thereafter, for the formation of the ZnS shell, 9 mL of 0.5 M Zn oleate solution and 3.6 mL of 2 M S/trioctylphosphine solution were added thereto and at the same temperature, reacted for 30 minutes. Once the reaction was completed, the temperature was decreased to room temperature, and then, ethanol was added to the reaction solution and the resultant solution was centrifuged to obtain a ZnSeTe/ZnSe/ZnS quantum dot.

Implementation Synthesis Example 1 (Synthesis of Quantum Dot 1)

Quantum Dot 1 was synthesized in substantially the same manner as in Comparative Synthesis Example 1, except that, in forming a ligand, Mg-acetate (2.5 mmol) and 2-ethylhexanoic acid (2.5 mmol) were reacted at 200° C. for 10 minutes to form a Mg-2-ethylhexanoate (2-ethyl butanoic acid magnesium salt), and Mg-2-ethylhexanoate was mixed with oleylamine (2.5 mmol) in 5 mL of trioctylamine and the resultant mixture was reacted at 200° C. for 30 minutes.

Implementation Synthesis Example 2 (Synthesis of Quantum Dot 2)

Quantum Dot 2 was synthesized in substantially the same manner as in Comparative Synthesis Example 1, except that, in forming a ligand, 2.5 mmol Zn-acetate and 2.5 mmol 2-ethylhexanoic acid were reacted at 200° C. for 10 minutes to form Zn-2-ethylhexanoate, and Zn-2-ethylhexanoate was mixed with 2.5 mmol oleylamine in 5 mL of trioctylamine and the resultant mixture was reacted at 200° C. for 30 minutes.

Implementation Synthesis Example 3 (Synthesis of Quantum Dot 3)

Quantum Dot 3 was synthesized in substantially the same manner as in Comparative Synthesis Example 1, except that, in forming a ligand, Zn-acetate (2.5 mmol) and 2-butyloctanoic acid (2.5 mmol) were reacted at 200° C. for 10 minutes to form Zn-2-butyloctanoate, Zn-2-butyloctanoate was mixed with oleylamine (2.5 mmol) in 5 mL of trioctylamine and then, the resultant mixture was reacted at 200° C. for 30 minutes.

Implementation Synthesis Example 4 (Synthesis of Quantum Dot 4)

Quantum Dot 4 was synthesized in substantially the same manner as in Comparative Synthesis Example 1, except that, in forming a ligand, Zn-acetate (2.5 mmol) and 2-butyloctanoic acid (2.5 mmol) were reacted at 200° C. for 10 minutes to form Zn-2-butyloctanoate, and Zn-2-butyloctanoate was mixed with oleylamine (2.5 mmol) in 5 mL of trioctylamine and then, the resultant mixture was reacted at 200° C. for 30 minutes.

Implementation Synthesis Example 5 (Synthesis of Quantum Dot 5)

Quantum Dot 5 was synthesized in substantially the same manner as in Comparative Synthesis Example 5, except that, in forming a shell, all Zn oleate was replaced with Zn-2-ethylhexanoate.

Implementation Synthesis Example 6 (Synthesis of Quantum Dot 6)

Quantum Dot 6 was synthesized in substantially the same manner as in Comparative Synthesis Example 5, except that, in forming a shell, Zn oleate used in the ZnS shell forming process was replaced with Zn-2-ethylhexanoate.

Composition Example 1

Quantum dots according to Example 1 were mixed in the amount of 3 wt % in a solvent in which an aromatic solvent (cyclohexylbenzene) and an aliphatic solvent (n-hexadecane) were mixed with each other in a weight ratio of 6:4.

Example 1

As an anode, an ITO substrate was cut to a size of 50 mm×50 mm×0.5 mm, sonicated with acetone, isopropyl alcohol, and pure water each for 15 minutes, and then cleaned by exposure to ultraviolet rays and ozone for 30 minutes. Then, the ITO substrate was provided onto a vacuum deposition apparatus.

Poly(3,4-ethylenedioxythiophene)/poly(4-styrenesulfonate (PEDOT/PSS) was subjected to deposition/spin-coating on the ITO substrate to form a hole injection layer having a thickness of 600 Å, and then, poly[(9,9-dioctylfluorenyl-2,7-diyl)-co-(4,4'-(N-(4-sec-butylphenyl)diphenylamine)] (TFB) was subjected to deposition/spin-coating on the hole injection layer to form a hole transport layer having a thickness of 400 Å.

Quantum Dot 1 synthesized in Implementation Synthesis Example 1 was spin-coated on the hole transport layer to form a thin film, and then, a VCD process was performed at $10^{-3}$ Torr, and then, a baking process was performed thereon at a temperature of 100° C. for 10 minutes to form an emission layer. On the emission layer, ZnMgO was spin-coated to form an electron transport layer having a thickness of 280 Å. Al was deposited on the electron transport layer to form a cathode having a thickness of a 1000 Å, thereby completing the manufacture of a light-emitting device.

Examples 2 to 6, Comparative Examples 1 to 5

Light-emitting devices were manufactured using the same method as used in Example 1, except that the quantum dots listed in Table 1 were used instead of Quantum Dot 1.

TABLE 1

| | Quantum dot | Nanoparticles (Core/interlayer shell/outermost shell) | First ligand | Second ligand |
|---|---|---|---|---|
| Example 1 | Quantum Dot 1 (Green) | InP/ZnSe/ZnS | Mg-2-ethylhexanoate | Oleylamine |
| Example 2 | Quantum Dot 2 (Green) | InP/ZnSe/ZnS | Zn-2-ethylhexanoate | Oleylamine |
| Example 3 | Quantum Dot 3 (Green) | InP/ZnSe/ZnS | Zn-2-butyloctanoate | Oleylamine |
| Example 4 | Quantum Dot 4 (Red) | InP/ZnSe/ZnS | Zn-2-butyloctanoate | Oleylamine |
| Example 5 | Quantum Dot 5 (Blue) | ZnSeTe/ZnSe/ZnS | Zn-2-ethylhexanoate | Trioctylphosphine |
| Example 6 | Quantum Dot 6 (Blue) | ZnSeTe/ZnSe/ZnS | Zn-2-ethylhexanoate, Oleic acid | Trioctylphosphine |
| Comparative Example 1 | Comparative Quantum Dot 1 (Green) | InP/ZnSe/ZnS | Oleic acid | 1-dodecanethiol |
| Comparative Example 2 | Comparative Quantum Dot 2 (Red) | InP/ZnSe/ZnS | Oleic acid | 1-dodecanethiol |
| Comparative Example 3 | Comparative Quantum Dot 3 (Green) | InP/ZnSe/ZnS | Oleic acid | 2-ethylhexane thiol |
| Comparative Example 4 | Comparative Quantum Dot 4 (Red) | InP/ZnSe/ZnS | Oleic acid | 2-ethylhexane thiol |
| Comparative Example 5 | Comparative Quantum Dot 5 (Blue) | ZnSeTe/ZnSe/ZnS | Oleic acid | Trioctylphosphine |

Evaluation Example 1

The lifespan, the driving voltage, and the luminance of the light-emitting devices according to Example 1 to 6 and Comparative Example 1 to 5 were measured using a Keithley SMU 236 and a luminance meter PR650. Results thereof are shown in Table 2, 3, and 4 according to the wavelength of quantum dots.

Referring to Tables 2, 3, and 4, it was confirmed that the light-emitting device according to Examples 1 to 6 had high luminescence efficiency and a long lifespan according to the driving voltage and luminance, compared to the light-emitting device according to Comparative Examples 1 to 5. Therefore, it can be confirmed that if (e.g., when) quantum dots including a combination of the first ligand and the second ligand of the present application are used in an emission layer, the driving voltage, initial luminance, and lifespan are excellent or suitable.

TABLE 2

| Classification | CIE_x | CIE_y | Driving voltage | Efficiency (cd/A) | Lifespan (h@T90) |
|---|---|---|---|---|---|
| Example 1 | 0.305 | 0.681 | 3.5 | 95.1 | 2000 h |
| Example 2 | 0.314 | 0.673 | 3.4 | 89.3 | 2500 h |
| Example 3 | 0.319 | 0.668 | 3.4 | 88.1 | 2300 h |
| Comparative Example 1 | 0.305 | 0.681 | 4.5 | 85.1 | >10 h |
| Comparative Example 3 | 0.315 | 0.672 | 3.8 | 68.1 | 300 h |

TABLE 3

| Classification | CIE_x | CIE_y | Driving voltage | Efficiency (cd/A) | Lifespan (h@T90) |
|---|---|---|---|---|---|
| Example 4 | 0.686 | 0.313 | 3.0 | 35.5 | 5000 h |
| Comparative Example 2 | 0.683 | 0.316 | 3.0 | 25.5 | 100 h |
| Comparative Example 4 | 0.682 | 0.317 | 3.1 | 32.5 | 1000 h |

TABLE 4

| Classification | CIE_x | CIE_y | Driving voltage | Efficiency (cd/A) | Lifespan (h@T90) |
|---|---|---|---|---|---|
| Example 5 | 0.135 | 0.052 | 4.4 | 6.5 | 24 h |
| Example 6 | 0.136 | 0.050 | 4.7 | 6.8 | 10 h |
| Comparative Example 5 | 0.133 | 0.060 | 4.3 | 6.7 | <1 h |

The quantum dot according to the disclosure includes the first ligand and the second ligand, the first ligand passivates metal defects of the nanoparticle, and the second ligand passivates the chalcogenide defect of the nanoparticle, and each of the first ligand and the second ligand does not include a thiol group. Accordingly, the stability of the quantum dot may be improved.

Therefore, a light-emitting device including the quantum dot as described above can have excellent or suitable low driving voltage and initial luminance characteristics, and long lifespan characteristics, and can be used to manufacture high-quality apparatuses.

As utilized herein, the singular forms "a," "an," "one," and "the" are intended to include the plural forms as well, unless the context clearly indicates otherwise. Further, the use of "may" when describing embodiments of the present disclosure refers to "one or more embodiments of the present disclosure".

In the present disclosure, when dots, particles, dot particles, and/or the like, are spherical, "diameter" indicates a particle diameter or an average particle diameter, and when the particles are non-spherical, the "diameter" indicates a major axis length or an average major axis length. The diameter (or size) of the particles may be measured utilizing a scanning electron microscope or a particle size analyzer. As the particle size analyzer, for example, HORIBA, LA-950 laser particle size analyzer, may be utilized. When the size of the particles is measured utilizing a particle size analyzer, the average particle diameter (or size) is referred to as D50. D50 refers to the average diameter (or size) of particles whose cumulative volume corresponds to 50 vol % in the particle size distribution (e.g., cumulative distribution), and refers to the value of the particle size corresponding to 50% from the smallest particle when the total number of particles is 100% in the distribution curve accumulated in the order of the smallest particle size to the largest particle size.

As used herein, the term "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The electronic apparatus and/or any other relevant devices or components according to embodiments of the present invention described herein may be implemented utilizing any suitable hardware, firmware (e.g. an application-specific integrated circuit), software, or a combination of software, firmware, and hardware. For example, the various components of the apparatus may be formed on one integrated circuit (IC) chip or on separate IC chips. Further, the various components of the apparatus may be implemented on a flexible printed circuit film, a tape carrier package (TCP), a printed circuit board (PCB), or formed on one substrate. Further, the various components of the apparatus may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

It should be understood that embodiments described herein should be considered in a descriptive sense only and not for purposes of limitation. Descriptions of features or aspects within each embodiment should typically be considered as available for other similar features or aspects in one or more embodiments. While one or more embodiments have been described with reference to the drawings, it will be understood by those of ordinary skill in the art that one or more suitable changes in form and details may be made therein without departing from the spirit and scope as defined by the following claims and equivalents thereof.

What is claimed is:

1. A quantum dot comprising:
    a nanoparticle; and
    a first ligand and a second ligand on a surface of the nanoparticle,
    wherein:
    the first ligand is represented by Formula 1,
    the second ligand comprises at least one selected from among an amine group, a phosphine group, an imidazole group, and a pyridine group, and
    each of the first ligand and the second ligand does not comprise a thiol group:

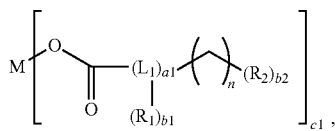

Formula 1 wherein, in Formula 1,
M is Li, Na, K, Rb, Cs, Fr, Mg, Ca, Sr, Ba, Ra, Zn, In, Ga, Ge, Sn, Ti, or a combination thereof,
$L_1$ is a single bond, a $C_1$-$C_{60}$ alkyl group that is unsubstituted or substituted with at least one $R_{10a}$, a $C_3$-$C_{60}$ carbocyclic group that is unsubstituted or substituted with at least one $R_{10a}$, or a $C_1$-$C_{60}$ heterocyclic group that is unsubstituted or substituted with at least one $R_{10a}$,
a1 is an integer from 1 to 10,
$R_1$ and $R_2$ are each independently hydrogen, deuterium, —F, —Cl, —Br, —I, a hydroxyl group, a cyano group, a nitro group, a $C_1$-$C_{60}$ alkyl group unsubstituted or substituted with at least one $R_{10a}$, a $C_2$-$C_{60}$ alkenyl group unsubstituted or substituted with at least one $R_{10a}$, a $C_2$-$C_{60}$ alkynyl group unsubstituted or substituted with at least one $R_{10a}$, a $C_1$-$C_{60}$ alkoxy group unsubstituted or substituted with at least one $R_{10a}$, a $C_3$-$C_{60}$ carbocyclic group unsubstituted or substituted with at least one $R_{10a}$, or a $C_1$-$C_{60}$ heterocyclic group unsubstituted or substituted with at least one $R_{10a}$,
b1 and b2 are each independently an integer from 0 to 5,
n is an integer from 1 to 15,
c1 is an integer from 1 to 10, and
$R_{10a}$ is:
deuterium, —F, —Cl, —Br, —I, a hydroxyl group, a cyano group, or a nitro group;
a $C_1$-$C_{60}$ alkyl group, a $C_2$-$C_{60}$ alkenyl group, a $C_2$-$C_{60}$ alkynyl group, or a $C_1$-$C_{60}$ alkoxy group, each unsubstituted or substituted with deuterium, —F, —Cl, —Br, —I, a hydroxyl group, a cyano group, a nitro group, a $C_5$-$C_{60}$ carbocyclic group, a $C_1$-$C_{60}$ heterocyclic group, a $C_6$-$C_{60}$ aryloxy group, a $C_6$-$C_{60}$ arylthio group, —Si($Q_{11}$)($Q_{12}$)($Q_{13}$), —N($Q_{11}$)($Q_{12}$), —B($Q_{11}$)($Q_{12}$), —C(=O)($Q_{11}$), —S(=O)$_2$($Q_{11}$), —P(=O)($Q_{11}$)($Q_{12}$), or a combination thereof;
a $C_3$-$C_{60}$ carbocyclic group, a $C_1$-$C_{60}$ heterocyclic group, a $C_6$-$C_{60}$ aryloxy group, or a $C_6$-$C_{60}$ arylthio group, each unsubstituted or substituted with deuterium, —F, —Cl, —Br, —I, a hydroxyl group, a cyano group, a nitro group, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{60}$ carbocyclic group, a $C_1$-$C_{60}$ heterocyclic group, a $C_6$-$C_{60}$ aryloxy group, a $C_6$-$C_{60}$ arylthio group, —Si($Q_{21}$)($Q_{22}$)($Q_{23}$), —N($Q_{21}$)($Q_{22}$), —B($Q_{21}$)($Q_{22}$), —C(=O)($Q_{21}$), —S(=O)$_2$($Q_{21}$), —P(=O)($Q_{21}$)($Q_{22}$), or a combination thereof; or
—Si($Q_{31}$)($Q_{32}$)($Q_{33}$), —N($Q_{31}$)($Q_{32}$), —B($Q_{31}$)($Q_{32}$), —C(=O)($Q_{31}$), —S(=O)$_2$($Q_{31}$), or —P(=O)($Q_{31}$)($Q_{32}$), and
$Q_{11}$ to $Q_{13}$, $Q_{21}$ to $Q_{23}$, and $Q_{31}$ to $Q_{33}$ are each independently: hydrogen; deuterium; —F; —Cl; —Br; —I; a hydroxyl group; a cyano group; a nitro group; a $C_1$-$C_{60}$ alkyl group; a $C_2$-$C_{60}$ alkenyl group; a $C_2$-$C_{60}$ alkynyl group; a $C_1$-$C_{60}$ alkoxy group; or a $C_3$-$C_{60}$ carbocyclic group or a $C_1$-$C_{60}$ heterocyclic group, each unsubstituted or substituted with deuterium, —F, a cyano group, a $C_1$-$C_{60}$ alkyl group, a $C_1$-$C_{60}$ alkoxy group, a $C_3$-$C_{60}$ carbocyclic group, a $C_1$-$C_{60}$ heterocyclic group, or a combination thereof.

2. The quantum dot of claim 1, wherein
M comprises a site chemically bonded to the nanoparticle.

3. The quantum dot of claim 1, wherein
the second ligand comprises a main chain and a functional group, and
the functional group comprises the at least one selected from the amine group, the phosphine group, the imidazole group, and the pyridine group.

4. The quantum dot of claim 3, wherein
the functional group comprises a site that is chemically bonded to the nanoparticle.

5. The quantum dot of claim 1, wherein the nanoparticle comprises a Group II-VI semiconductor compound, a Group III-V semiconductor compound, a Group III-VI semiconductor compound, a Group I-III-VI semiconductor compound, a Group IV-VI semiconductor compound, a Group IV element or compound, or a combination thereof.

6. The quantum dot of claim 1, wherein
the nanoparticle comprises a core and a first shell around the core.

7. The quantum dot of claim 6, wherein
the first shell comprises a first compound, and
the first compound comprises a first metal and a first chalcogenide.

8. The quantum dot of claim 7, wherein
the first metal comprises Zn.

9. The quantum dot of claim 7, wherein
the first chalcogenide comprises at least one selected from S and Se.

10. The quantum dot of claim 6, wherein
the first ligand comprises:
a first-1 ligand represented by Formula 1-1, and/or
a first-2 ligand represented by Formula 1-2:

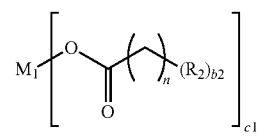

Formula 1-1

-continued

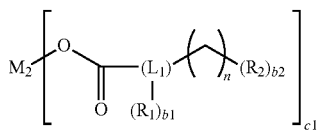

Formula 1-2 wherein, in Formulae 1-1 and 1-2, $M_1$ and $M_2$ are each independently Li, Na, K, Rb, Cs, Fr, Mg, Ca, Sr, Ba, Ra, Zn, In, Ga, Ge, Sn, Ti, or a combination thereof, and $L_1$, $R_1$, $R_2$, b1, b2, n, and c1 are as described in connection with Formula 1.

11. The quantum dot of claim 10, wherein
a standard reduction level value of $M_1$ is smaller than a conduction band energy level value of the first shell.

12. The quantum dot of claim 10, wherein in Formula 1-2, $R_1$ is a $C_1$-$C_{20}$ alkyl group unsubstituted or substituted with at least one $R_{10a}$, and
n is an integer from 1 to 10.

13. The quantum dot of claim 1, wherein
the first ligand comprises at least one selected from among a 2-ethyl butanoic acid magnesium salt, a 2-ethyl hexanoic acid magnesium salt, a 2-butyl octanoic acid magnesium salt, a 2,2,4,8,10,10-hexamethylundecane-5-carboxylic acid magnesium salt, 2-ethyl butanoic acid zinc salt, 2-ethyl hexanoic acid zinc salt, 2-butyl octanoic acid zinc salt, and 2,2,4,8,10,10-hexamethylundecane-5-carboxylic acid zinc salt, and
the second ligand comprises at least one selected from among methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, oleylamine, trioctylphosphine, trimethylphosphine, triethylphosphine, and triphenylphosphine.

14. An ink composition comprising the quantum dot of claim 1 and a solvent.

15. A light-emitting device comprising:
a first electrode;
a second electrode opposite to the first electrode; and
an interlayer between the first electrode and the second electrode and comprising an emission layer,
wherein
the light-emitting device further comprises the quantum dot of claim 1.

16. The light-emitting device of claim 15, wherein
the emission layer comprises the quantum dot.

17. An optical member comprising the quantum dot of claim 1.

18. An apparatus comprising the optical member of claim 17.

19. The apparatus of claim 18, further comprising a light source,
wherein the quantum dot is in a path of light emitted from the light source.

20. The apparatus of claim 19, wherein
at least one region of the optical member comprises the quantum dot, and
the at least one region is to absorb light emitted from the light source.

* * * * *